United States Patent [19]
Yoshii et al.

[11] Patent Number: 5,982,933
[45] Date of Patent: Nov. 9, 1999

[54] INFORMATION PROCESSING METHOD, INFORMATION PROCESSING APPARATUS, AND STORAGE MEDIUM

[75] Inventors: Hiroto Yoshii, Tokyo; Tsunekazu Arai, Tama; Eiji Takasu, Yokohama, all of Japan

[73] Assignee: Canon Kabushiki Kaisha, Tokyo, Japan

[21] Appl. No.: 08/777,249

[22] Filed: Dec. 31, 1996

[30] Foreign Application Priority Data

| Jan. 12, 1996 | [JP] | Japan | 8-003836 |
| Feb. 26, 1996 | [JP] | Japan | 8-037816 |
| Apr. 12, 1996 | [JP] | Japan | 8-091091 |
| Apr. 12, 1996 | [JP] | Japan | 8-091097 |

[51] Int. Cl.⁶ .................................................. G06K 9/00
[52] U.S. Cl. .......................................... 382/226; 382/190
[58] Field of Search .................................. 382/189, 197, 382/138, 159, 178, 225, 228, 202, 224, 175, 192, 311, 267, 173, 177, 181, 182, 183, 184, 185, 186, 187, 188, 190, 191, 195, 201, 203, 209, 217, 218, 226, 227, 229, 230, 231, 232, 251, 252, 321, 253, 278, 305, 306, 309, 312, 317; 358/405, 530, 540, 426

[56] References Cited

U.S. PATENT DOCUMENTS

| 5,034,989 | 7/1991 | Loh ................................ 382/197 |
| 5,075,896 | 12/1991 | Wilcox et al. ................ 382/225 |
| 5,193,121 | 3/1993 | Elischer et al. .............. 382/138 |
| 5,208,869 | 5/1993 | Holt .............................. 382/138 |
| 5,293,429 | 3/1994 | Pizano et al. ................. 382/202 |
| 5,317,649 | 5/1994 | Nishida ......................... 382/202 |
| 5,579,408 | 11/1996 | Sakaguchi et al. ........... 382/187 |

OTHER PUBLICATIONS

S. Rasoul Safavian, et al., "A Survey of Decision Tree Classifier Methodology", IEEE Transactions On Systems, Man, and Cybernetics, vol. 21, No. 3, May/Jun. 1991, pp. 660–674.

"Analysis And Design Of A Decision Tree Based On Entropy Reduction And Its Application To Large Character Set Recognition", by Q.R. Wang et al., IEEE Trans. On Pattern Analysis And Machine Intelligence, vol. PAMI–6, No. 4, Jul. 1984, pp. 406–417.

"Two–Dimensional Object Recognition Using Multiresolution Non–Information–Preserving Shape Features", By Pernus et al., Pattern Recognition Letters, vol. 15, No. 11, Nov. 1, 1994, pp. 1071–1079.

"Design Of Multicategory Multifeature Split Decision Trees Using Perception Learning", by Sethi, et al., vol. 27, No. 7, Jul. 1, 1994, pp. 939–947–Pattern Recognition–Oxford.

*Primary Examiner*—Bijan Tadayon
*Attorney, Agent, or Firm*—Fitzpatrick, Cella, Harper & Scinto

[57] ABSTRACT

This relates to a classification generation method whereby, in order to efficiently and accurately recognize a pattern having a large number of characteristics, a pattern classification tree is generated, with which a macro structural characteristic of a pattern is appropriately reflected and a competitive relationship between categories is adequately reflected, and to a method for recognizing an input pattern by using the generated classification tree. When an input pattern is formed using strokes, a training stroke is divided into a plurality of segments, and vector quantization is performed for the strokes in the segments. Among the quantized strokes in the segments, adjacent stroke sets are synthesized to repetitively generate upper rank stroke vectors. A stroke vector for which a predetermined entropy function is maximized is selected from the upper rank stroke vectors in a layered stroke vector series, and development is performed extending down into the lower rank stroke vector sets. As a result, a classification tree is prepared.

74 Claims, 44 Drawing Sheets

DIVIDE STROKE INTO SEGMENTS

MAKE EACH SEGMENTS VECTOR

BASE VECTORS IN 12 DIRECTIONS

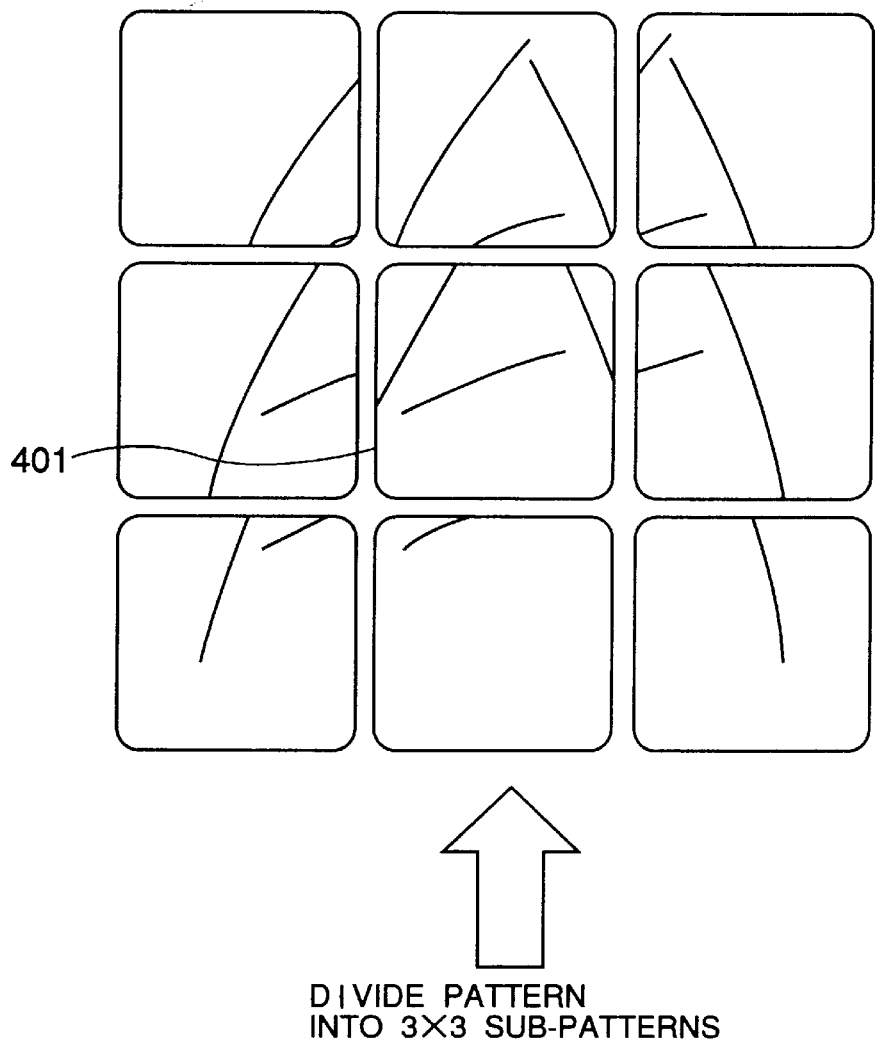
DIVIDE PATTERN
INTO 3×3 SUB-PATTERNS
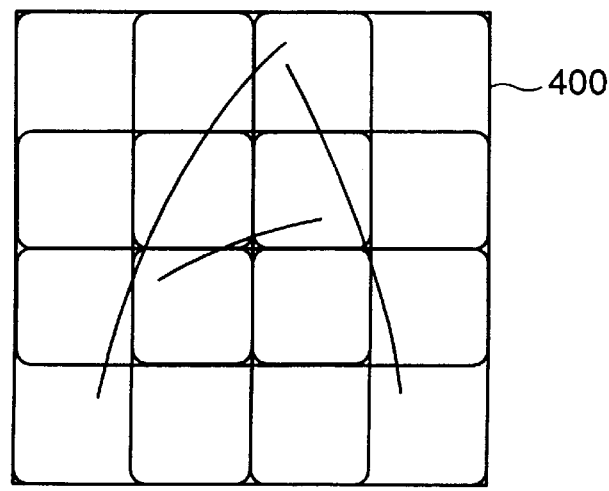
FIG.30

INFORMATION PROCESSING METHOD, INFORMATION PROCESSING APPARATUS, AND STORAGE MEDIUM

BACKGROUND OF THE INVENTION

1. Field of the Invention

The present invention relates to recognition of patterns, such as character and speech patterns, and more particularly, to a technique for preparing data for pattern recognition of characters, sounds, etc.

2. Related Background Art

Conventionally, for recognition of handwritten characters, which constitute a type of pattern, one step-by-step procedure utilizes a classification tree to sort patterns into categories.

Since with the conventional recognition method for using a classification tree, to prepare nodes the focus is only on the number of characteristics of individual nodes, the broader aspects of the pattern can not be determined.

In order to make a classification tree for recognition of a pattern having a large amount of characteristics, a method for selecting a characteristic axis at the individual nodes must be employed because of the time required for calculation.

In addition, there is a conventional method, which utilizes an N-gram table and which is employed for sentence recognition, whereby a finite automation is used as a language model for the constitution of sentences, and whereby, based on this model, the pre-probability of the occurrence of a character row is calculated.

In other words, according to this method, a step of calculating, from large-scale sentence database, the probability concerning the continuation of element rows that constitute sentences.

However, for a language, such as Japanese or Chinese, that includes several thousands of character types, a large amount of sentence data is required even to prepare a trigram table (N=3).

If a table is to be prepared using a small amount of sentence data, a reliable shifting probability and an unreliable shifting probability coexist in the table, and a defect occurs.

A conventional method for preparing a classification tree through pre-processing that involves the step-by-step degeneration of a pattern. According to this method, a well balanced classification tree can be constructed for the macro to the micro form of a pattern. As a result, a recognition function that is as close as possible to the recognition ability of human beings can be expected.

However, since this method absorbs modifications of a pattern by using a variety of training patterns, an enormous amount of training patterns is required.

This condition will be explained while referring to FIG. 32.

Suppose that a classification tree is prepared according to the conventional method for the recognition of numerical bit maps ranging from "0" through "9".

A classification tree constructed by the above method is shaped as shown in FIG. 32. Training patterns for three categories, "4", "5" and "6", are present at the fifth branch from the right in FIG. 32.

In other words, broadly speaking, no categories other than the three categories "4", "5" and "6" are available for the training patterns at the fifth branch from the right in FIG. 32.

As an example, consider the processing for the recognition of an entirely new bit map pattern by using the thus provided classification tree. Broadly speaking, all the bit maps shown in FIGS. 41A through 41E have the same shape as the fifth branch from the right in FIG. 32. In other words, when the above explained classification tree is used for recognition of these bit maps, the bit maps are always classified as belonging to categories of "4", "5" and "6". As the result, the bit maps in FIGS. 41A through 41C are correctly identified, but the bit map in FIG. 41D, which is identified, should be rejected, and the one in FIG. 41E is apparently incorrectly identified.

The reason such a defect occurs is that there is no pattern having the category "2" that is shaped like the one in FIG. 41E. This means that for the conventional method, an enormous quantity of training patterns, which include all possible permutations, are required.

SUMMARY OF THE INVENTION

It is therefore one object of the present invention to provide a classification tree generation method for generating a classification tree composed of stroke vectors, with which the macro structural characteristic of a pattern that has a large amount of characteristics is appropriately reflected and with which the competitive relationship that exists among categories is appropriately reflected, and an apparatus therefor; and to provide a character recognition method whereby a generated classification tree is used to recognize characters at high speed and at a high recognition ratio, and an apparatus therefor.

According to the present invention, a layered character pattern can be efficiently generated from a character pattern.

In addition, based on a generated layered character pattern, a classification tree can be prepared wherein the competition of categories is most intense at the upper layer, and wherein the categories are preferably sorted at the layer immediately below.

Further, a memory-efficient N-gram table can be generated by using the produced classification tree.

Moreover, recognition at high speed and at a high recognition ratio can be performed by searching the thus acquired N-gram table.

According to the present invention, sub-patterns are extracted from training patterns, and layering is performed in advance for the sub-patterns. Based on the layered sub-patterns, a classification tree for the sub-patterns is prepared, so that a high recognition ratio can be provided even with a small quantity of training patterns.

According to the present invention, in the layering process, data are produced from the sequential degeneration of detailed sub-pattern data, so that fast recognition process can be provided.

According to the present invention, the classification tree is prepared by developing the layered sub-pattern data from the upper rank through the lower rank, so that dictionary data having a high recognition efficiency can be provided.

According to the present invention, when sub-patterns are regarded as pattern segments obtained by dividing a training pattern, the preparation of sub-patterns is easy.

According to the present invention, a variable for which efficiency of classification is the greatest is selected, and a classification tree is prepared for the selected variable. As a result, an efficient classification tree that differs from the conventional one can be provided.

According to the present invention, layering is performed on an input pattern. The layered input pattern is recognized by tracing the classification tree, beginning at the upper rank data for the pattern and continuing to the lower rank. As a result, a high recognition rate at a high speed can be provided.

According to the present invention, when the pattern is composed of bit-mapped data, highly effective identification of image data input by a scanner, etc., can be performed.

According to the present invention, when a pattern is stroke data, highly effective identification of tracing data input by a pen can be performed.

According to the present invention, when a pattern is speech data, highly effective identification of speech data input at a microphone, etc., can be performed.

BRIEF DESCRIPTION OF THE DRAWINGS

FIG. 30 is a diagram for explaining the extraction of sub-patterns according to the third embodiment;

DESCRIPTION OF THE PREFERRED EMBODIMENTS (First Embodiment)

In a first embodiment, a description will be given of a method for generating a classification tree for recognizing an entered stroke online and the recognition processing by using the generated classification tree.

First, the major features of a method and an apparatus for recognizing characters according to this embodiment will be described, then detailed description thereof will follow.

In the character recognizing method according to the embodiment, a training stroke is divided into stroke segments which are formed into vectors, and resulting vector series are layered, then a classification tree is generated according to the obtained layered vector series.

In a process for layering the vector series, the vector series information constituting the training stroke is degenerated in steps.

When generating the classification tree, a vector is selected which ensures the severest competition among categories in an upper layer and good separation among categories in a layer immediately thereunder in accordance with an entropy standard which will be discussed later, and the vector which has been degenerated according to the result thereof is developed toward lower layers.

A dictionary for online handwritten character recognition holds the foregoing classification tree as contents thereof.

Further, the category of a stroke hand-drawn by a user is determined according to the foregoing classification tree.

The present invention will now be described in conjunction with the accompanying drawings.

<Structure and Generating Method of Classification Tree>

Figure 1:
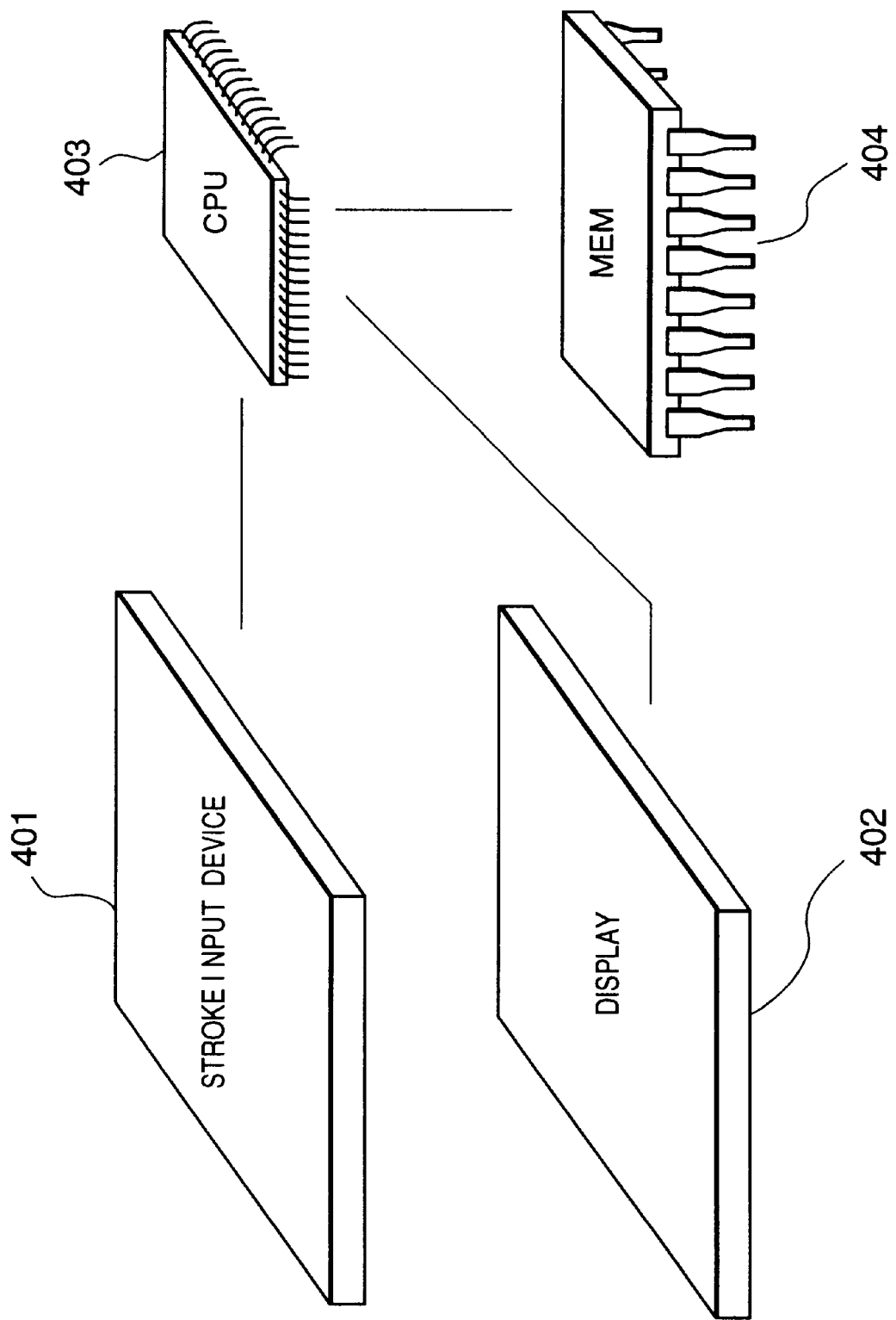
FIG. 1 is a block diagram illustrating the arrangement of an apparatus according to a first embodiment of the present invention.

FIG. 1 is a diagram showing an example of a schematic configuration of an information processing apparatus to which the method of online handwritten character recognition in accordance with the embodiment will be applied.

An online handwritten character recognizing apparatus according to the embodiment is constituted primarily by a stroke input device 401, a display 402, a central processing unit (CPU) 403, and a memory 404.

The stroke input device 401 has, for example, a digitizer and a pen; it hands the coordinate data on a character or graphic, which has been entered on the digitizer by using the pen, over to the CPU 403.

The display 402 displays stroke data entered through the stroke input device 401 and a result of recognition by the CPU 403.

The CPU 403 recognizes a character or graphic composed of entered stroke data and also controls the entire apparatus.

The memory 404 records a recognizing program and a dictionary used by the CPU 403 and it also temporarily records entered stroke data, variables used by the recognizing program, etc.

Figure 2:
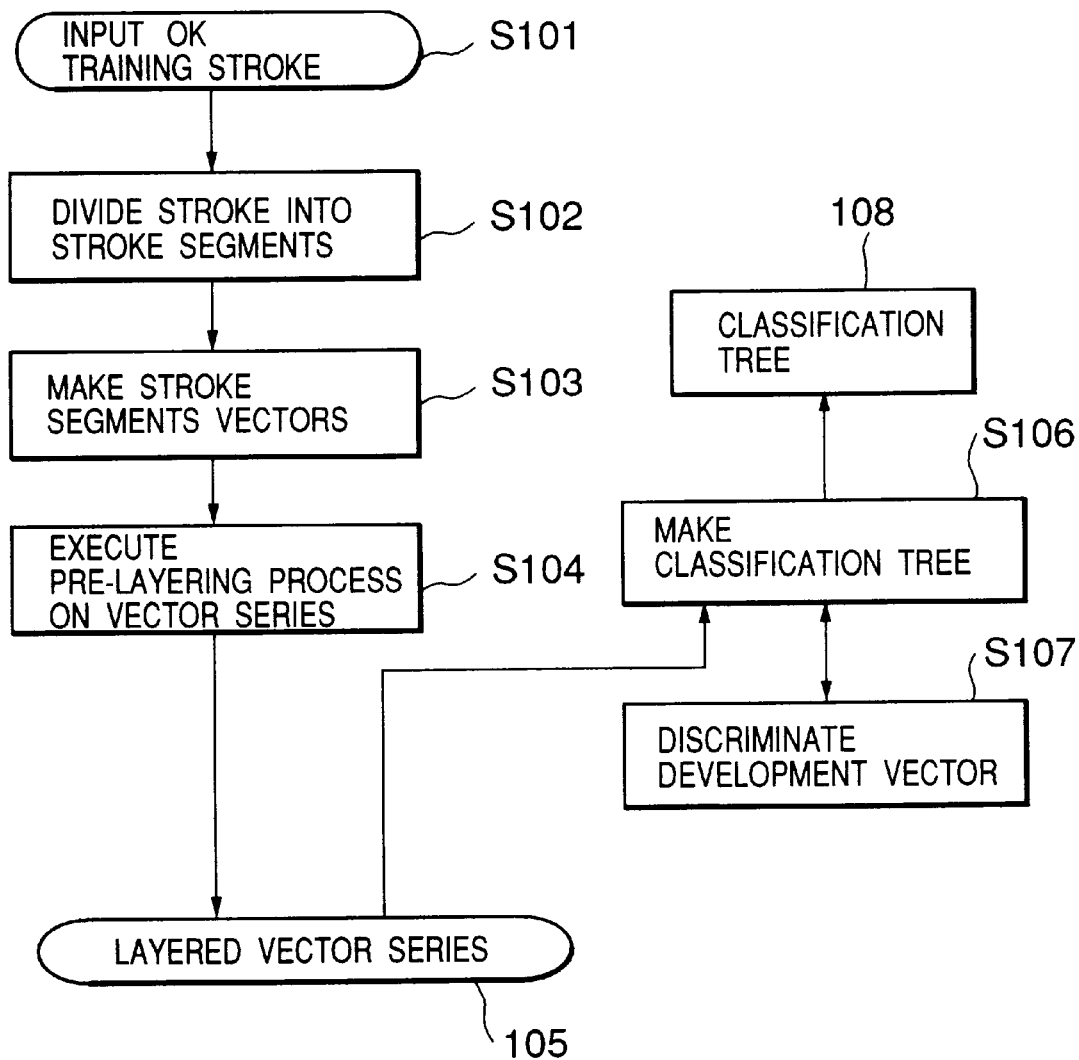
FIG. 2 is a flowchart showing a method for generating an on-line handwritten character recognition dictionary for the first embodiment.

FIG. 2 is a processing flowchart which provides a best illustration of the procedure for generating the dictionary for online handwritten character recognition according to an embodiment of the present invention.

Referring to FIG. 2, reference character S101 indicates a step for entering a training stroke, and S102 denotes a step for dividing the entered training stroke into stroke segments.

Reference character S103 denotes a step for making the stroke segments vectors, the stroke segments resulting from the division performed in the preceding stroke dividing step.

Reference character S104 denotes a step of the pre-layering process on vector series that results from the preceding step for making the stroke segments vectors.

Reference character 105 denotes a layered vector series generated in the step of the pre-layering process on the vector series.

Reference character S106 denotes a classification tree generating step for making a classification tree in accordance with the layered vector series.

Reference character S107 is a step for discriminating a development vector which is used in the process of generating the classification tree in the classification tree making step.

Reference character 108 denotes a classification tree that has been completed.

In this embodiment, the input is a training stroke in S101 and the output is the classification tree 108.

Referring now to FIG. 3 to FIG. 7, a description will be given to the procedure for generating a classification tree in a character recognizing process of the first embodiment according to the present invention.

For easier understanding, three different characters "く", "し", and "つ" which read "ku", "shi", and "tsu", respectively, each of which is drawn in one stroke, will be taken as examples representing the categories to be recognized.

It is assumed that there are one hundred training patterns each for "く", "し", and "つ", respectively, for generating the dictionary; these are denoted as follows:

TPi,j (Training Pattern i, j)

where i is a suffix denoting the category and it takes a value in the following range:

$0 \leq i \leq 2$ j is a suffix denoting a training pattern number and it takes a value in the following range:

$1 \leq j \leq 100$

Figure 3:
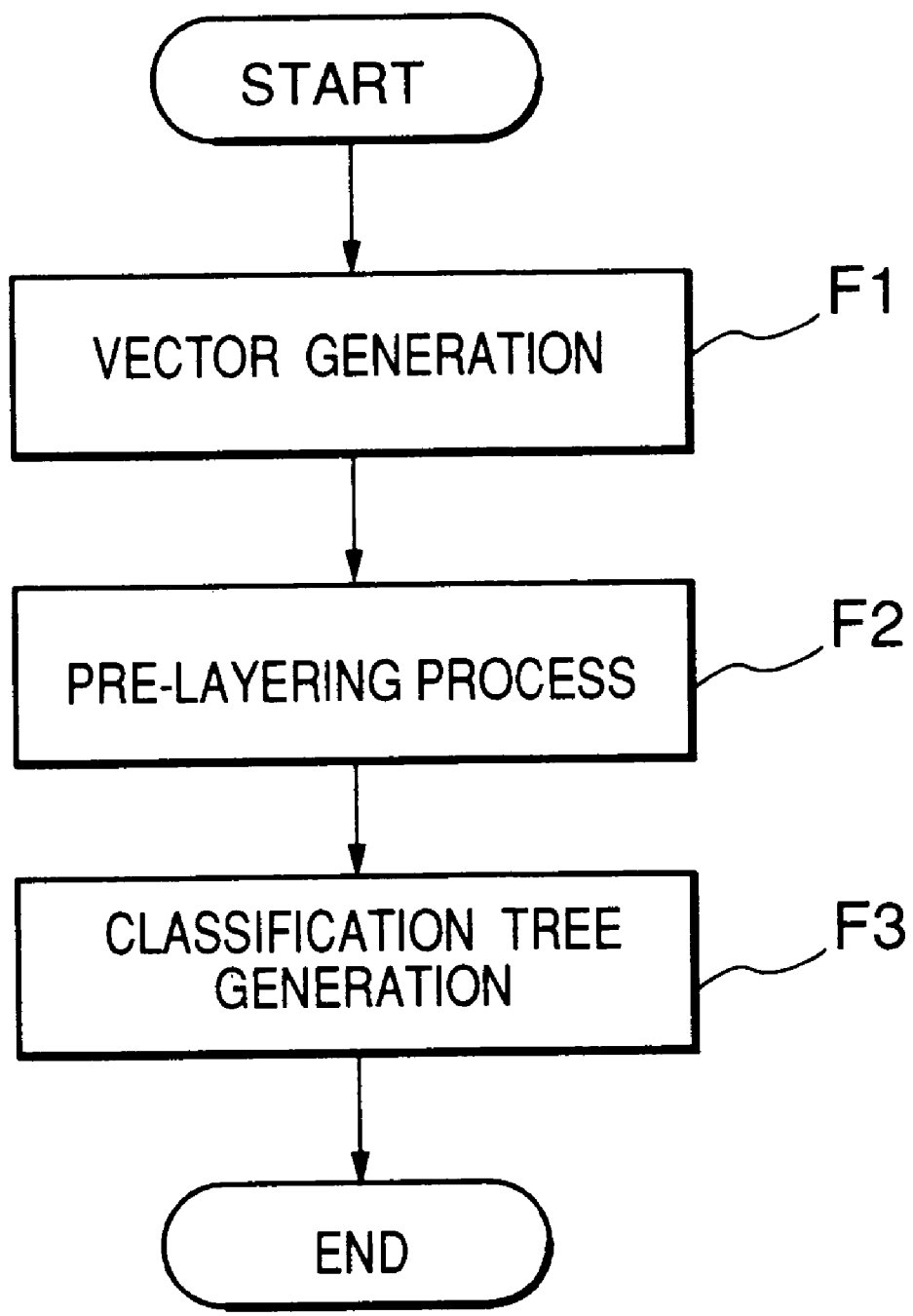
FIG. 3 is a flowchart of the processing for generating an on-line handwritten character recognition dictionary for the first embodiment.

As illustrated by the flowchart shown in FIG. 3, the process of generating the dictionary for the online handwritten character recognition is composed of three steps, namely, a vector generation step, a pre-layering process step, and a classification tree generation step. The following will describe each of the steps.

(F1) Vector Generation Step

Figure 4A:
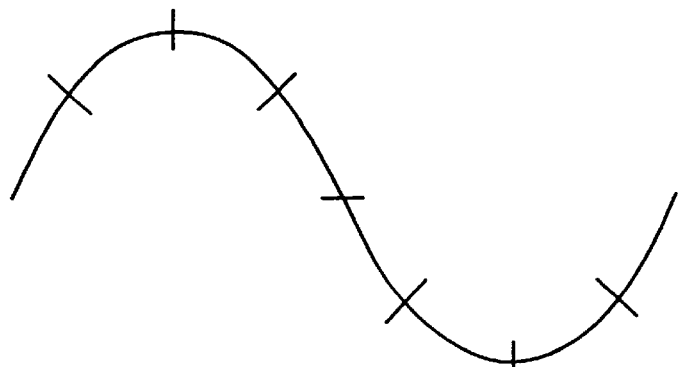
FIG. 4 is a diagram for explaining the processing for a stroke generation phase in the first embodiment.
Figure 4B:
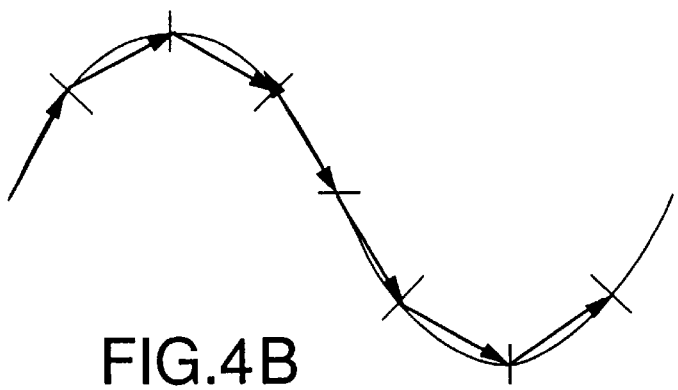
Figure 4C:
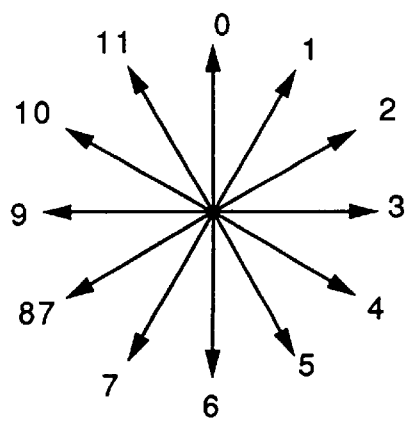

Referring to FIG. 4, the vector generation step will be described in detail.

Firstly, the training stroke is divided into n segments (n=8 in FIG. 4). Although the n segments shown in FIG. 4 are equal to the equally divided n segments related to the distance of the stroke, the present invention is not limited thereto.

For instance, if a stroke input device suffers from unstable strokes in the vicinity of start and end points thereof, then it would be hardly meaningful to make efforts for obtaining detailed segment vectors from the stroke portion in the vicinity of start and end points thereof. In such a case, longer distances may be allowed for the beginning segment and the end segment out of the n stroke segments than those of the remaining segments.

In the next step, the respective segments of the n stroke segments are formed into vectors.

In FIG. 4, the stroke segments are quantized into the base vectors in twelve directions from number 0 to number 11. The base vectors are arranged equidistantly in 360 degrees; however, the present invention is not limited thereto.

For example, of the base vectors in the twelve directions shown in FIG. 4, an upper left base vector (e.g. the vector numbered 10 or 11) does not appear in a handwritten stroke. Therefore, a set of base vectors with such base vectors arranged at a greater angle interval may be used.

In the process for producing the vectors, the step for dividing the stroke into stroke segments and the step for making each segment a vector shown in FIG. 2 are implemented on all the training strokes.

In the case of the example shown in FIG. 4, the entered stroke is converted to base vector series "12455421".

(F2) Pre-layering Step

The training strokes which have been formed into the vectors are pre-layered pyramidally.

Figure 5:
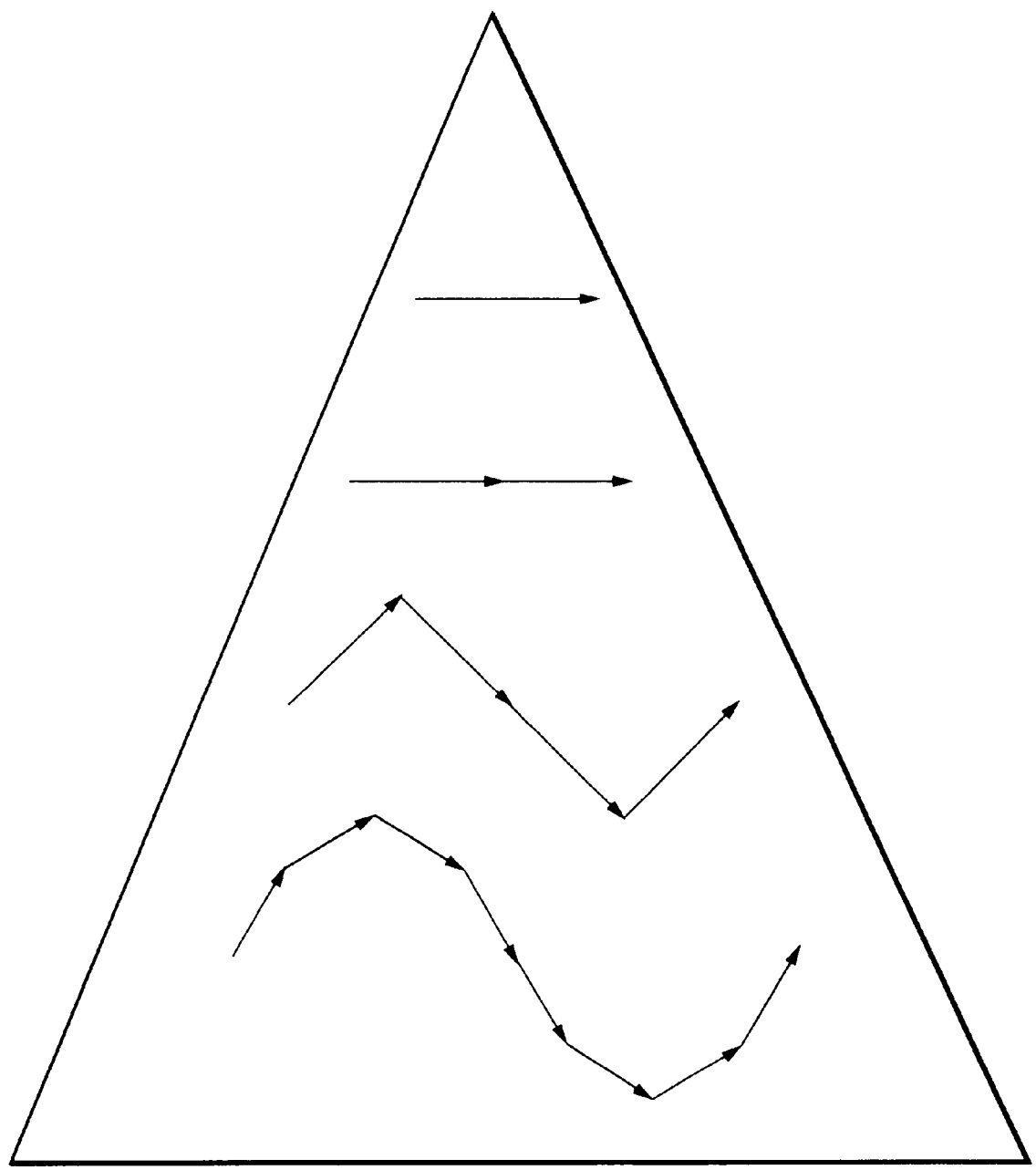
FIG. 5 is a diagram showing a layered vector series.

FIG. 5 shows an example.

In FIG. 5, an average vector from two adjacent vectors of the vector series obtained in the step for making each segment a vector is stored in an upper layer so as to sequentially reduce the vector information to a half (or degenerated).

The eight base vectors of the stroke as shown in FIG. 4 will be eventually converted to four vectors, two vectors, and one vector in sequence.

One method for averaging two adjoining vectors will be described in detail, referring to FIG. 6.

Figure 6:
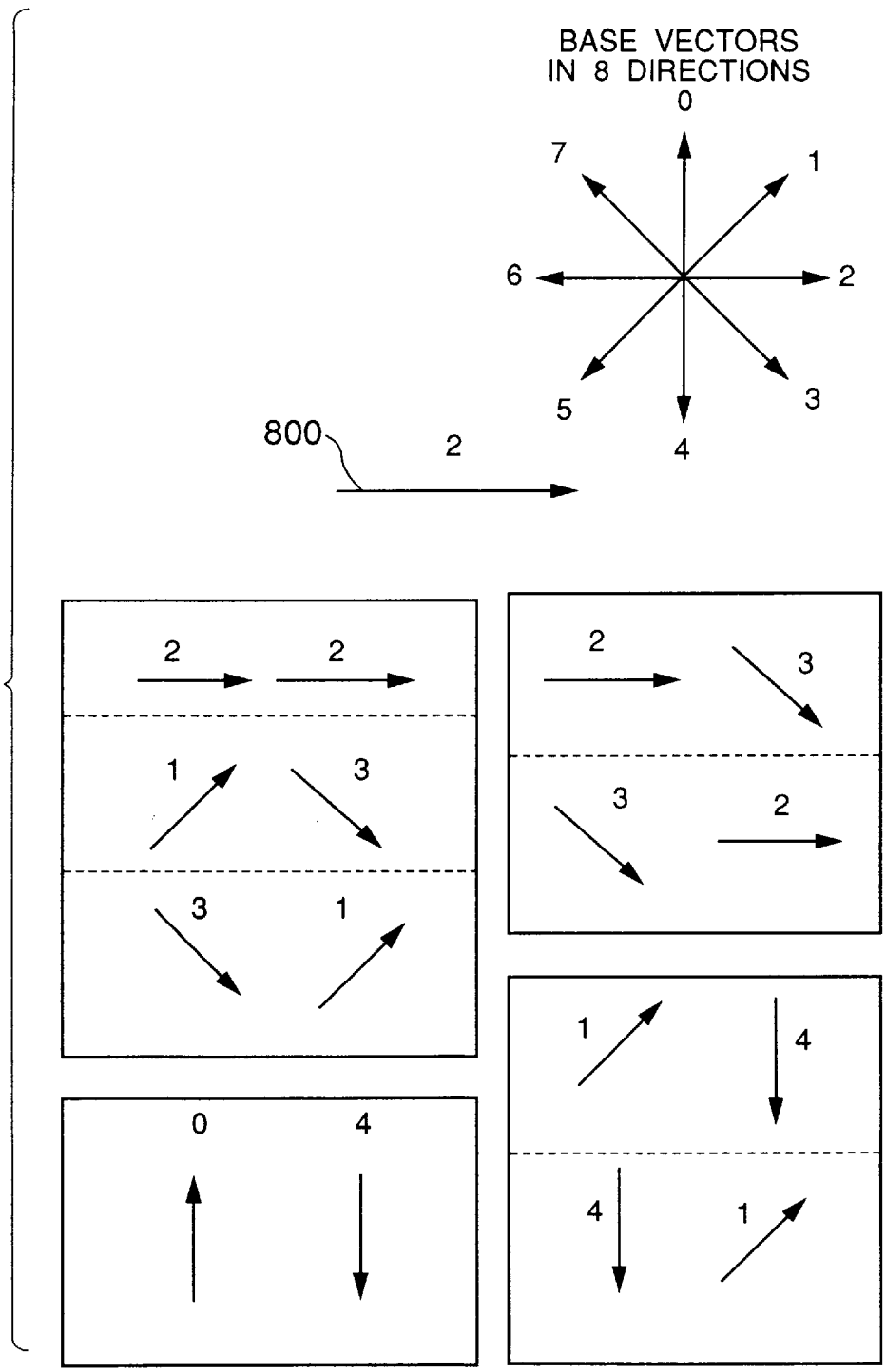
FIG. 6 is a diagram for explaining a vector averaging process in the first embodiment.

For the convenience of description, the base vectors in twelve directions shown in FIG. 5 will be in eight directions in FIG. 6. It should be noted that the spirit of the present invention remains unaffected even if the total number of the base vectors or the directions of the individual base vectors are changed.

The following description will be given on an assumption that the base vectors have eight directions. The first vector of the adjoining two vectors will be denoted as "pre", and the following vector as "post".

In a simple way, the average of the two vectors may be given by:

(pre+post)/2

There are cases, however, that the average obtained from the above formula does not provide a base vector.

In general, the vectors equally divided into eight directions and the average vectors thereof provide the vectors in sixteen directions, and they must be processed to provide vectors in eight directions.

FIG. 6 illustrates a method therefor.

In FIG. 6, "→" (800) means the presence of a rightward vector (No. 2) in an upper layer. The eight pairs of vectors given thereunder indicate the pairs of vectors that should exist in a lower layer.

Specifically, there are the following eight pairs which may be the pair of vectors (pre, post) indicated by No. 2 in an upper layer:

(2, 2), (1, 3)
(3, 1), (0, 4)
(2, 3), (3, 2)
(3, 4), (4, 3)

This applies under a condition where the average value of pre and post obtained by (pre+post)/2 is greater than 1.5 and 2.5 or smaller.

If the vectors in an upper layer have a number other than 2, then a set of vectors which is obtained by shifting the set of vectors shown in FIG. 6 by 45 degrees will be used.

The set of vectors, namely the vector in the upper layer and the two vectors in the lower layer, is not limited to the one shown in FIG. 6; it may be any set of vectors as long as the vector in the upper layer can be regarded as an average vector of the two vectors in the lower layer.

(F3) Classification Tree Generating Step

In the pre-layering process (F2), all the segments of the training stroke (TPi,j) are developed into vectors from bottom to top pyramidally as shown in FIG. 5. To generate the classification tree, the vectors are processed in the opposite direction, namely, from top to bottom.

In the following description, it will be assumed that the base vectors have eight directions, or there are eight vectors numbered 0 through 7 shown in FIG. 6. In this case, all the-vectors in the vector pyramid will be covered by these base vectors.

Figure 7:
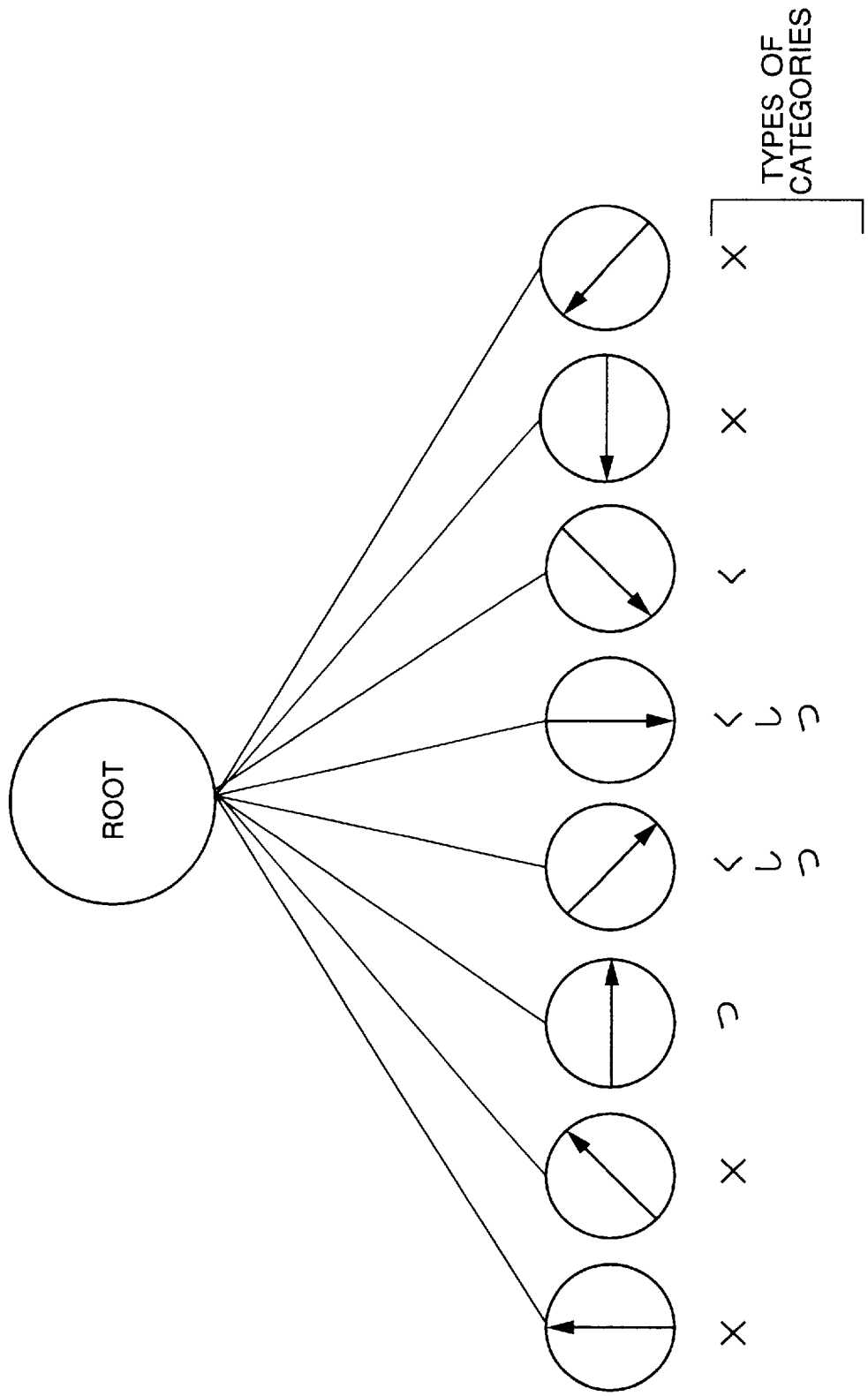
FIG. 7 is a diagram showing a classification tree for the first embodiment.

The topmost layer includes eight vectors; therefore, eight branches will extend from the root node as shown in FIG. 7.

At this time, the number of the training strokes (TPi,j) which exist in the branches is counted. Depending on the counting result, one of the following three types of processing will be implemented:

1. If no training stroke (TPi,j) exists in a branch, then that particular branch is removed.

2. If the strokes of only a certain category out of the training stroke (TPi,j) exist (e.g. only the strokes of " ⊃ " exist), then that particular branch is turned into a leaf and assigned the category number (e.g. " ⊃ ").

3. In other case than the cases described in 1 and 2 above, that is, if strokes of a plurality of categories are mixed, then that particular branch is turned into a node to continue the generation of the classification tree.

FIG. 7 shows the processing result. In FIG. 7, the branches are indicated by the vectors in the topmost layer (hereinafter referred to as "the first layer") shown in FIG. 5.

The branches with "X" indicated in the column showing the types of categories correspond to the case where no training stroke (TPi,j) exists, and therefore they are eliminated.

The third branch from the left has the training strokes of only the category of " ⊃ ". This corresponds to the case where the strokes of only one particular category (e.g. " ⊃ ") exist, so that the branch is turned into a leaf.

For instance, the fourth and fifth branches from the left have the training strokes of the categories " く ", " ∟ " and " ⊃ "; they correspond to the case other than the cases 1 and 2, namely, the strokes of a plurality of categories are mixed. Thus, these branches provide nodes.

The following will describe how to generate branches from the nodes.

The most efficient method for generating branches from the nodes will be described. The most efficient method should enable as much information as possible on categories to be obtained when branches are developed.

The following will describe the method for selecting a vector that permits highest efficiency when the branches are developed.

The number of the training strokes of category No. i among the training strokes (TPi,j) which exist in a certain node is denoted as Ni. When the total number of the training strokes existing in the node is denoted as N, then the existence probability pi of each category in the node can be expressed as follows:

$$pi = Ni/N$$

If the number of the types of categories in a certain node is 2, for example, then:

$$N = \sum_{i=0}^{2} Ni$$

Therefore, the entropy at the time when the information on the node is obtained will be represented by the following expression:

$$Entropy_{node} = -\sum_{i=0}^{2} p_i \log(p_i) = \sum_{i=0}^{2} \frac{N_i}{N} \log\left(\frac{N_i}{N}\right) \quad \text{Expression (1)}$$

$$= \frac{1}{N} \sum_{i=0}^{2} N_i (\log N - \log N_i)$$

Then, a certain vector is selected in this node and the decrement of the entropy when a branch is developed is calculated.

As described above, the number of the branches developed from the single vector toward the lower layers is eight. The distribution of the training stroke (TPi,j) among the eight branches is indicated by the number of the training strokes (TPi,j) which exist in the developed branches, i.e.;

Ni,b where i of Ni,b denotes a category number and b denotes the branch number.

At this time, the entropy at which the information on each branch is obtained is represented by the following expression as is the case with the foregoing discussion:

$$Entropy_{branch} = -\sum_{i=0}^{2} p_i \log(p_i) = -\sum_{i=0}^{2} \frac{N_{i,b}}{N_b} \log\left(\frac{N_{i,b}}{N_b}\right) \quad \text{Expression (2)}$$

$$= \frac{1}{N_b} \sum_{i=0}^{2} N_{i,b}(\log N_b - \log N_{i,b})$$

In this expression, $$N_b = \sum_{i=0}^{2} N_{i,b}$$

indicates the total number of the training strokes (TPi,j) which exist in the branches.

The probability of distribution into each branch is expressed by:

Nb/N where N is identical to N in the expression (1). Hence, the average entropy at the time when the branches are developed is represented by the following expression:

$$\overline{Entropy_{branch}} = \frac{1}{N} \sum_{b=0}^{7} \sum_{i=0}^{2} N_{i,b}(\log N_b - \log N_{i,b}) \quad \text{Expression (3)}$$

The average decrement of the entropy is obtained by:

EntropyDecrease=Entropy$_{node}$−$\overline{Entropy_{branch}}$   Expression (4)

A value obtained by dividing the value of K by the logarithm of the number of the branches as shown below represents the classification efficiency when the branches are developed:

$$\frac{EntropyDecrease}{BranchNumber} \quad \text{Expression (5)}$$

A vector which gives this value a maximum value is selected to develop the branches.

The branches may be developed in relation to a group of a plurality of vectors rather than developing only one vector. In this case, BranchNumber in the expression (5) will be:

(Number of selected vectors)×8

In this embodiment, the value obtained in the expression (5) is adopted as the value which indicates the classification efficiency when the branches are developed; however, it is obvious that the value is not limited to the one obtained by the expression (5) as long as it is a function representing the development efficiency of branches such as "Ginicriterion" described in a literature titled "Classification and Regression Trees".

Thus, once a vector or a set of vectors to be developed are decided, the branches are developed and leaves and nodes are generated accordingly. Lastly, when all vectors have been turned into leaves, the classification tree is completed.

Figure 10:
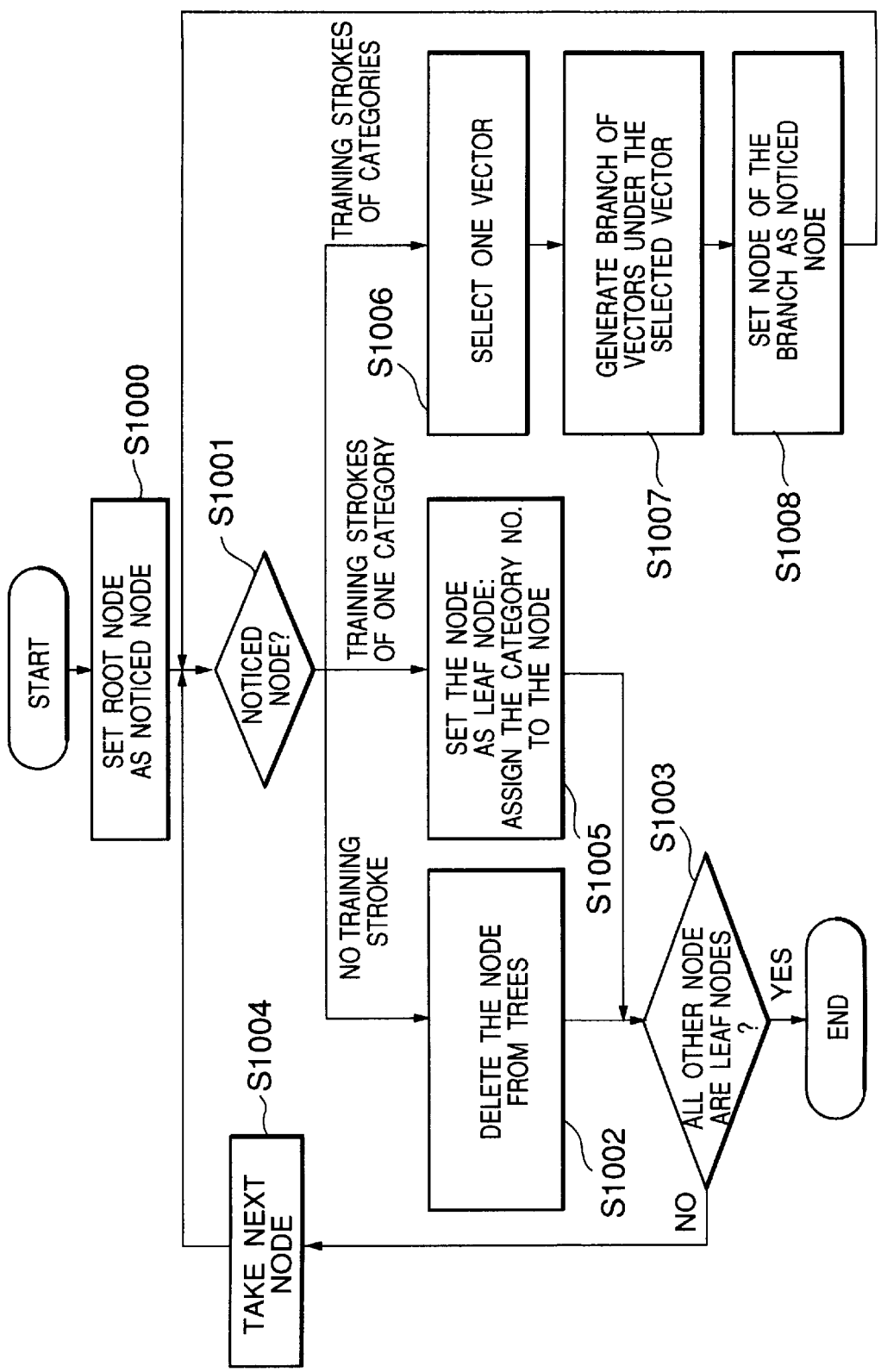
FIG. 10 is a detailed flowchart for a classification tree generation process for the first embodiment.

The processing described above is illustrated in the form of a flowchart in FIG. 10. The procedure for generating the classification tree as shown in FIG. 8 will now be described.

Figure 8:
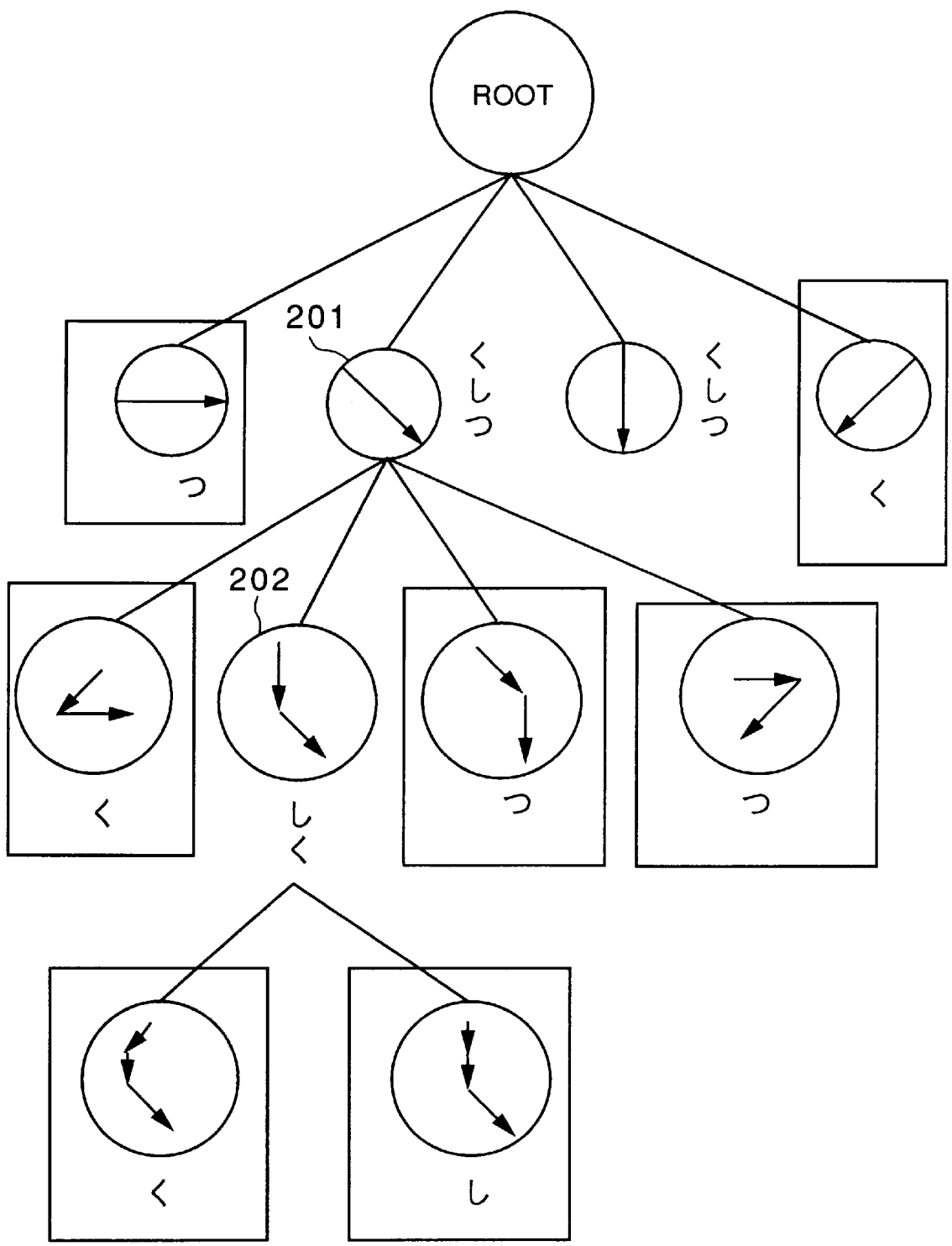
FIG. 8 is a diagram showing an example data configuration of the classification tree for the on-line handwritten character recognition dictionary in the first embodiment.

Firstly, in a step S1000, a noticed node is set as a root node as shown in FIG. 8.

In a step S1001, the set noticed node is checked for the three conditions set forth below:

1. A training stroke exists.
2. Training patterns of only one category exist.
3. Training patterns of a plurality of categories exist.

If the condition of 1 is satisfied, then the program proceeds to a step S1002. If the condition of 2 is satisfied, then the program proceeds to a step S1005. If the condition 3 is satisfied, then the program proceeds to a step S1006.

In the step S1002, the node is deleted from the classification tree.

In a step S1003, all other nodes are checked if they have turned to leaf nodes. If the checking result is YES, then the program terminates the processing; if the checking result is NO, then the program proceeds to a step S1004 where it selects another node as the noticed node. Then, the program goes back to the step S1001 to repeat the same processing.

In the step S1005, the node is assigned the category number as a leaf node. The program then proceeds to the step S1003.

In the step S1006, one vector is selected from a vector string included in the node according to the aforesaid entropy standard.

In a step S1007, the branch of a pair of vectors of a layer under the selected vector is generated.

Figure 11:
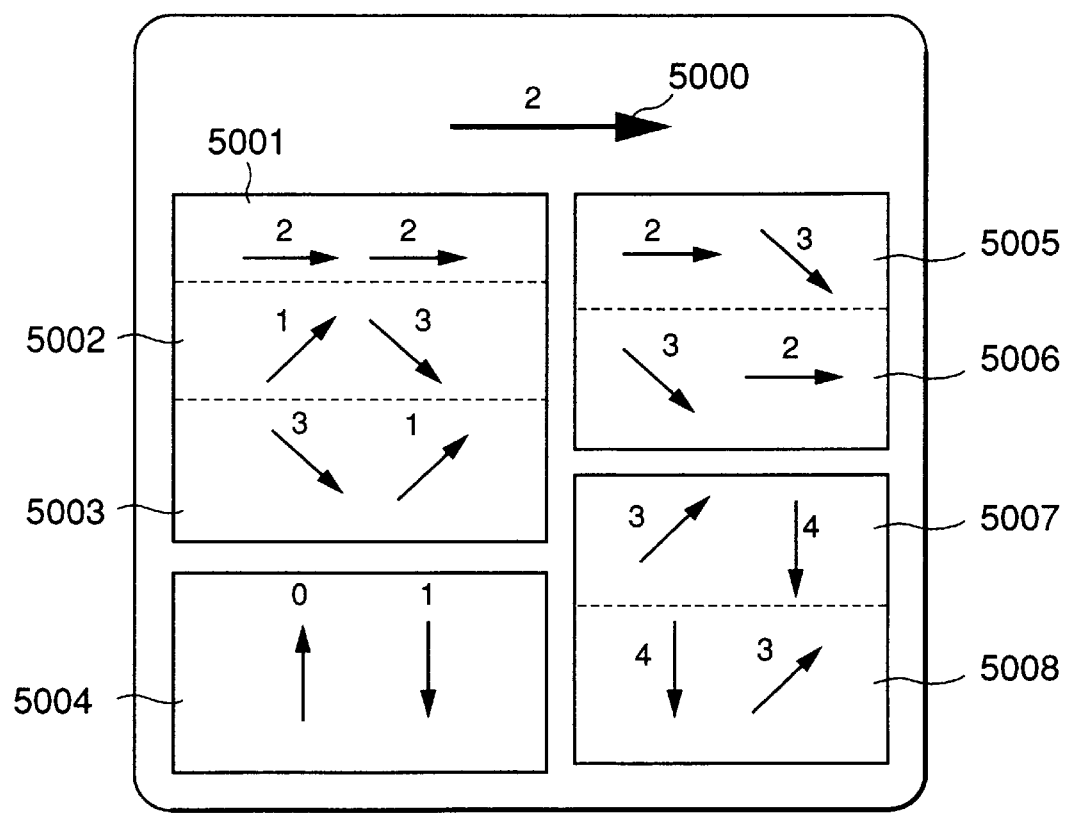
FIG. 11 is a diagram illustrating an example for the first embodiment of the generation of branches at step S1007 in FIG. 10.

FIG. 11 illustrates the processing implemented in this step; it shows the examples of the pairs of vectors in the lower layer.

Referring to FIG. 11, it is assumed that 5000 denotes a vector which has been selected in the step S1006 and which has a direction "2". There are eight different pairs of vectors in a lower layer, namely, 5001, 5002, 5003, 5004, 5005, 5006, 5007, and 5008, that are matched to the vector 5000. Branches which take these pairs of vectors as new nodes are generated.

The above has described a specific example of processing carried out in the step S1007.

In the following step, the program goes to a step S1008 where it sets one of the nodes of the generated branches as the next noticed node, then it goes back to the step S1001 to repeat the same processing.

Generating the classification tree as shown in FIG. 8 according to the procedure described above makes it possible to generate a classification tree which reflects detailed characteristic differences among similar categories while maintaining general classification of the stroke patterns which have many characteristics. Quick recognition of characters with a high recognition rate can be achieved by referring to the generated classification tree.

In this embodiment, the method for generating the dictionary for online handwritten character recognition in accordance with the present invention has been described on the assumption that there is one training stroke. It is obvious, however, that the same processing according to the embodiment can be applied to process each stroke in a system which takes more than one stroke for an input character in actual use.

The generation of the classification tree shown in FIG. 8 will be described in further detail.

FIG. 8 is a diagram which adds the lower layers to the layers shown in FIG. 7; it omits the branches which have been deleted. The branches enclosed in boxes (□) shown in FIG. 8 indicate that they are leaves.

All branches other than the leaves will be the nodes; therefore, further branch development will be implemented. FIG. 8 shows the result of the further branch development related to a second node (201) from the left.

In the second node (201) from the left, three types of categories, namely, "⟨", "⌊", and "⌒" coexist, requiring the development of branches.

There is only one vector (the circled vector) that represents the state of the node; therefore, the vector to be developed is uniquely decided. The pair of vectors to be developed is based on the pairs of vectors shown in FIG. 6. Specifically, a branch is developed to correspond to the eight combinations of the two vectors in the lower layer, the vector of an upper layer of which can be the vector in the bottom right direction (No. 3). This state means that the vectors have been developed to the second layer in FIG. 5.

Further, a node (202) of a second branch from the left in development includes two categories, namely, "⌊" and "⟨". Thus, further branch development is necessary. It is assumed that the first vector of the two vectors representing the node has been selected to be developed as a result given in the step S107 for discriminating a development vector. Then, eight branches are developed as is the case with the upper layer in relation to the state of the first vector, and some branches are deleted, some branches are turned into leaves, and some branches are turned into nodes. The branches which have turned into nodes must be further developed until the ends of all branches are eventually turned into leaves.

Figure 12:
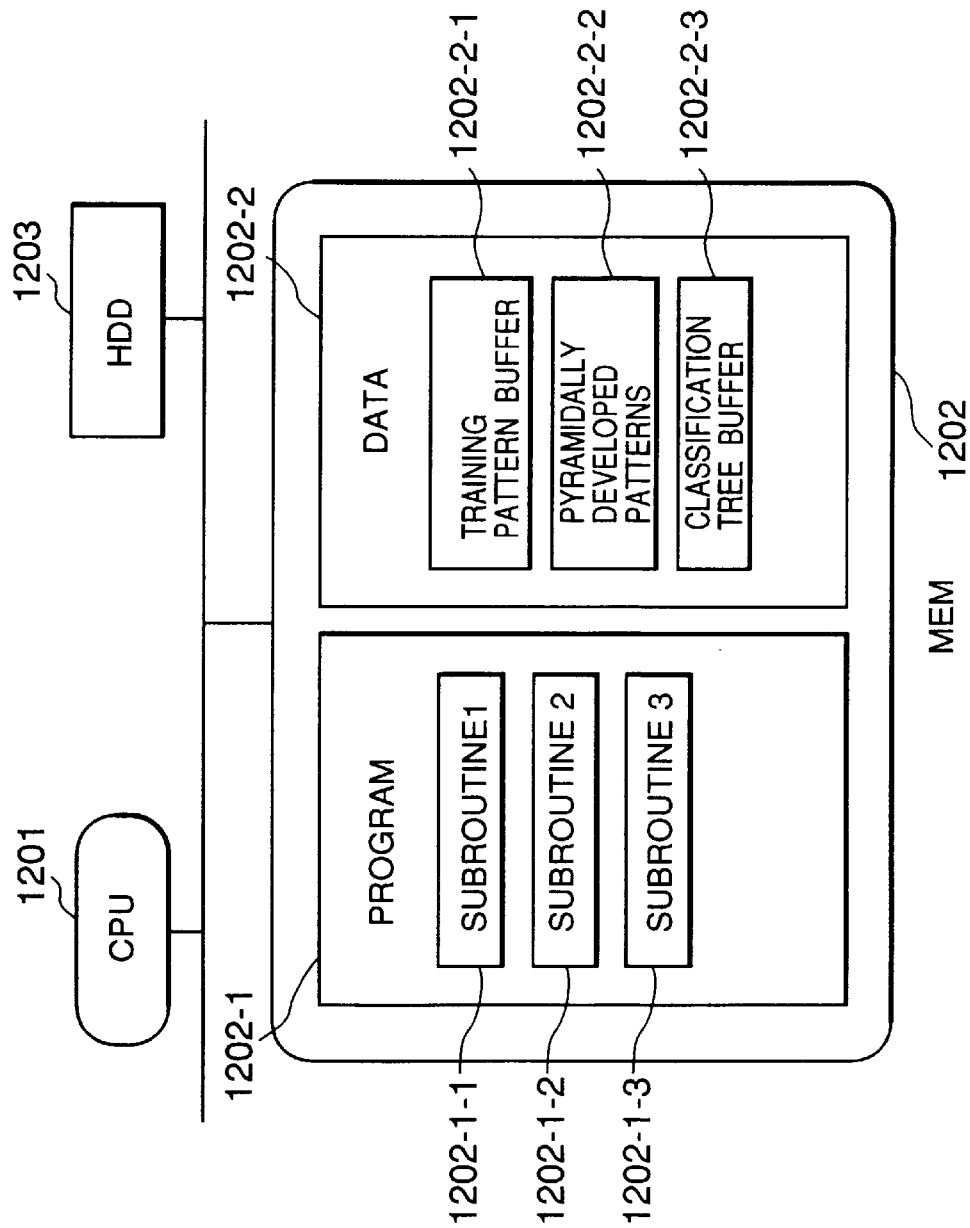
FIG. 12 is a diagram illustrating a first arrangement of the apparatus according to the first embodiment.

FIG. 12 primarily shows the configuration inside a memory in an information processing unit to which the online handwritten character recognizing method in accordance with the embodiment is applied. A CPU 1201 corresponds to the CPU denoted by 403 in FIG. 1; it executes various types of processing described in this embodiment in accordance with control programs stored in a memory 1202 which will be discussed later. The control program for implementing the processing illustrated by a flowchart which will be described later is also stored in the memory 1202 and executed by the CPU 1201.

The memory 1202 has a program section 1202-1 for storing the control programs for the CPU 1201 to execute various types of processing and a data section 1202-2 for storing various parameters and data. The program section stores, for example, the individual parts of the flowchart shown in FIG. 10 as subroutine programs 1202-1-1 through 1202-1-3. The subroutine programs include the processing program used in S1001 for discriminating the state of a noticed node, the processing program used in S1002 for deleting a node, the processing program used in S1005 for a leaf node, the processing program used in S1006 for selecting a proper vector, the processing program used in S1007 for generating a branch of pairs of vectors, and the program for recognizing an input pattern by referring to a generated classification tree; these subroutine programs for the respective types of processing are stored in the program section 1202-1. When executing each processing which will be discussed later, a control program is read from the memory 1202 as necessary for the CPU 1201 to execute the processing. The data section 1202-2 has a training pattern buffer 1202-2-1 for tentatively holding individual training patterns, an area 1202-2-2 for holding pyramidally developed patterns of vector data obtained from respective training patterns, and a classification tree buffer 1202-2-3 for holding a classification tree which is being generated.

A hard disk drive (HDD) 1203 holds all training patterns and also holds the data on a classification tree generated by the method described in this embodiment.

The memory 1202 may be a built-in ROM, RAM, HD, or the like. The programs and data may be stored beforehand in the memory, or the programs or data may be read prior to processing from a storage medium such as a floppy disk (FD) or CD-ROM which may be removed from the main body of the apparatus. As another alternative, such programs or data may be read from another apparatus via a public line, LAN, or other communication means.

<Character Recognizing Method Based on a Generated Classification Tree>

In a second embodiment, a description will be given to a method for online handwritten character recognition by referring to a classification tree generated by the processing procedure which has been described in the foregoing embodiment.

Figure 9:
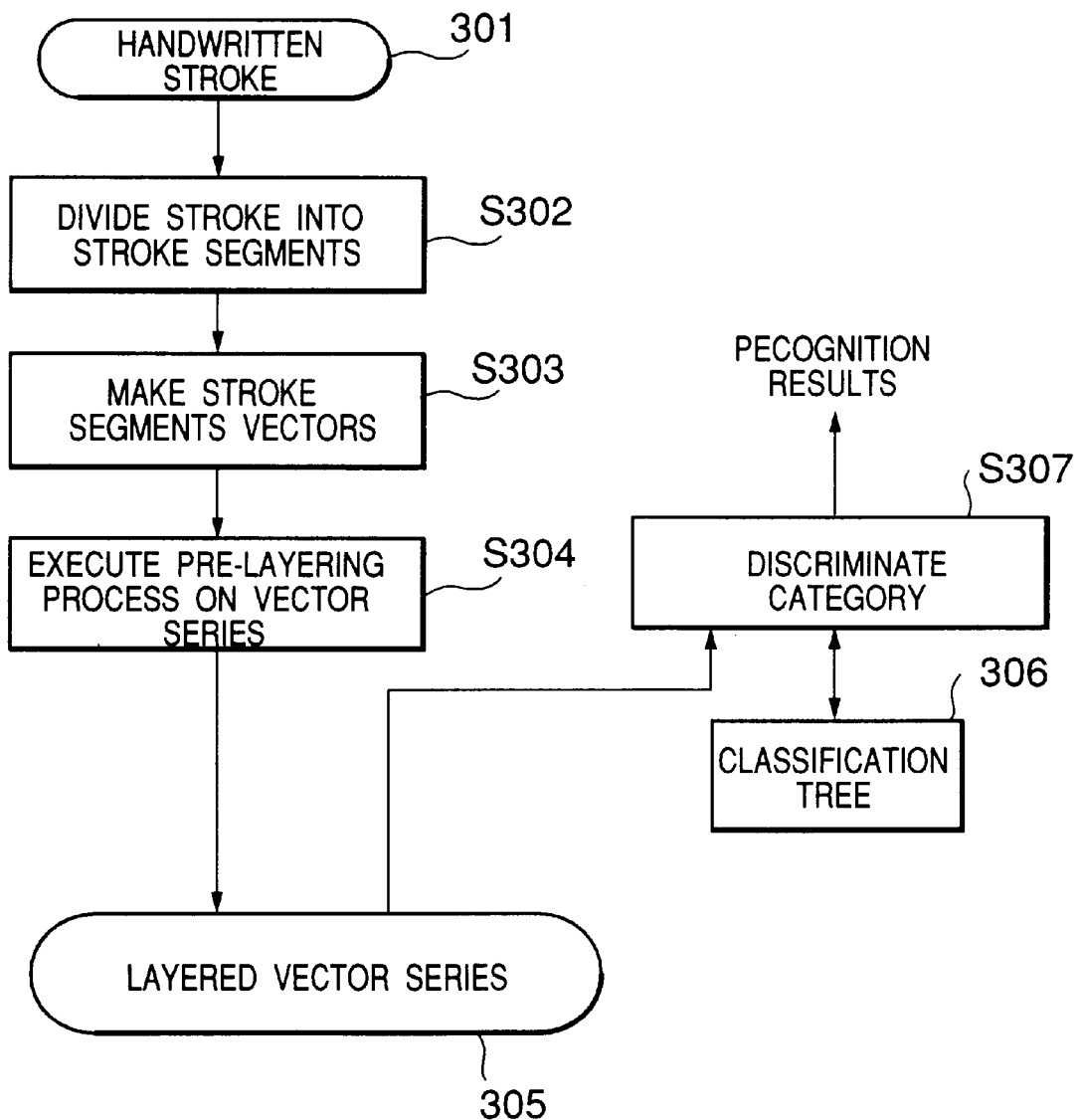
FIG. 9 is a flowchart showing an on-line handwritten character recognition method for the first embodiment.

FIG. 9 shows a flowchart which provides a best illustration of the processing procedure.

In FIG. 9, reference character 301 denotes the data of a handwritten stroke entered by a user. The handwritten stroke is identical to the training stroke 101 shown in the first embodiment.

A step S302 is the step for dividing the handwritten stroke into stroke segments.

A step S303 is the step for making the stroke segments vectors, wherein the stroke segments resulting from the process in the preceding step are turned into vectors.

A step S304 is the step for pre-layering vector series obtained in the preceding step for making the stroke segments vectors.

Reference character 305 denotes a layered vector series which has undergone the process of the pre-layering step.

A step S307 is a category discriminating step for determining the category of the handwritten stroke 301 according to the layered vector series 305 by referring to the classification data given by a classification tree 306.

The classification tree 306 is a classification tree which provides the information necessary for classifying categories; it should be the classification tree which can be generated using the method described in the first embodiment.

The same three types of processing used in the step S102 for dividing a stroke into stroke segments, the step S103 for making stroke segments vectors, and the step S104 for pre-layering are used for the foregoing step S302 for dividing a stroke into stroke segments, the step S303 for making stroke segments vectors, and the step S304 for pre-layering, respectively.

There were as many layered vector series 305 as the training patterns in the first embodiment, while there is only one that is derived from the handwritten stroke in this embodiment.

In the category discriminating step S307, when a leaf is reached after tracing the layered vector series 305 according to the classification tree shown in FIG. 8, the category existing in the leaf is output as a recognition result.

Figure 13:
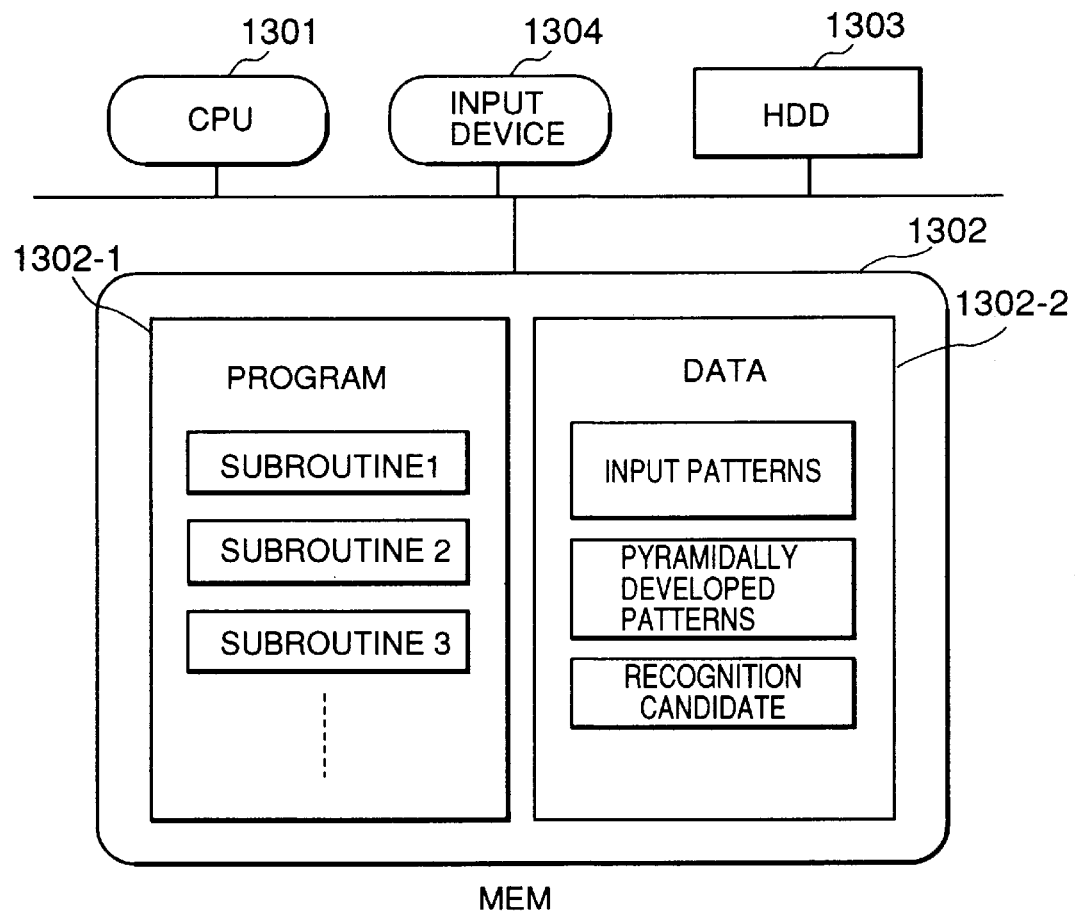
FIG. 13 is a diagram illustrating a second arrangement of the apparatus according to the first embodiment.

FIG. 13 primarily shows the configuration inside a memory in an information processing unit to which the online handwritten character recognizing method in accordance with the embodiment is applied. A CPU 1301 corresponds to the CPU denoted by 403 in FIG. 1; it executes various types of processing described in this embodiment in accordance with control programs stored in a memory 1302 which will be discussed later. The control program for implementing the processing illustrated by a flowchart which will be described later is also stored in the memory 1302 and executed by the CPU 1301.

The memory 1302 has a program section 1302-1 for storing the control programs for the CPU 1301 to execute various types of processing and a data section 1302-2 for storing various parameters and data. The program section stores, for example, the individual parts of the flowchart shown in FIG. 9 as subroutine programs. The subroutine programs include the processing program used in S302 for dividing a stroke into stroke segments, the processing program used in S303 for making stroke segments vectors, the processing program used in S304 for pre-layering, and the processing program used in S307 for discriminating a category; these subroutine programs for the respective types of processing are stored in the program section 1302-1. When executing each processing which will be discussed later, a control program is read from the memory 1302 as necessary for the CPU 1301 to execute the processing. The data section 1302-2 has a buffer for holding patterns entered by the user, an area for holding a pyramidally developed pattern of vector data obtained from the entered pattern, and a buffer for holding a recognition candidate of the input pattern.

A hard disk drive (HDD) 1303 holds the data on a classification tree generated by the method described in the preceding embodiment.

The memory 1302 may be a built-in ROM, RAM, HD, or the like. The programs and data may be stored beforehand in the memory, or the programs or data may be read prior to processing from a storage medium such as FD or CD-ROM which can be removed from the main body of the apparatus. As another alternative, such programs or data may be read from another apparatus via a public line, LAN, or other communication means.

Thus, according to this embodiment, extremely quick online handwritten character recognition can be achieved with a high recognition rate by employing the generated stroke vector classification tree which successfully reflects the competitive relationship among categories.

(Second Embodiment)

In a second embodiment, an example will be described in which an N-gram table is generated according to a classification tree which has been generated by layering training patterns.

In the layering process of training patterns in accordance with this embodiment, the characteristics of the training pattern will be degenerated in steps.

In generating the classification tree according to this embodiment, a variable is selected which ensures the severest competition among categories in an upper layer and good separation of the categories in a layer immediately thereunder, and the foregoing degenerated variable is developed toward lower layers.

The training stroke in this embodiment is divided and the stroke segments resulting from the division is turned into vectors, and the resulting vector series are pyramidally layered to make layered vector series. The layered vector series are used to generate a classification tree, and the N-gram table is generated according to the generated classification tree.

In the pre-layering process according to the second embodiment, the vector series information constituting the training stroke is degenerated in steps.

In the classification tree generating process according to this embodiment, a vector is selected which ensures the severest competition among categories in an upper layer and good separation of the categories in a layer immediately thereunder. Based on the result, the degenerated vector is developed toward the lower layers.

Further, in the embodiment, a sentence entered by the user is recognized by referring to the generated N-gram table.

In conjunction with the accompanying drawings, an information processing apparatus according to this embodiment of the present invention will now be described in detail.

<In the Case of an Image>

Figure 14:
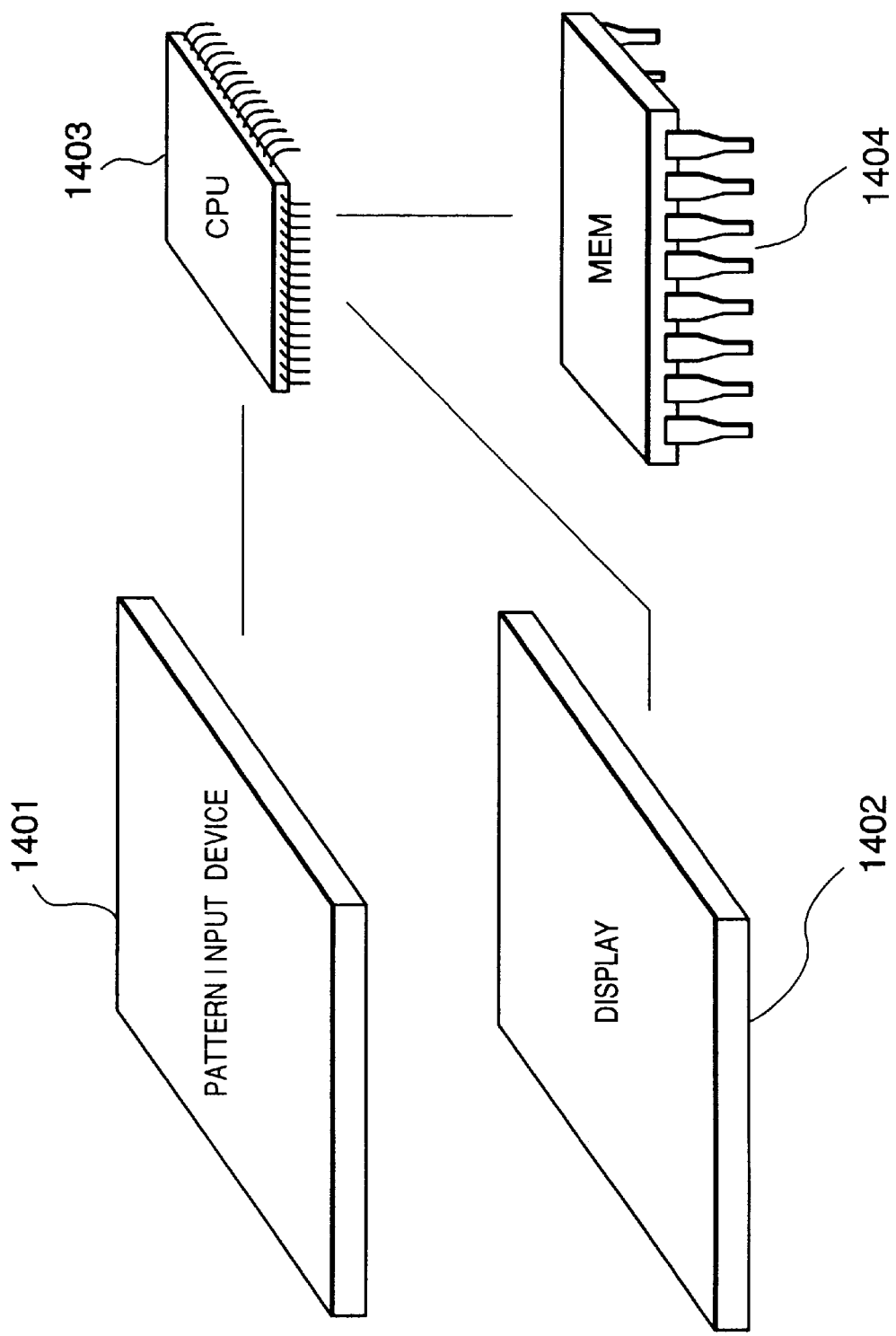
FIG. 14 is a block diagram illustrating the arrangement of an apparatus according to a second embodiment.

FIG. 14 is a block diagram showing the configuration of an information processing apparatus to which the pattern recognition system involved in the following entire embodiment of the present invention will be applied.

A pattern recognition apparatus is comprised of a pattern input device 1401, a display 1402, a central processing unit (CPU) 1403, and a memory 1404.

The pattern input device 1401 has, for example, a digitizer and a pen if it is adapted for online character recognition; it hands the coordinate data of a character or graphic drawn using the pen on the digitizer over to the CPU 1403. The pattern input device may be a scanner, microphone, etc. as long as it enables the input of a pattern, which is to be recognized, as an image.

The display 1402 displays the pattern data entered in the pattern input device 1401 and a result of the recognition by the CPU 1403.

The CPU 1403 recognizes an entered pattern and also controls all the-devices involved.

The memory 1404 stores a recognition program or a dictionary employed by the CPU 1403 and also tentatively stores entered patterned data, variables used by the recognition program, etc.

Figure 15:
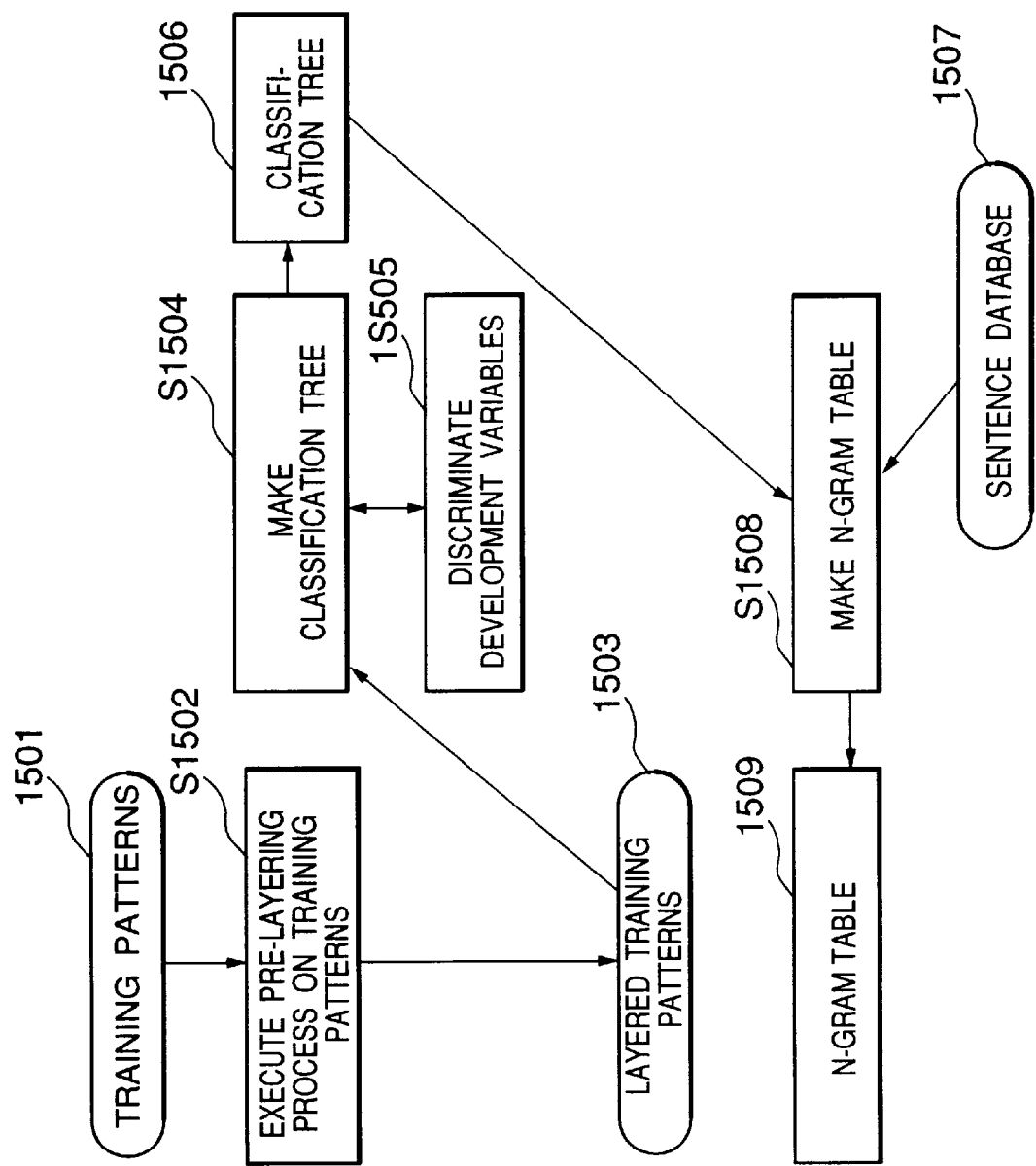
FIG. 15 is a conceptual diagram showing information processing according to the second embodiment.

FIG. 15 is a conceptual diagram illustrating the information processing procedure of the embodiment in accordance with the present invention. Reference character 1501 denotes training patterns, and S1502 denotes a pre-layering step for applying the training patterns 1501 to a neural network. Reference character 1503 indicates layered training patterns which have undergone the processing by the neural network; and S1504 indicates a step for generating a classification tree according to the layered training patterns 1503.

Reference character S1505 denotes a step for discriminating development variables used in the process of generating a classification tree in the classification tree generating step S1504.

Reference character S1506 indicates a classification tree generated by the processing implemented in the step S1504.

Reference character S1507 indicates a sentence database; the sentence database includes a variety of sentence patterns generally used. The sentence database is accessed in an N-gram generating step, which will be discussed later, for determining a prior probability with a classification tree which has been generated in advance.

Reference character S1508 indicates an N-gram table generating step for generating an N-gram table 1509 according to the sentence database 1507 and the classification tree 1506. The inputs in this embodiment are the training patterns 1501 and the sentence database 1507 and the output thereof is the N-gram table 1509.

Referring now to FIG. 16 through FIG. 20, the processing procedure in accordance with the embodiment will be described in detail.

Figure 18:
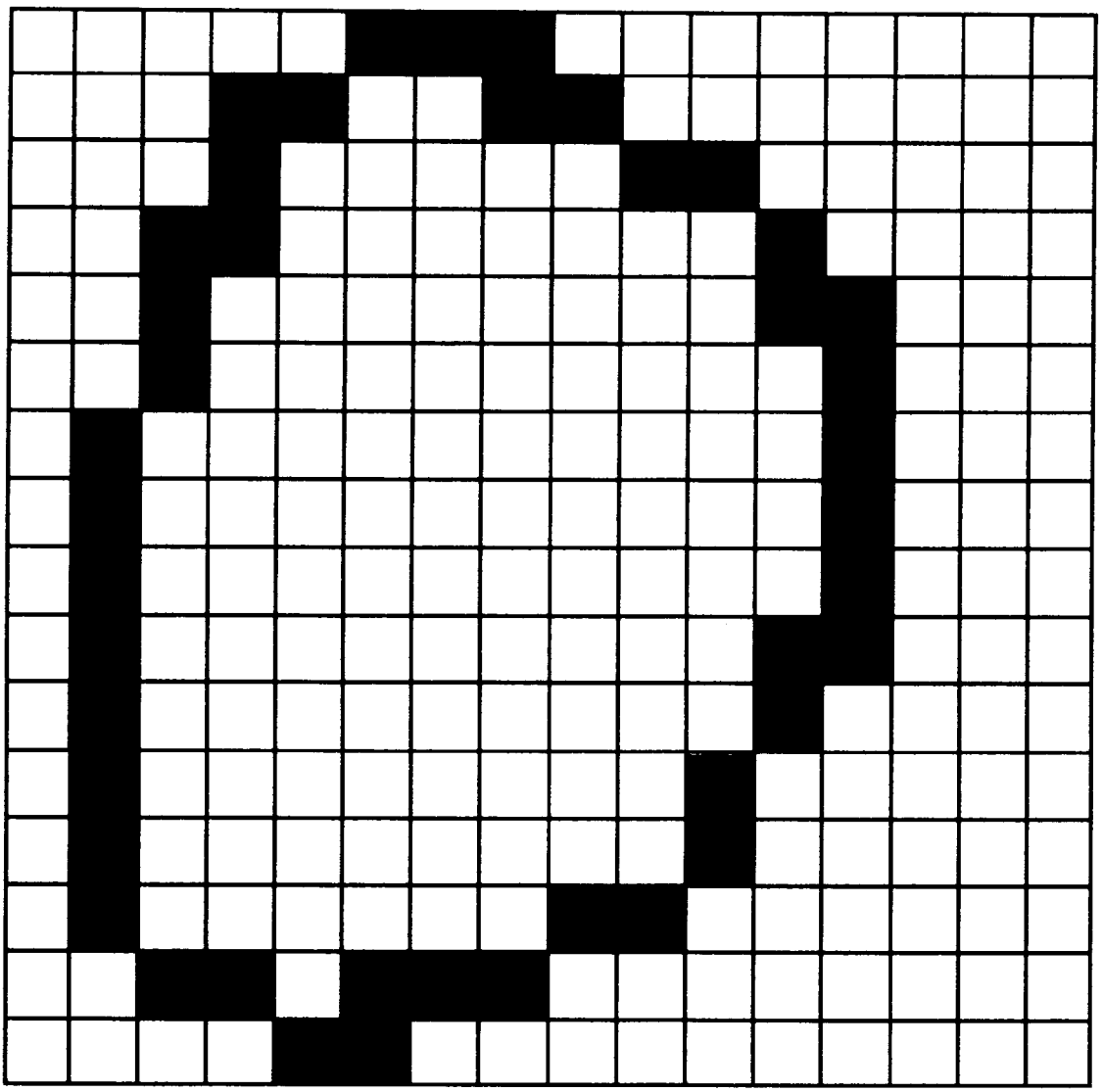
FIG. 18 is a diagram illustrating an example training pattern according to the second embodiment.

Firstly, it is assumed that there are ten numeral patterns from 0 to 9 written as input patterns on a 16×16 mesh. An example of the input pattern of 0 is shown in FIG. 18.

There are 100 training patterns each for 0 to 9 for generating a dictionary. These are named as:

LTi,j (Learning Template i,j)

where i denotes a suffix representing a category and it takes a value in the following range:

$0 \leq i \leq 9$ where j denotes a suffix representing a training pattern number and it takes a value in the following range:

$1 \leq j \leq 100$

Figure 16:
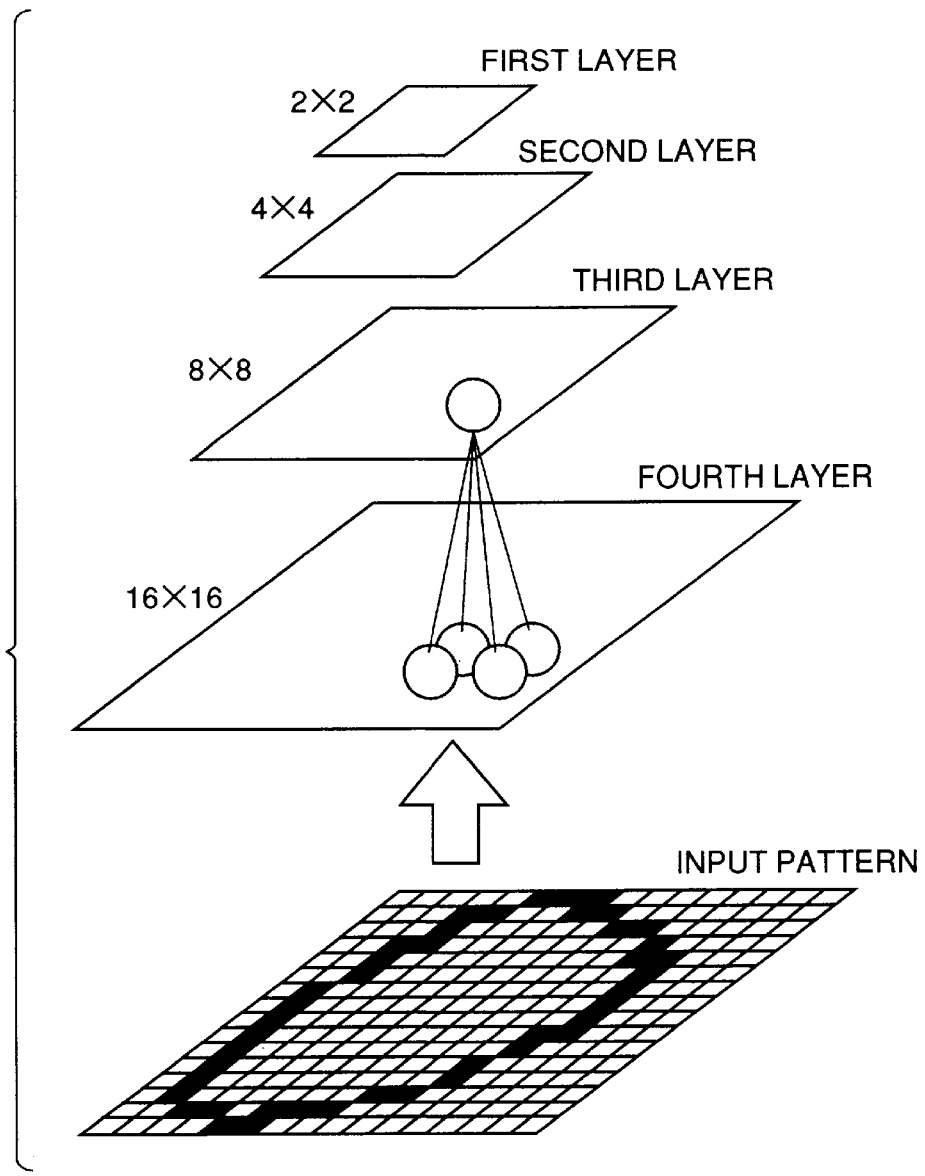
FIG. 16 is a diagram illustrating a neural network having a pyramid shape that is a part of the processing in the second embodiment.
Figure 17:
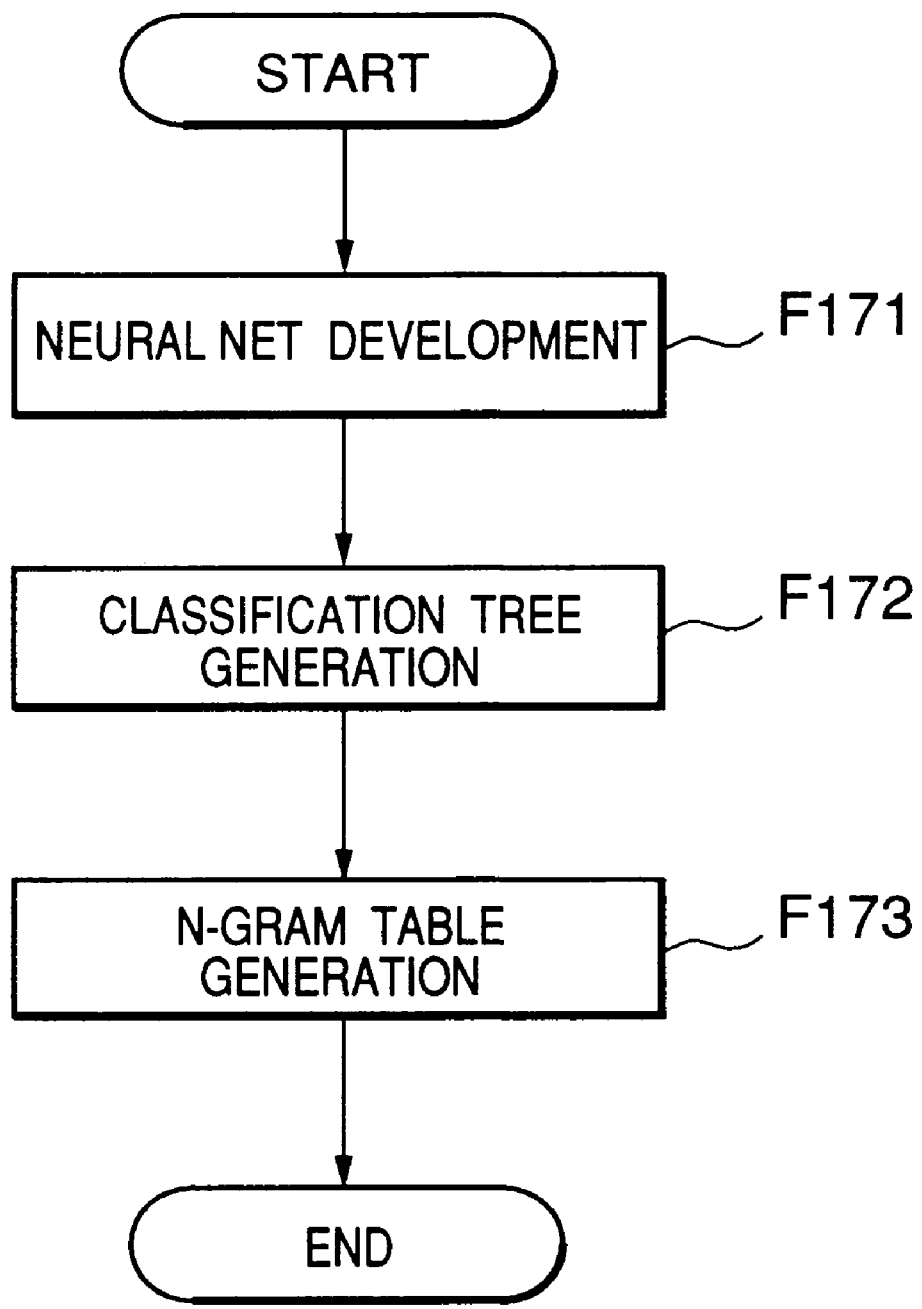
FIG. 17 is a flowchart showing information processing according to the second embodiment.

A four-layer neural network as shown in FIG. 16 is configured.

The four layers shown in FIG. 16 are respectively composed of groups of neurons of 2×2, 4×4, 8×8, and 16×16 pieces from the top layer to the bottom layer.

The method for generating a dictionary for pattern recognition is composed of three steps, namely, a neural net development step, a classification tree generating step, and an N-gram table generating step. Each of these steps will be described in order with reference to FIG. 17.

(F171) Neural Net Development Step

Firstly, the training template is input to the bottommost layer of 16×16 neurons shown in FIG. 16. At this time, it is assumed that the neurons in the white portion of the input pattern (LTi,j) are OFF, while the neurons in the black portion are ON. Hereafter, "black" will means that the neurons are ON, and "white" will mean that the neurons are OFF.

The configuration of the neural net is extremely simple; if any one neuron that is ON exists in the 2×2 neurons of a lower layer, then one neuron of the layer immediately above the layer should be ON. This rule applies in processing the input pattern upward.

Figure 19:
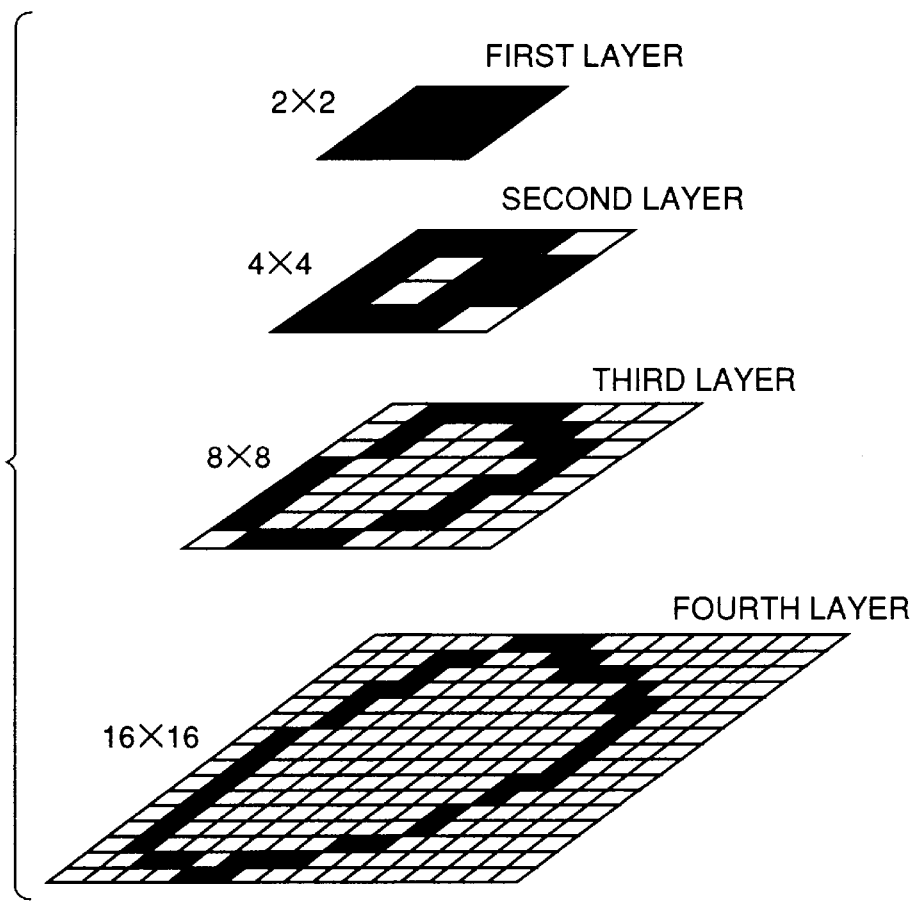
FIG. 19 is a diagram illustrating an example of layered training patterns according to the second embodiment.

FIG. 19 shows a result of the processing carried on the training template shown in FIG. 18.

Eventually, the characteristic space of the input pattern forms a 256-dimensional hypercubic lattice which has $2^{256}$ different combinations of data.

The number of combinations of data will be $2^4$ in a first layer, $2^{16}$ in a second layer, and $2^{64}$ in a third layer.

The configuration of the neural net is not limited thereto.

(F172) Classification Tree Generating Step

In the neural net development step F171, all training templates (LTi,j) are developed to the neural net shown in FIG. 16. The classification tree is generated from top to bottom, which is opposite from the case of the neural net development.

The node of the rule begins with a neuron which virtually exists above the topmost layer (2×2) shown in FIG. 16.

As a result of developing the training templets (LTi,j), some neurons of the topmost layer (2×2) shown in FIG. 16 are ON. In other words, the topmost layer (2×2) is not completely turned OFF unless a completely white training template exists.

Thus, the neurons of the topmost layer which virtually exists are ON relative to all the training templates (LTi,j).

Figure 20:
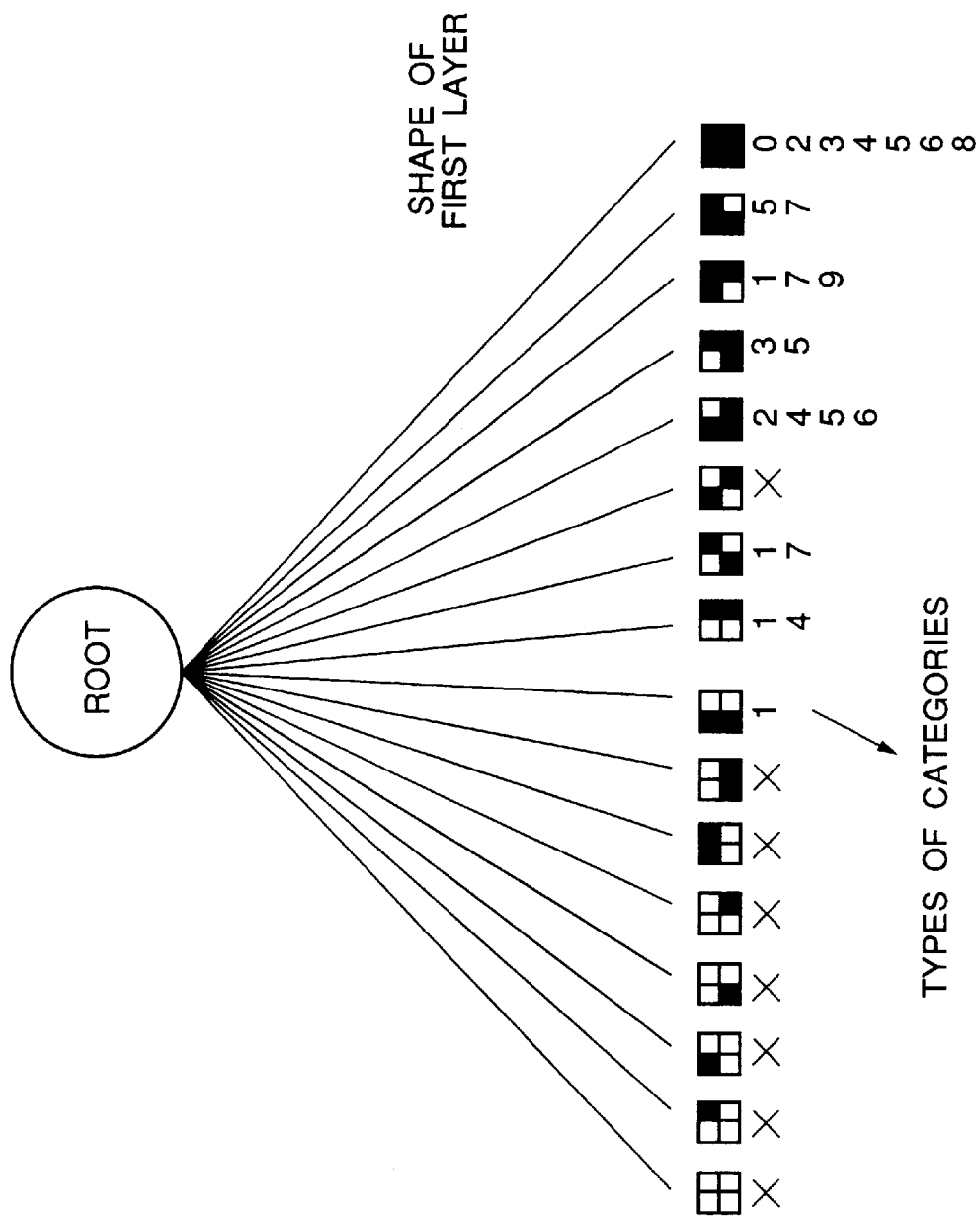
FIG. 20 is a diagram showing a classification tree generation process according to the second embodiment.

There are $2^4$=16 states of the topmost layer (2×2). To be more accurate, there are 15 states since not all neurons are OFF as described above; therefore, 16 branches extend from a root node as shown in FIG. 20.

At this time, the number of the training templates (LTi,j) which are present in the branches is counted. Depending on the counting result, one of the following three types of processing will be implemented:

(1) If no training template (LTi,j) exists in a branch, then that particular branch is removed.

(2) If the templates of only a certain category (e.g. "1") out of the training templates (LTi,j) exist, then that particular branch is set as a leaf and assigned the category number (e.g. "1").

(3) In other case than the cases described in (1) and (2) above, that is, if templates of a plurality of categories are mixed, then that particular branch is set as a node to continue the generation of the classification tree.

FIG. 20 shows the processing result.

The branch states are indicated by showing the ON/OFF of the neurons of the topmost (first) layer of FIG. 16. Specifically, the black portion indicates the neurons that are ON, while the white portion indicates the neurons that are OFF.

The branches with "X" indicated in the column showing the types of categories correspond to the case (1) where no training templates (LTi,j) exist, and therefore they are eliminated.

Strictly speaking, the leftmost branch does not extend from the root.

The eighth branch from the left has the training templates of only the category 1. This corresponds to the case (2) where the templates of only one particular category (e.g. "1") of the training templates (LTi,j) exist, so that the branch is turned into a leaf.

For instance, the twelfth branch from the left has the training templates of the categories 2, 4, 5, and 6; this corresponds to the case (3) rather than the case (1) or (2), namely, the templates of a plurality of categories are mixed. Thus, this branch provides a node.

The following will describe how to generate branches from the node.

The most efficient method for generating branches from the node will be described. The most efficient method should enable as much information as possible on categories to be obtained when branches are developed.

Generally, there are so many ways to develop the branches under such conditions that it is difficult to decide which one to adopt. This has been hitherto an obstacle to successful generation of a classification tree used for recognition.

An attempt will be made to limit the branches to be developed from the node to only one branch wherein the neurons that are ON are developed to lower layers at this node.

For instance, in the case of the twelfth branch from the left shown in FIG. 20, one of the three neurons, namely, the top left, bottom left, and bottom right neurons of the first layer shown in FIG. 16, is selected, and the branch related to the states of the neurons under the selected neuron, i.e. the states of the bottom four neurons of the second layer of FIG. 16, is developed. This permits significantly reduced time for the calculation required to develop the branch. In addition, such limitation essentially exerts no serious damage to the classifying performance of the classification tree to be generated.

A description will now be given to a method for selecting a neuron among the neurons that are ON at the node, which neuron enabling highest efficiency in the development.

The number of the training templates of category No. i among the training templates (LTi,j) which exist in a certain node is denoted as Ni. When the total number of the training templates existing in the node is denoted as N, then the existence probability pi of each category in the node can be expressed as follows:

$$pi=Ni/N$$

where $$N = \sum_{i=0}^{9} N_i$$

Therefore, the entropy at the time when the information on the node is obtained will be represented by the following expression:

$$Entropy_{node} = -\sum_{i=0}^{9} p_i \log(p_i) = -\sum_{i=0}^{9} \frac{N_i}{N} \log\left(\frac{N_i}{N}\right)$$ Expression (6)

$$= \frac{1}{N} \sum_{i=0}^{9} N_i (\log N - \log N_i)$$

Then, one of the neurons which are ON at this node is selected and the decrement of the entropy when a branch is developed therefrom is calculated.

As described above, the number of the branches developed from the single neuron toward lower layers is sixteen. The distribution of the training templates (LTi,j) among the sixteen branches is indicated by the number of the training templates (LTi,j) which exist in the developed branches, i.e.;

Ni,b where i of Ni,b denotes a category number and b denotes the branch number.

At this time, the entropy at which the information on each branch is obtained is represented by the following expression as is the case with the foregoing discussion:

$$Entropy_{branch} = -\sum_{i=0}^{9} p_i \log(p_i) = -\sum_{i=0}^{9} \left(\frac{N_{i,b}}{N_b}\right) \log \frac{N_{i,b}}{N_b}$$ Expression (7)

$$= \frac{1}{N_b} \sum_{i=0}^{9} N_{i,b} (\log N_b - \log N_{i,b})$$

In this expression, $$N_b = \sum_{i=0}^{9} N_{i,b}$$

indicates the total number of the training templates (LTi,j) which exist in the branches.

The probability of distribution into each branch is expressed by:

Nb/N where N is identical to N in the expression (6), and therefore, the average entropy at the time when the branches are developed is represented by the following expression:

$$\overline{Entropy_{branch}} = \frac{1}{N} \sum_{b=1}^{16} \sum_{i=0}^{9} N_{i,b} (\log N_b - \log N_{i,b})$$ Expression (8)

The average decrement of the entropy is obtained by:

EntropyDecrease=Entropy$_{node}$-$\overline{Entropy_{branch}}$   Expression (9)

A value obtained by dividing this value by the number of the branches as shown below represents the classification efficiency when the branches are developed:

$$\frac{EntropyDecrease}{BranchNumber}$$   Expression (10)

A neuron which gives this value a maximum value is selected to develop the branches.

The branches may be developed in relation to a group of a plurality of neurons rather than developing only one neuron.

In this case, BranchNumber in the expression (10) will be obtained by multiplying the number of neurons by 16. Technically, it is impossible to expect a state where all neurons of the lower layers involved in the development are OFF; therefore, BranchNumber will be the number of neurons multiplied by 15.

In this embodiment, the value obtained in the expression (10) is adopted as the value which indicates the classification efficiency when the branches are developed; however, it is obvious that the value is not limited to the one obtained by the expression (10) as long as it is a function representing the development efficiency of branches such as "Ginicriterion" described in the literature titled "Classification and Regression Trees".

Thus, once a neuron or a set of neurons to be developed are decided, the branches are developed and leaves and nodes are generated accordingly.

Lastly, when all neurons have been turned into leaves, the classification tree is completed.

FIG. 8 shows the contents of the classification tree which has actually been generated.

FIG. 8 gives more details of FIG. 7; it omits the deleted branches. The circled branches in FIG. 8 indicate that they are leaves.

Figure 21:
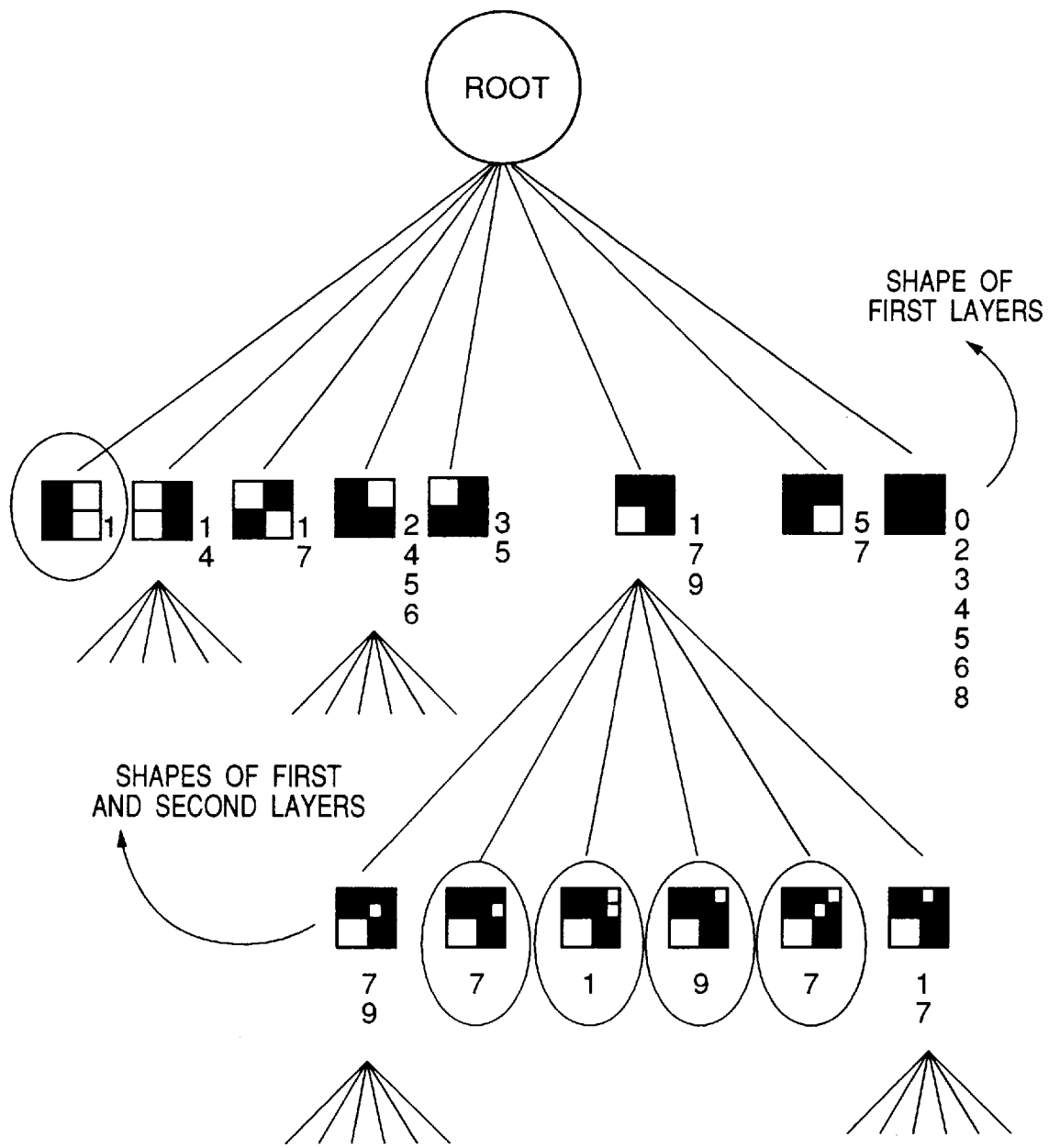
FIG. 21 is a diagram illustrating an example classification tree that is generated according to the second embodiment.

All branches other than the leaves will turn into nodes; therefore, further branch development will be implemented. FIG. 21 shows the result of the further branch development related only to the third node from the right.

In the third node from the right, three types of categories, namely, "1", "7", and "9" coexist, requiring the development of branches. It is assumed that the top right neuron of the first layer has been selected to be developed in the first layer as a result given in the step S1505 (FIG. 15) for discriminating a development variable.

Then, $2^4$=16 branches are developed as is the case shown in FIG. 20 in relation to the state of the top right neuron, and some branches are deleted, some branches are turned into leaves, and some branches are turned into nodes.

The branches which have turned into nodes must be further developed until the ends of all branches are eventually turned into leaves.

In FIG. 21, for the purpose of clarity, the first layer and the second layer are superimposed to show the development result of the third node from the right. Actually, these states are represented by the four neurons of the first layer and the four top right neurons of the second layer of the neural net illustrated in FIG. 16.

(F173) N-gram Table Generating Step

As illustrated in FIG. 21, the first layer of the classification tree obtained as a result of the classification tree generating step (F172) is equivalent to the general classification of all categories to be recognized, the general classification being based on the shapes thereof.

Hence, generating an N-gram according to the category groups in the general classification should provide highly reliable state transition probability for less database. In this case, the category groups in the general classification are regarded as virtual category groups.

It should be noted, however, that the first layer of the classification tree obtained as a result of the classification tree generating step is not always exclusive.

For example, in FIG. 21, the category 1 exists in four branches or nodes. This phenomenon is generally known as "overlap classes" which is referred to, for instance, in a literature titled "A Survey of Decision Tree Classifier Methodology" (IEEE Transactions on Systems, Man, Cybernetics vol. 21, No. 3, May/June 1991).

There is a method for making the "overlap classes" exclusive: the branch which has the highest probability of the presence of a certain category is set as the branch dedicated to that particular category. Referring now to FIG. 21, if the probability of the category 1 being present is the highest in the second branch from the left, then the category 1 existing in the first, third, and sixth branches from the left is ignored.

Figure 22:
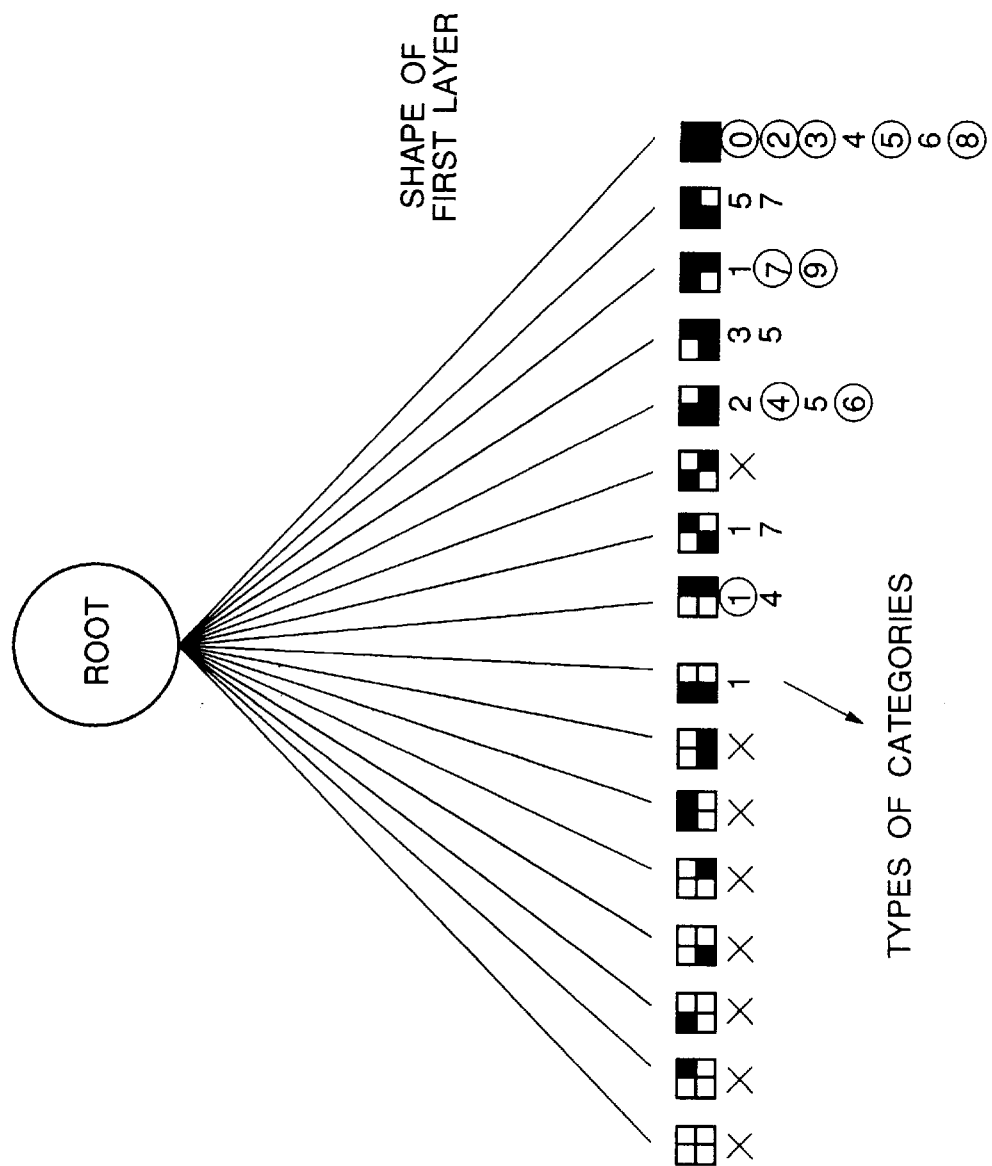
FIG. 22 is a diagram showing an example of the grouping of large categories according to the second embodiment.

An example of the category groups of the general classification thus generated is shown in FIG. 22.

In FIG. 22, the categories marked with circled numbers have the highest probabilities of presence.

For example, according to the diagram, a category 1 from the left forms a first category group, categories 4 and 6 form a second category group, categories 7 and 9 form a third category group, and categories 0, 2, 3, 5, and 8 form a fourth category group. As a result, the originally ten categories have been reduced to the four groups. These four groups are used as new virtual category groups to generate the N-gram.

The N-gram table thus generated can be incorporated in a general sentence recognition algorithm although it has been generated using the information of the classification tree which has been obtained by the classification tree generating step. This means that the N-gram table may be used to determine the prior probability of a sentence and a completely different recognition algorithm may be used for determining a post probability without using the foregoing classification tree.

Obviously, the N-gram table may be built in a publicly known algorithm such as DP matching or full search algorithm for recognizing a sentence by determining the prior probability of the sentence using the N-gram table so as to determine the prior probabilities of all patterns including all combinations of the pattern shapes constituting the sentence.

In the above description, the first layer of the classification tree has been regarded as the general classification tree category; however, the general classification category group may be comprised of any number of layers up to nth layer.

<In the Case of Strokes>

Figure 23:
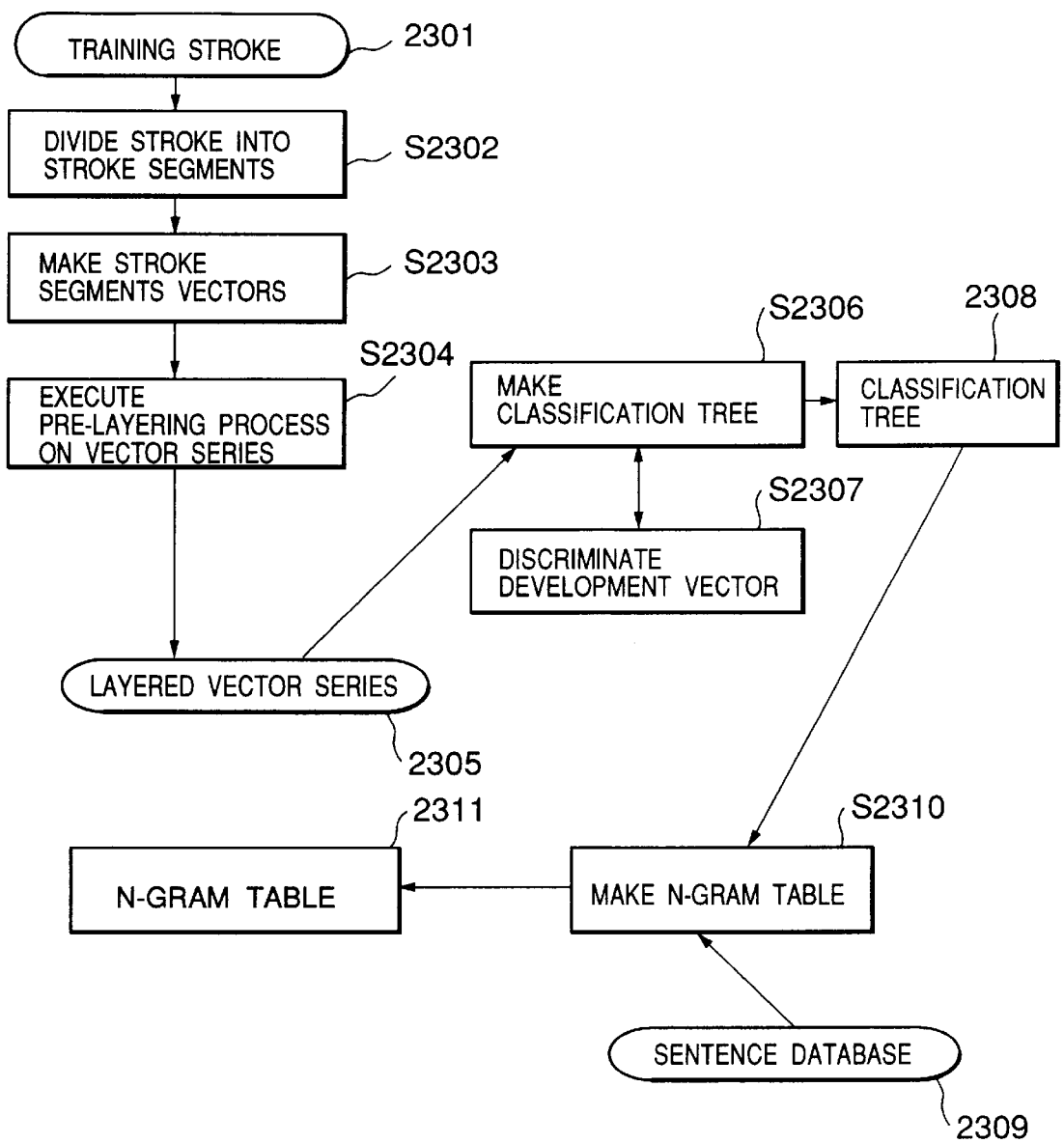
FIG. 23 is a flowchart illustrating second processing according to the second embodiment.

FIG. 23 illustrates the processing procedure according to the second embodiment.

Reference character 2301 denotes a training stroke; in a stroke dividing step S2302, the training stroke is divided into a plurality of stroke segments.

In a step S2303 for making the stroke segments vectors, the stroke segments resulting from the stroke dividing step S2302 are quantized into vectors.

In a pre-layering step S2304, vector series obtained as a result of the step S2303 for making the stroke segments vectors are layered to generate layered vector series 2305. This processing will be discussed in detail later.

In a classification tree generating step S2306, a classification tree 2308 is generated according to the layered vector series 2305.

A step S2307 for discriminating a development vector is implemented in the course of generating the classification tree in the classification tree generating step S2306.

In an N-gram table generating step S2310, an N-gram table 2311 is generated according to a sentence database 2309 and the classification tree 2308.

The input in the processing flowchart shown in FIG. 23 is a training pattern, i.e. the training stroke 2301, and the sentence database 2309, and the output is an N-gram, namely, the N-gram 2311.

Figure 24:
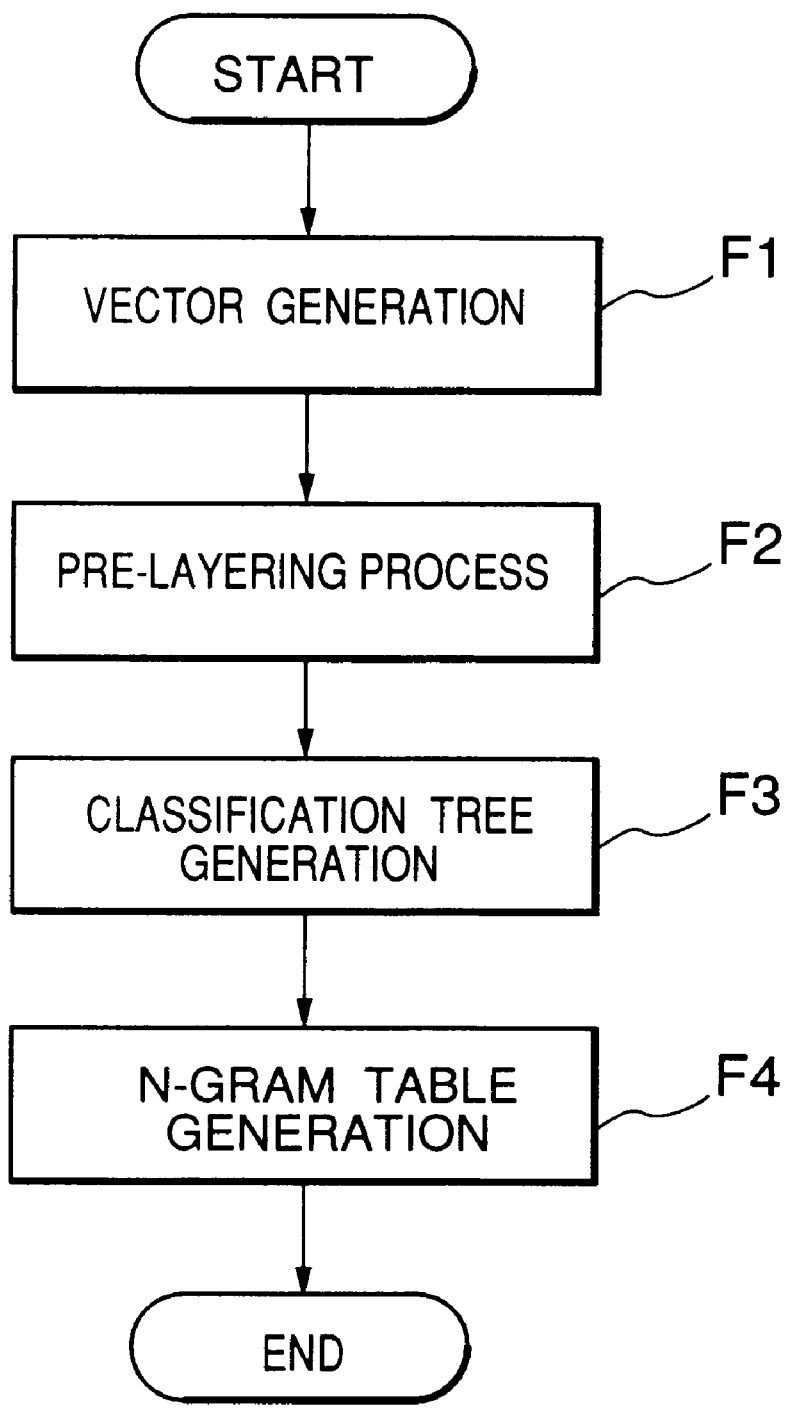
FIG. 24 is a second flowchart for the information processing according to the second embodiment.

Referring now to FIG. 24, the method for generating the N-gram will be described in detail.

For easier understanding of readers, three different characters "く", "し", and "つ" which read "ku", "shi", and "tsu", respectively, each of which is drawn in one stroke, will be taken as the examples representing the categories to be recognized.

It is assumed that there are one hundred training patterns each for "く", "し", and "つ", respectively, for generating the dictionary; these are denoted as follows:

TPi,j (Training Pattern i, j)
where i is a suffix denoting the category and it takes a value in the following range:
$0 \leq i \leq 2$ j is a suffix denoting a training pattern number and it takes a value in the following range:
$1 \leq j \leq 100$ As illustrated by the flowchart shown in FIG. 24, the method of generating the dictionary for online handwritten character recognition is composed of four steps, namely, a vector generation step, a pre-layering process step, a classification tree generation step, and an N-gram table generating step. The vector generation step, the pre-layering process step, and the classification tree generation step are identical to those that have been described in the first embodiment by referring to FIG. 3; therefore, only the N-gram table generating step will be described.

(F24) N-gram Table Generating Step

An N-gram table will be generated according to the classification tree which has been made as described in (F3) Classification tree generating step.

The unit of each element of the N-gram described above has been a word composed of one character; however, it is obvious that the unit may alternatively be a clause composed of a word or the like.

The present invention may be applied to a system constituted by a plurality of units or to an apparatus constituted by a single unit.

Apparently, an object of the present invention can be accomplished by supplying a storage medium, in which the program codes of software for implementing the functions of the foregoing embodiments have been recorded, to the system or apparatus, so that a computer, CPU, or MPU of the system or the apparatus can read the program codes from the storage medium and execute them.

In this case, the program codes themselves read from the storage medium would implement the functions of the embodiments, and the storage medium storing the program codes would constitute the present invention.

The storage medium for supplying the program codes may be a floppy disk, hard disk, optical disk, magneto-optical disk, CD-ROM, CD-RAM, magnetic tape, nonvolatile memory card, ROM, or the like.

Obviously, the present invention also includes a case where executing the program codes which have been read by the computer causes the functions of the foregoing embodiments to be implemented and also causes an operating system (OS) or the like running on the computer to perform a part or all of actual processing in accordance with the instructions of the program codes, thus accomplishing the functions of the foregoing embodiments.

Furthermore, it is apparent that the present invention also includes a case where the program codes read from a storage medium are written to a feature expansion board inserted in a computer or a memory provided in a feature expansion unit connected to a computer, then a CPU provided in the feature expansion board or the feature expansion unit executes a part or all of actual processing in accordance with the instructions of the program codes, thus accomplishing the functions of the foregoing embodiments.

Figure 25:
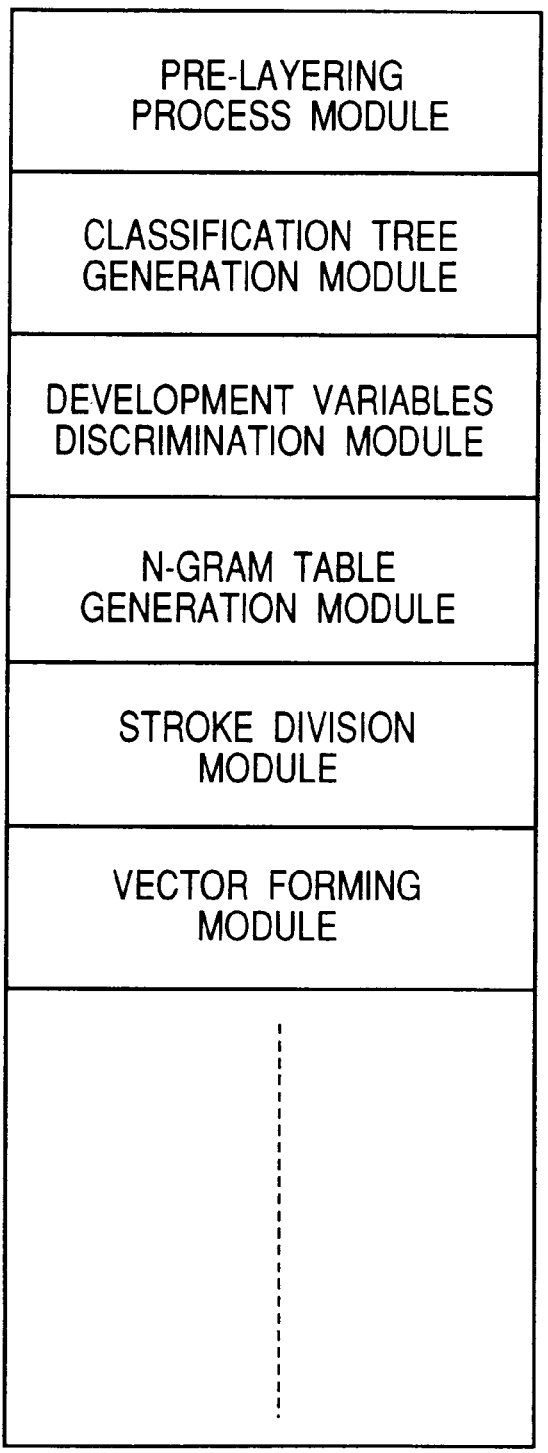
FIG. 25 is a diagram illustrating an example memory layout, with program modules, according to the second embodiment.

When applying the present invention to the foregoing storage medium, the program codes matching to the flowchart which has previously been described are stored in the storage medium. To be brief, the respective modules shown by an example of a memory map given in FIG. 25 will be stored in the storage medium.

More specifically, the program codes of at least the following modules will be stored in the storage medium: a pre-layering process module for the steps S1502 or S2304; a classification tree generation module for the processing of the steps S1504 or S2306; a development variables discrimination module for the step S1505 or S2307; an N-gram table generation module for the step S1508 or S2310; a stroke division module for the step S2302; and a vector forming module for the step S2303.

Thus, according to the present invention, an advantage is provided in which a highly reliable N-gram table can be generated even with a smaller database by generating the N-gram table based on the groups resulting from the general classification of the categories of the patterns constituting a sentence.

There is another advantage in that the grouping of the categories is carried out such that the similarity of pattern shapes is successfully reflected, thus permitting a high recognition rate of sentences.

(Third Embodiment)

In a third embodiment, an example will be described wherein sub-patterns extracted from an input pattern are layered to generate a classification tree.

A preferred embodiment of the present invention will be described in conjunction with the accompanying drawings.

<In the Case of Images>

Figure 26:
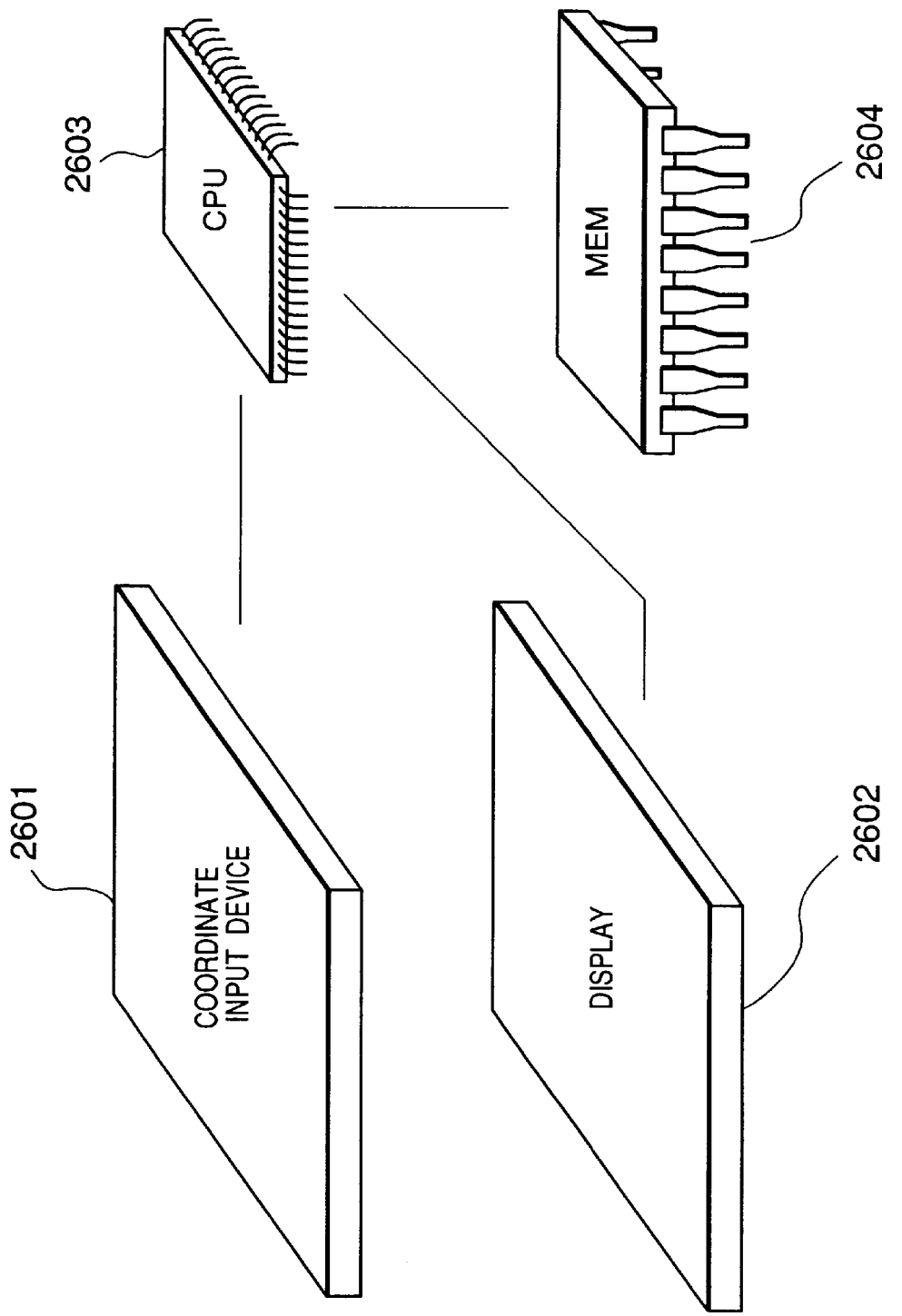
FIG. 26 is a diagram illustrating the hardware arrangement of an apparatus according to a third embodiment.

FIG. 26 is a block diagram showing the configuration of an information processing apparatus related to the following all embodiments in accordance with the present invention.

The apparatus is comprised of a pattern input device 2601, a display 2602, a central processing unit (CPU) 2603, and a memory 2604.

The pattern input device 2601, for example, has a digitizer and a pen if it is intended for online character recognition; it hands the coordinate data on a character or graphic, which has been entered on the digitizer by using the pen, over to the CPU 2603. The pattern input device may be a scanner for optically reading an image, a microphone for receiving voice, or any other means as long as it receives a pattern to be recognized; a pattern which has been entered through these input means may even be entered through a communication means. The display 2602 displays a pattern data entered through the pattern input means 2601 and also a recognition result given by the CPU 2603; it may be a CRT, LCD display, or the like. The CPU 2603 primarily recognizes an input pattern and controls all constituent devices. The memory 2604 stores a recognition program and a dictionary used by the CPU 2603 and temporarily stores input patterns, and variables, etc. used by the recognition program.

Figure 27:
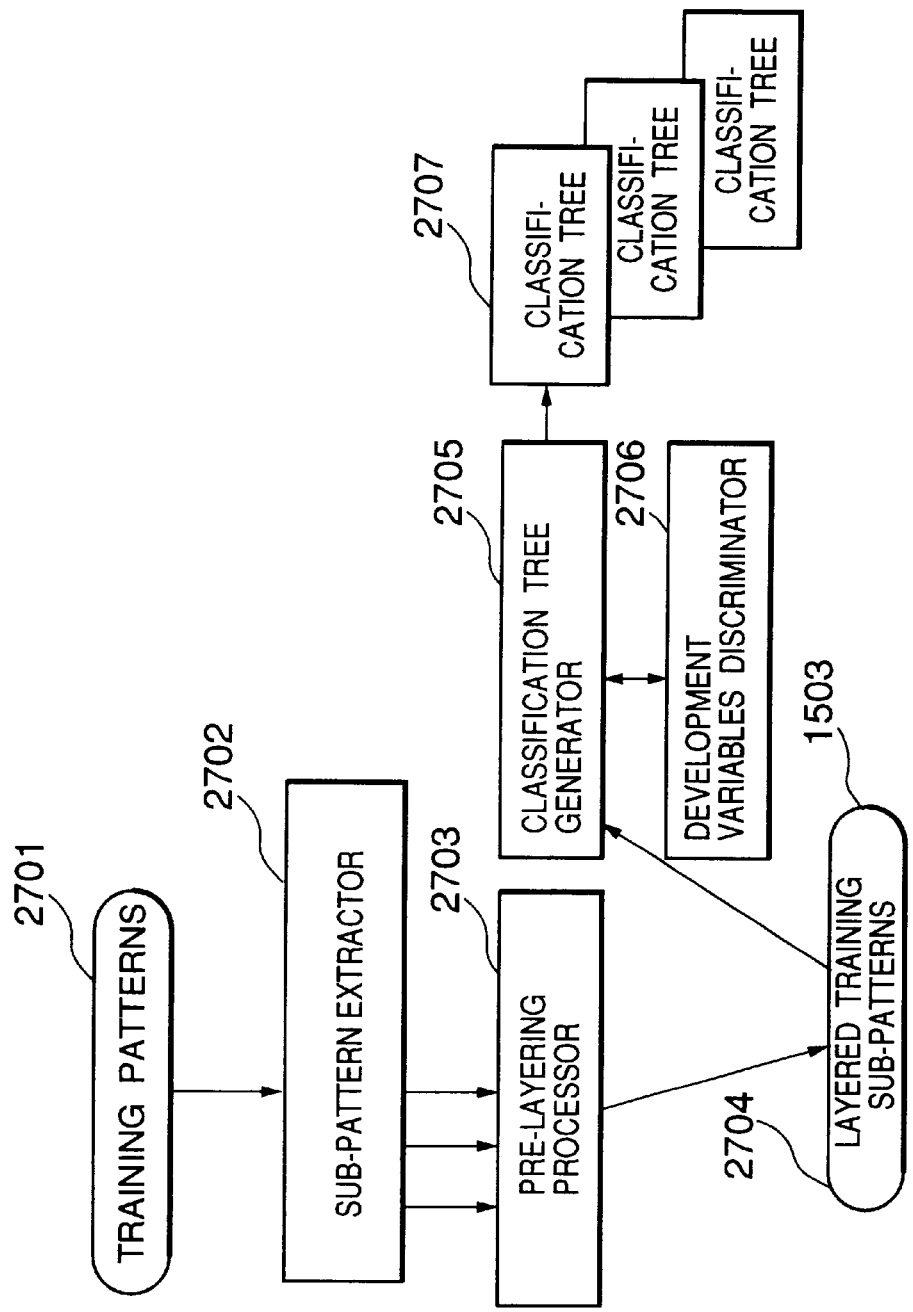
FIG. 27 is a diagram showing a classification tree preparation process according to the third embodiment.

FIG. 27 is a diagram which provides a best illustration of the functional configuration of the embodiment. Reference character 2701 denotes training patterns; 2702 denotes a sub-pattern extractor for cutting out the training patterns by each sub-pattern; 2703 is a pre-layering processor for pyramidally developing sub-patterns; 2704 denotes layered training sub-patterns; 2705 denotes a classification tree generator which generates a classification tree according to the layered training sub-patterns; 2706 denotes a development variables discriminator used by the classification tree generator to generate a classification tree; and 2707 denotes a classification tree generated by the classification tree generator. The input in this aspect of the present invention is a training pattern and the output is a classification tree.

Figure 28:
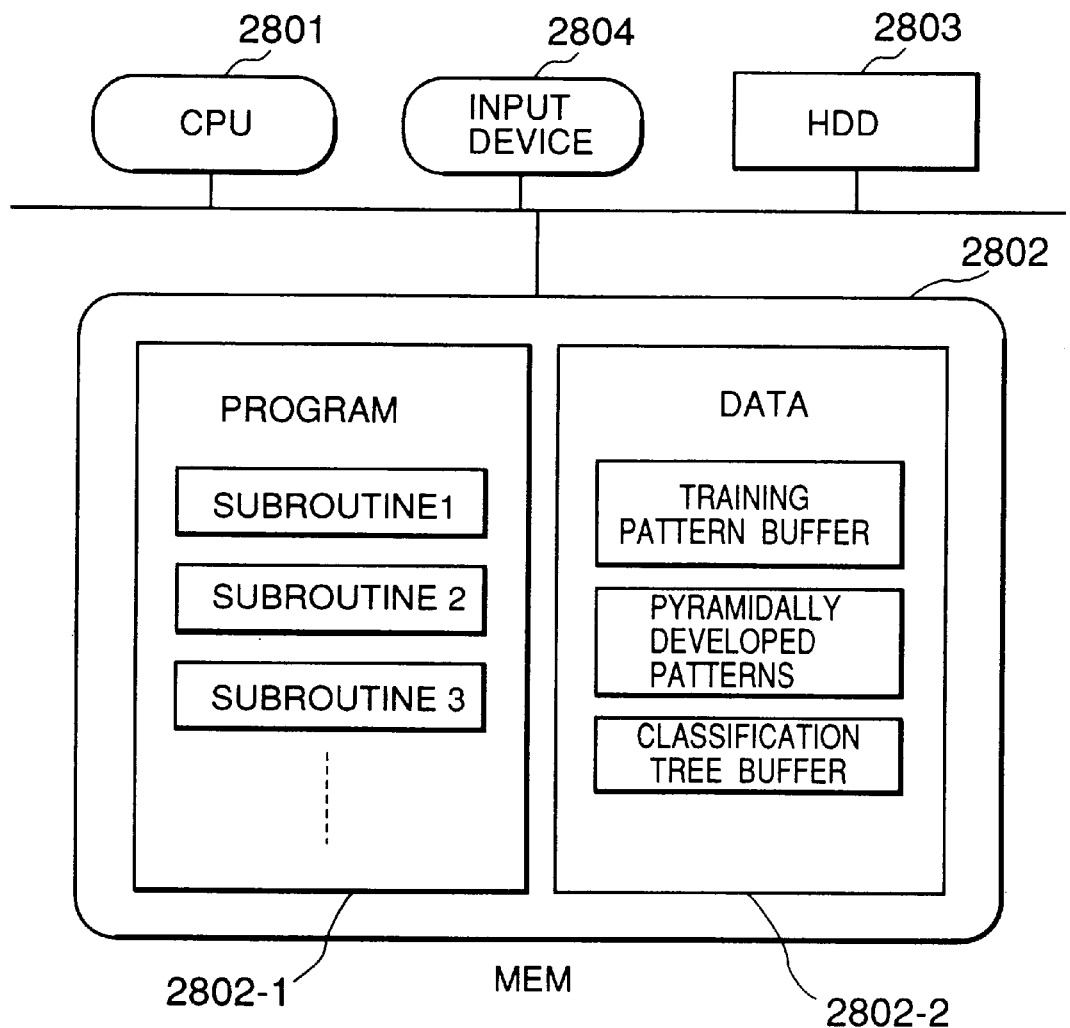
FIG. 28 is a diagram illustrating the arrangement of the apparatus according to the third embodiment.
Figure 29:
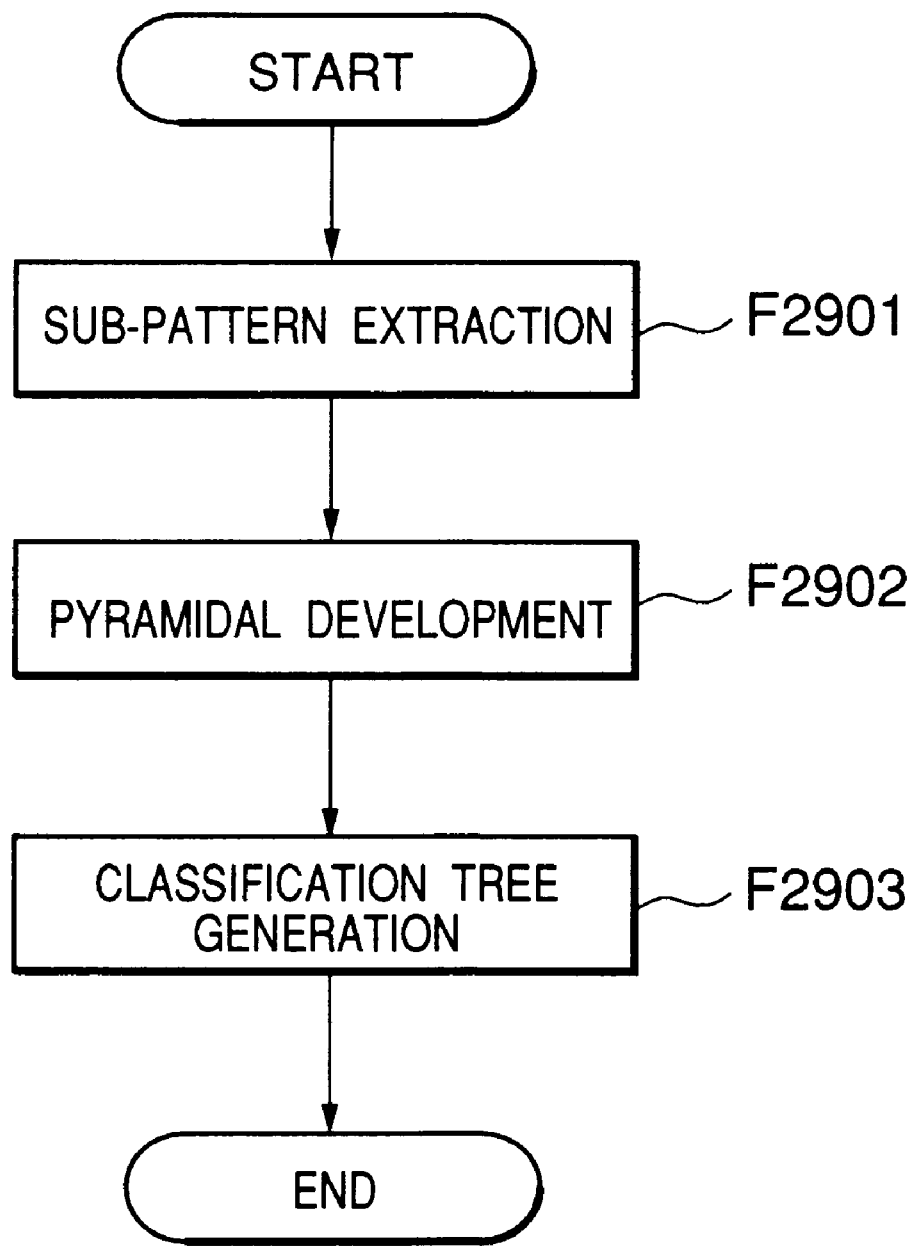
FIG. 29 is a flowchart showing the processing for the third embodiment.

FIG. 28 shows primarily the configuration inside the memory of an information processing apparatus to which the online handwritten character recognizing method according to the embodiment is applied. A CPU 2801, which is similar to the one denoted as 2603 in FIG. 26, executes various types of processing described in the embodiment according to control programs stored in a memory 2802 to be discussed later. The processing shown by a flowchart to be described later is also implemented by the CPU 2801 according to the control program for the processing which is stored in the memory 2802.

The memory 2802 has a program section 2802-1 for storing the control programs for the CPU 2801 to execute various types of processing, and a data section 2802-2 for storing various parameters and data. The program section stores, for example, the individual parts of the flowchart shown in FIG. 33 as subroutine programs. The subroutine programs are: the processing program for the step S1001 for discriminating the state of a noticed node; the processing program for the step S1002 for deleting nodes; the processing program for the step S1005 for leaf nodes; the processing program for a step S3306 for selecting a proper neuron; the processing program for a step S3307 for generating a branch of neurons; and a program for recognizing an input pattern by using a generated classification tree. The subroutines for these types of processing are stored in the program section 2802-1. When executing each type of processing to be described later, the control program for the processing is read from the memory 2802 and executed by the CPU 2801. The data section 2802-2 has a training pattern buffer for tentatively holding training patterns, an area for holding pyramidally developed training patterns, and a classification tree buffer for holding a classification tree which is being generated.

A hard disk drive (HDD) 2803 holds all training patterns and also holds the data of a classification tree which has been generated according to the method described in the embodiment. The data of the classification tree makes it possible to trace the route indicated by the classification tree shown in FIG. 34.

The memory 2802 may be a built-in ROM, RAM, HD, or the like. The programs and data may be stored beforehand in the memory, or the programs or data may be read prior to processing from a storage medium such as a floppy disk (FD) or CD-ROM which may be removed from the main body of the apparatus. As another alternative, such programs or data may be read from another apparatus via a public line, LAN, or other communication means.

An input device 2804 is used to enter a pattern to be recognized using a classification tree stored in the HDD 2803; a scanner may be used to recognize an image pattern by referring to a classification tree generated using optically entered training image patterns. A pen and digitizer or touch panel may be used to recognize stroke data entered using a pen; or a microphone may be used to recognize voice data.

Such recognition data may obviously be captured through the foregoing input means of another apparatus via a public line, LAN, etc. in addition to being directly entered through the input means.

Referring now to FIG. 29 through FIG. 33, the operation of the present invention will be described.

Figure 31:
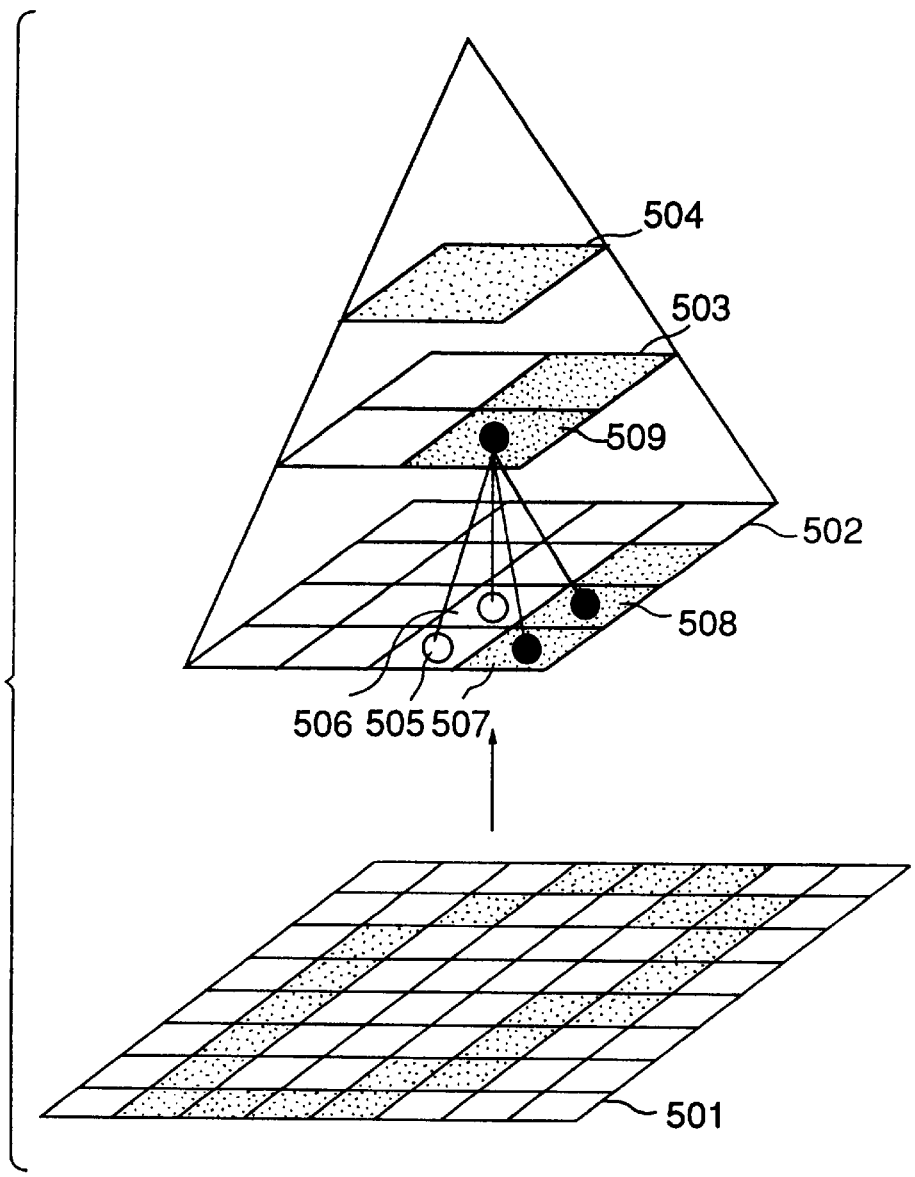
FIG. 31 is a diagram illustrating the configuration of a pyramid according to the third embodiment.

First, as the input patterns, ten numerals (categories) from 0 to 9 written on an 8×8 mesh will be taken. An input pattern of 0 is shown at the bottom of FIG. 31.

It is assumed that there are 100 training patterns each for 0 to 9 for generating a dictionary. This means that there will be a total of 1000 training patterns since there are a total of 10 categories. These are named as LTi,j (Learning Template i,j), where i denotes a suffix representing the categories of 0 to 9, and it takes a value in a range of $0 \leq i \leq 9$; and j denotes a suffix representing a training pattern number, and it takes a value in a range of $1 \leq j \leq 100$.

The method of generating the dictionary for pattern recognition in accordance with the embodiment is composed of three steps, namely, a step for extracting sub-patterns, a step for pyramidal development, and a step for generating a classification tree. These steps will be described in order in conjunction with the flowchart given in FIG. 29.

(F2901) Sub-pattern Extraction Step

In a step F2901 for extracting sub-patterns, a training pattern 400 is divided into sub-patterns as illustrated in FIG. 30, and the sub-patterns are extracted. FIG. 30 illustrates the training pattern 400, namely, a written alphabet "A", which has been divided into a total of nine sub-patterns of 3×3 matrix and extracted. The sub-patterns may be extracted in a manner as shown in FIG. 30 wherein the sub-patterns are overlapped, or they may not be overlapped. The sub-patterns are extracted according to a sub-pattern extracting rule stored in the memory 2802.

FIG. 31 detailedly illustrates the step for extracting the sub-patterns. FIG. 31 shows a process in which a central portion of a training pattern, namely, a written numeral 0, is being extracted. The central portion may be considered as equivalent to a sub-pattern 401 out of the 3×3 sub-patterns shown in FIG. 30.

In FIG. 31, a training pattern 501 is represented in an 8×8 bit map, and a total of nine (3×3) sub-patterns represented in a 4×4 bit map are extracted.

(F2902) Pyramidal Development Step

Each of the nine sub-patterns which have been extracted in the sub-pattern extraction step F2902 will have a pyramid work of three layers 502 to 504 as shown in FIG. 31. In FIG. 31, the topmost layer 504 is composed of a group of 1×1 neuron, the middle layer 503 is composed of a group of 2×2 neurons, and the bottommost layer 502 is composed of a group of 4×4 neurons.

An extracted training sub-pattern is first input to the bottommost layer of 4×4 neurons shown in FIG. 31. At this time, it is assumed that the neurons in the white portion of the input pattern (LTi,j) 501 are OFF, while the neurons in the black portion are ON. Hereafter, "black" will means that the neurons are ON, and "white" will mean that the neurons are OFF.

The configuration of the pyramid is extremely simple; if any one neuron that is ON exists in the 2×2 neurons of a lower layer, then one neuron of the layer immediately above the layer should be ON. In FIG. 31, neurons 507 and 508 out of neurons 505 to 508 in the sub-pattern 502 are ON; therefore, a neuron 509 corresponding to the neurons 507 and 508 is also ON. This rule applies in processing the input patterns upward. The configuration or rule of the pyramid, however, is not limited thereto; as an alternative, a black neuron may be counted as 1 and when a mean value exceeds a threshold value, an upper neuron is turned ON, or other rule may be adopted as long as the state of an upper neuron is decided by the states of a plurality of lower neurons.

The processing for deciding the states of upper neurons according to the states of lower neurons is carried out on all the neurons constituting a sub-pattern, and the processing is repeated for all the sub-patterns.

(F2903) Classification Tree Generating Step

All the training patterns (LTi,j) are pyramidally developed as illustrated in FIG. 31 in the pyramidal development step F2902. The classification tree will be generated from top to bottom, that is, in the opposite direction from that of the pyramidal development F2902.

The node of a root begins with the neuron of the topmost layer (1×1) of FIG. 31.

As a result of the pyramidal development of the training sub-patterns (LTi,j), a neuron or neurons of the pattern 503 (2×2) of the second layer of FIG. 31 should be ON. This is because all neurons of the second layer (2×2) do not turn OFF unless a completely white training sub-pattern exists, according to the rule employed for the embodiment. Hence, the state of the neuron of the topmost layer (1×1) is ON with respect to all the training sub-patterns (LTi,j).

Figure 32:
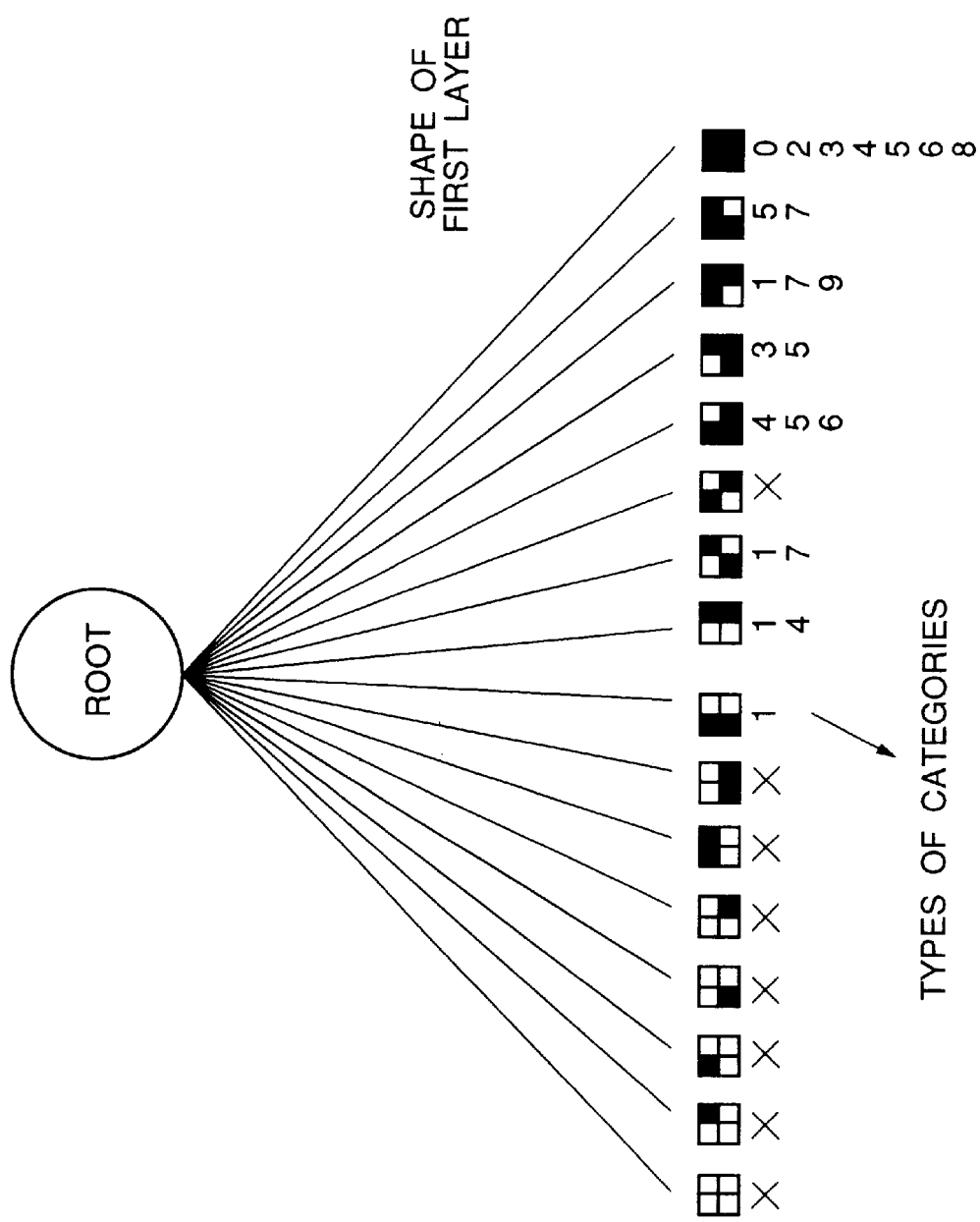
FIG. 32 is a diagram showing a classification tree that is being prepared according to the third embodiment.

There are sixteen ($2^4$) states of the second layer (2×2) (strictly speaking, there are fifteen states since there is no such a state where all neurons are OFF as described above); therefore, sixteen branches extend from the root node as shown in FIG. 32.

The states of the branches shown in FIG. 32 are indicated by showing the ON state of the group of neurons of the second layer shown in FIG. 31 wherein the black areas indicate ON, while the white areas indicate OFF.

The branches with "X" indicated in the column showing the types of categories correspond to the case 1 where no training sub-patterns (LTi,j) exist, and therefore they are eliminated. (Strictly speaking, the leftmost branch does not extend from the root.) The eighth branch from the left has the training sub-patterns of only the category 1. This corresponds to the case 2 where the sub-patterns of only one particular category (e.g. "1") of the training sub-patterns (LTi,j) exist, so that the branch is turned into a leaf.

For instance, the fifth branch from the right has the training sub-patterns of the categories 4, 5, and 6; this corresponds to the case 3 rather than the case 1 or 2, namely, the sub-patterns of a plurality of categories are mixed. Thus, this branch provides a node.

Figure 33:
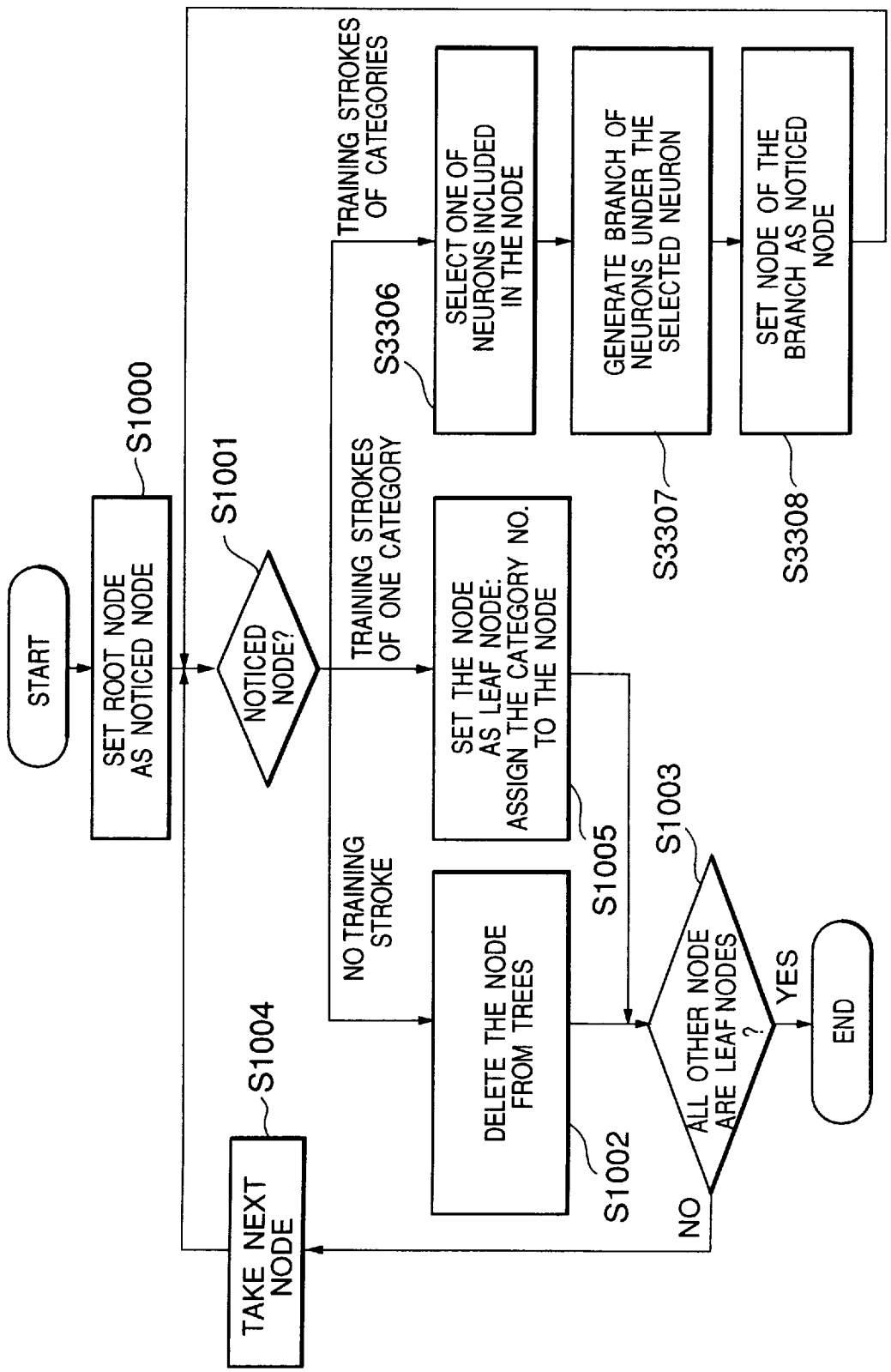
FIG. 33 is a flowchart showing the classification preparation processing according to the third embodiment.
Figure 35:
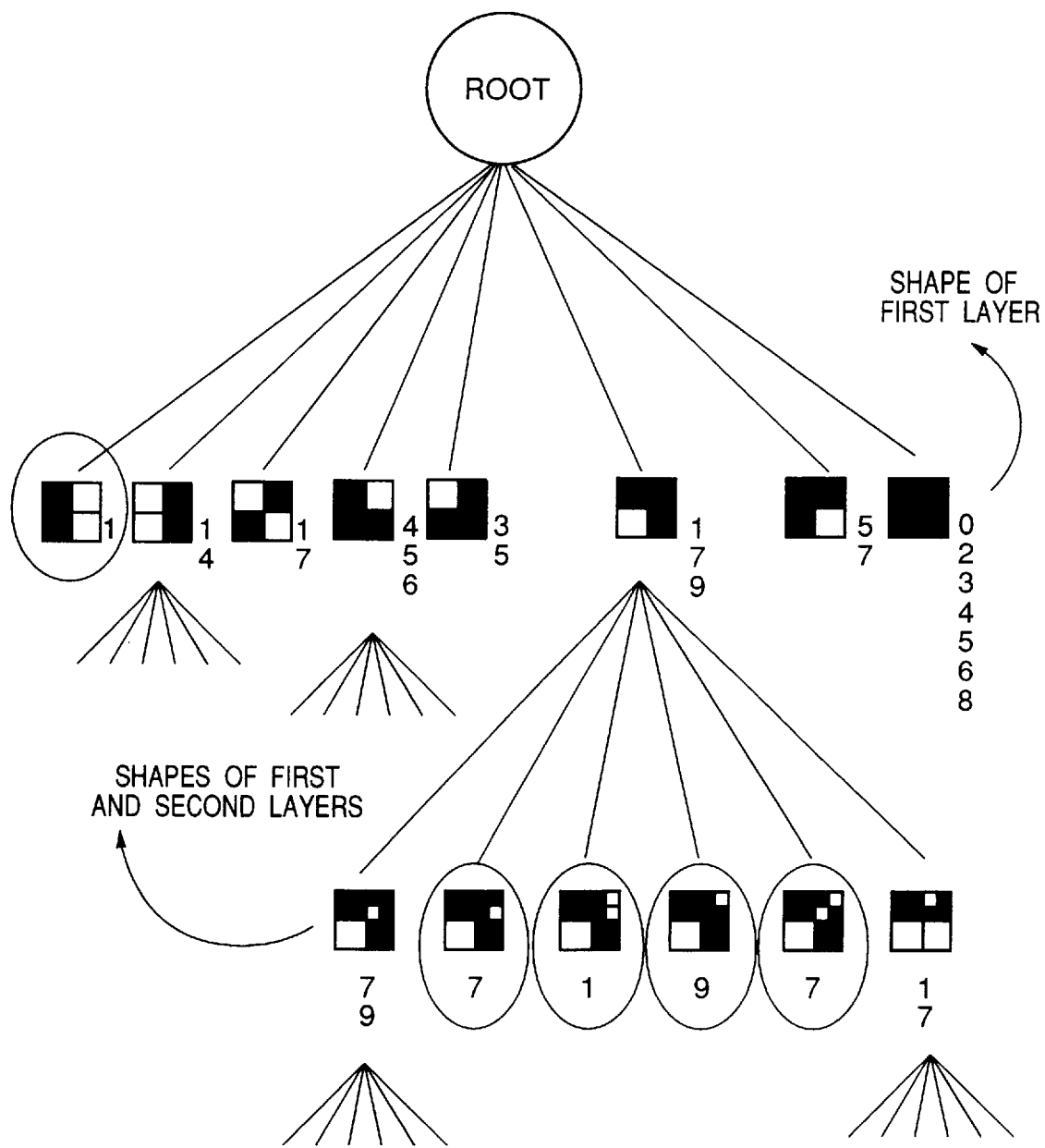
FIG. 35 is a diagram illustrating a classification tree that is finally prepared according to the third embodiment.

The processing for generating a classification tree is illustrated by the flowchart given in FIG. 33. The following will describe the procedure for generating a classification tree as shown in FIG. 35. The steps S1000 to S1005 are the same as those in the first embodiment described in conjunction with FIG. 10; therefore, only steps S3306 to S3308 will be described.

In the step S3306, one out of the neurons included in a node is selected according to the entropy standard.

In the step S3307, a branch of the set of neurons of a lower-rank layer of the selected neuron is generated.

Figure 34:
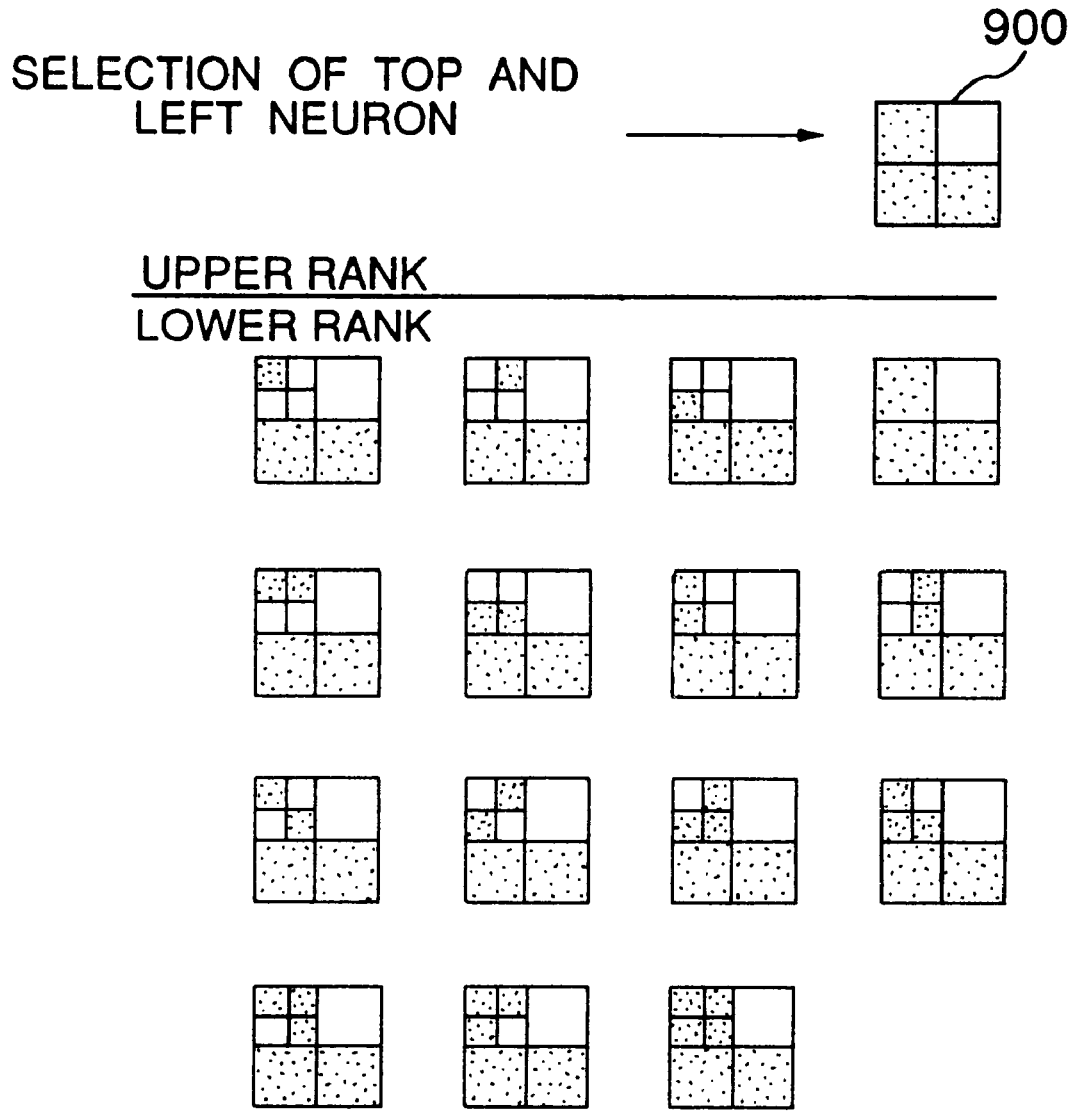
FIG. 34 is a diagram showing layered patterns at the lower rank that are generated by selected neurons according to the third embodiment.

FIG. 34 illustrates the processing implemented in this step; it shows an example of the set of neurons of the lower-rank layer when a top left neuron has been selected.

Referring to FIG. 34, it is assumed that a neuron 900 is the neuron which has been selected in the step S3306. There are fifteen different combinations of the states of neurons in the lower-rank layer corresponding to the selected neuron, that is, there are fifteen different patterns for the lower-rank layer. Each of these combinations provides a new node for generating a branch.

The description has been given to the processing implemented in the step S3307.

The program then proceeds to the step S3308 where it sets one of the nodes of the generated branches as the next noticed node. In the step S3308, the program moves the noticed node and goes back to the step S1001 to repeat the same processing.

Generating the classification tree as shown in FIG. 35 according to the procedure described above makes it possible to generate a classification tree which reflects detailed characteristic differences among similar categories while maintaining general classification of the patterns which have many characteristics. Quick recognition of characters with a high recognition rate can be achieved by referring to the generated classification tree.

The following will describe how to generate branches from the nodes.

The method for generating branches from the nodes will now be described. The above description has been given to the case where the top left neuron had been selected. Naturally, efforts are made to accomplish most efficient generation of branches in developing the branches from the nodes. High efficiency is achieved by selecting neurons which enable as much information as possible on categories to be obtained when branches are developed.

Generally, there are so many ways to develop the branches under such conditions that it is difficult to decide which one should be adopted. This has been hitherto an obstacle to successful generation of a classification tree used for recognition.

An attempt will be made to limit the branches to be developed from the node to the ones wherein the neurons that are ON are developed to lower layers at this node. For instance, in the case of the fifth branch from the right shown in FIG. 32, one of the three neurons, namely, the top left, bottom left, and bottom right neurons of the second layer shown in FIG. 31, is selected, and the branches related to the states of the bottom four neurons of the third layer under the selected neuron shown in FIG. 31 are developed.

This permits significantly reduced time for the calculation required to develop the branches. In addition, such limitation essentially exerts no serious damage to the classifying performance of the classification tree to be generated.

A description will now be given to a method for selecting a neuron among the neurons that are ON at the node, the neuron enabling the highest efficiency in the development.

The number of the sub-patterns of category No. i among the training sub-patterns (LTi,j) which exist in a certain node is denoted as Ni. When the total number of the training sub-patterns existing in the node is denoted as N, then the existence probability pi of each category in the node can be expressed as follows:

$$pi = Ni/N$$

where $$N = \sum_{i=0}^{2} N_i$$

Therefore, the entropy at the time when the information on the node is obtained will be represented by the following expression:

$$Entropy_{node} = -\sum_{i=0}^{2} p_i \log(p_i) = -\sum_{i=0}^{2} \left(\frac{N_i}{N}\right) \quad \text{Expression (11)}$$

$$= \frac{1}{N} \sum_{i=0}^{9} N_i (\log N - \log N_i)$$

Then, one of the neurons which are ON in this node is selected and the decrement of the entropy when a branch is developed therefrom is calculated.

As described above, the number of the branches developed from the single neuron toward lower layers is sixteen. The distribution of the training sub-patterns (LTi,j) among the sixteen branches is indicated by the number of the training sub-patterns (LTi,j) which exist in the developed branches, i.e.;

Ni,b where i of Ni,b denotes a category number and b denotes a branch number.

At this time, the entropy at which the information on each branch has been obtained is represented by the following expression as is the case with the foregoing discussion:

$$Entropy_{branch} = -\sum_{i=0}^{9} p_i \log(p_i) = -\sum_{i=0}^{9} \frac{N_{i,b}}{N_b} \log\left(\frac{N_{i,b}}{N_b}\right) \quad \text{Expression (12)}$$

$$= \frac{1}{N_b} \sum_{i=0}^{9} N_{i,b}(\log N_b - \log N_{i,b})$$

In this expression, $$N_b = \sum_{i=0}^{9} N_{i,b}$$

indicates the total number of the training sub-patterns (LTi,j) which exist in the branches.

The probability of distribution into each branch is expressed by:

Nb/N where N is identical to N in the expression (11), and therefore, the average entropy at the time when the branches are developed is represented by the following expression:

$$\overline{Entropy_{branch}} = \frac{1}{N} \sum_{b=1}^{16} \sum_{i=0}^{9} N_{i,b}(\log N_b - \log N_{i,b}) \quad \text{Expression (13)}$$

The average decrement of the entropy is obtained by:

$$EntropyDecrease = Entropy_{node} - \overline{Entropy_{branch}} \quad \text{Expression (14)}$$

A value obtained by dividing this value by the logarithm of the number of the branches as shown below represents the classification efficiency when the branches are developed:

$$\frac{EntropyDecrease}{BranchNumber} \quad \text{Expression (15)}$$

A neuron which gives this value a maximum value is selected to develop the branches.

The branches may be developed in relation to a group of a plurality of neurons rather than developing only one neuron.

In this case, BranchNumber in the expression (15) will be obtained by multiplying the number of neurons by 16. Technically, however, it is impossible to expect a state where all neurons of the lower layers involved in the development are OFF. To be accurate, therefore, BranchNumber will be the number of neurons multiplied by 15. In this embodiment, the value obtained in the expression (15) is adopted as the value which indicates the classification efficiency when the branches are developed; however, it is obvious that the value is not limited to the one obtained by the expression (15) as long as it is a function representing the development efficiency of branches such as "Ginicriterion" described in the literature titled "Classification and Regression Trees".

Thus, once a neuron or a set of neurons to be developed are decided, the branches are developed and leaves and nodes are generated accordingly.

Lastly, when all neurons have been turned into leaves, the classification tree is completed.

FIG. 35 shows an example of the classification tree which has been generated in the process F2903 for generating a classification tree and stored in the HDD 2803.

In FIG. 35, the branches which have been deleted in S1002 are omitted. The circled branches in FIG. 35 indicate that they are leaves which have been assigned category numbers as free nodes in S1005.

All branches other than the leaves will turn into nodes; therefore, further branch development will be implemented. FIG. 35 shows the result of the further branch development related only to the third node from the right.

In the third node from the right, three types of categories, namely, "1", "7", and "9" coexist, requiring the development of branches. It is assumed that the top right neuron of the first layer has been selected to be developed in the first layer as a result given by the development variables discriminater. Then, $2^4=16$ branches are developed as is the case shown in FIG. 33 with respect to the state of the top right neuron, and some branches are deleted, some branches are turned into leaves, and some branches are turned into nodes. The branches which have turned into nodes must be further developed until the ends of all branches are eventually turned into leaves.

In FIG. 35, for the purpose of clarity, the first layer and the second layer are superimposed to show the development result of the third node from the right. Actually, these states are represented by the four neurons of the first layer and the four top right neurons of the second layer of the pyramid illustrated in FIG. 29.

Figure 36:
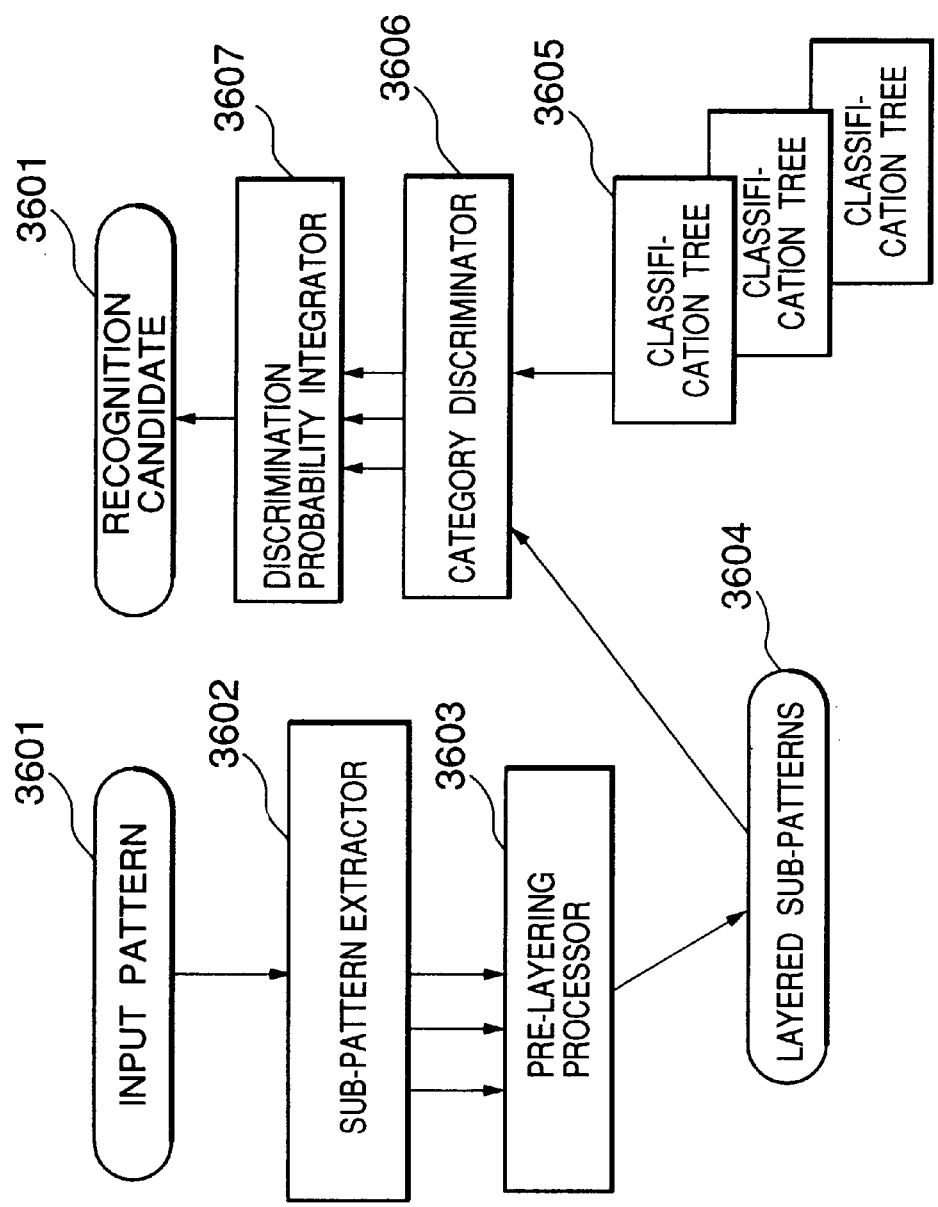
FIG. 36 is a diagram showing recognition processing according to the third embodiment.

FIG. 36 shows the flow of recognizing an input pattern by using the classification tree generated using the procedure described above. In FIG. 36, reference character 3601 denotes an input pattern; 3602 denotes a sub-pattern extractor for extracting sub-patterns from the input pattern; 3603 denotes a pre-layering processor for pyramidally layering input sub-patterns; 3604 denotes layered sub-patterns resulting from the pyramidal layering process; 3605 denotes a classification tree; 3606 denotes a category discriminator for determining the discrimination probability of categories according to the layered input sub-patterns and the classification tree; and 3607 denotes a discrimination probability integrator for integrating the discrimination probabilities of the respective categories obtained by the category discriminator. The inputs of this aspect of the present invention are input patterns and the outputs thereof are recognition candidates.

Preferably, the foregoing classification tree is the classification tree which can be generated in this embodiment.

The input pattern 3601 corresponds to the training pattern 2701; the substantial data configuration is the same although it is entered through an input device 3601. The sub-pattern extractor 3602 and the pre-layering processor 3603 are exactly the same as those corresponding devices shown in FIG. 27. In the case shown in FIG. 27, there were as many layered input sub-patterns 3604 as the training patterns, while there is only one that is derived from an input pattern in this embodiment.

When a leaf is reached as the classification tree shown in FIG. 36 is traced according to the layered input sub-patterns 3604, the category discriminator causes a display or a printer to output the categories existing in the leaf at that point as a recognition result.

If no leaf is reached, then the category probability included in the node passed through last is output as a result.

The discrimination probability integrator 3607 determines an arithmetic mean, geometric mean, or other mean of the results of each sub-pattern given by the category discriminator 3606.

<In the Case of Strokes>

In this embodiment, the training data and the training data to be recognized, which are entered, are the stroke data entered through a pen or other type of coordinate input means. While the data involved in the example of images described above was handled as bit map data, the input strokes handled in this embodiment are divided and quantized into vectors in this embodiment. The entire flow, however, is based on the that of the first embodiment.

Figure 37:
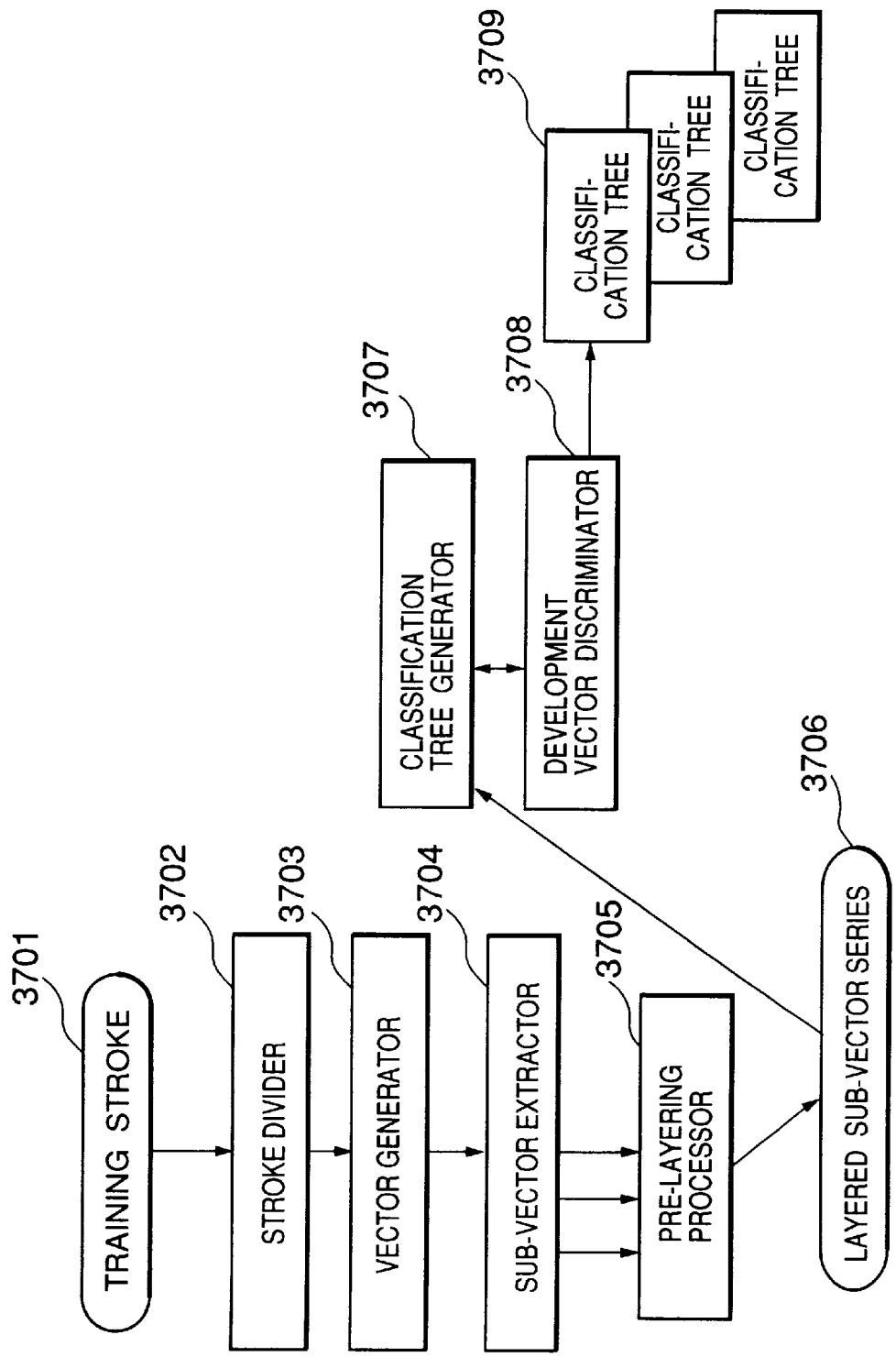
FIG. 37 is a diagram illustrating a classification tree preparation process according to the third embodiment.

FIG. 37 shows a processing flowchart which illustrates the procedure for generating a classification tree in this embodiment. Reference character 3701 indicates a training stroke; 3702 denotes a stroke divider for dividing the training stroke; 3703 denotes a vector generator for making the stroke segments vectors, the stroke segments having been produced by the stroke divider; 3704 denotes a sub-vector extractor for partially extracting sub-vectors from a vector series obtained by the vector generator; 3705 denotes a pre-layering processor for layering the vector series produced by the sub-vector extractor; 3706 denotes a layered sub-vector series produced by the pre-layer processor; 3707 denotes a classification tree generator for generating a classification tree according to the layered vector series; 3708 denotes a development vector discriminator used by the classification tree generator to generate a classification tree; and 3709 denotes the classification tree generated by the classification tree generator.

In this embodiment, the inputs are training strokes and the outputs are classification trees.

Figure 38:
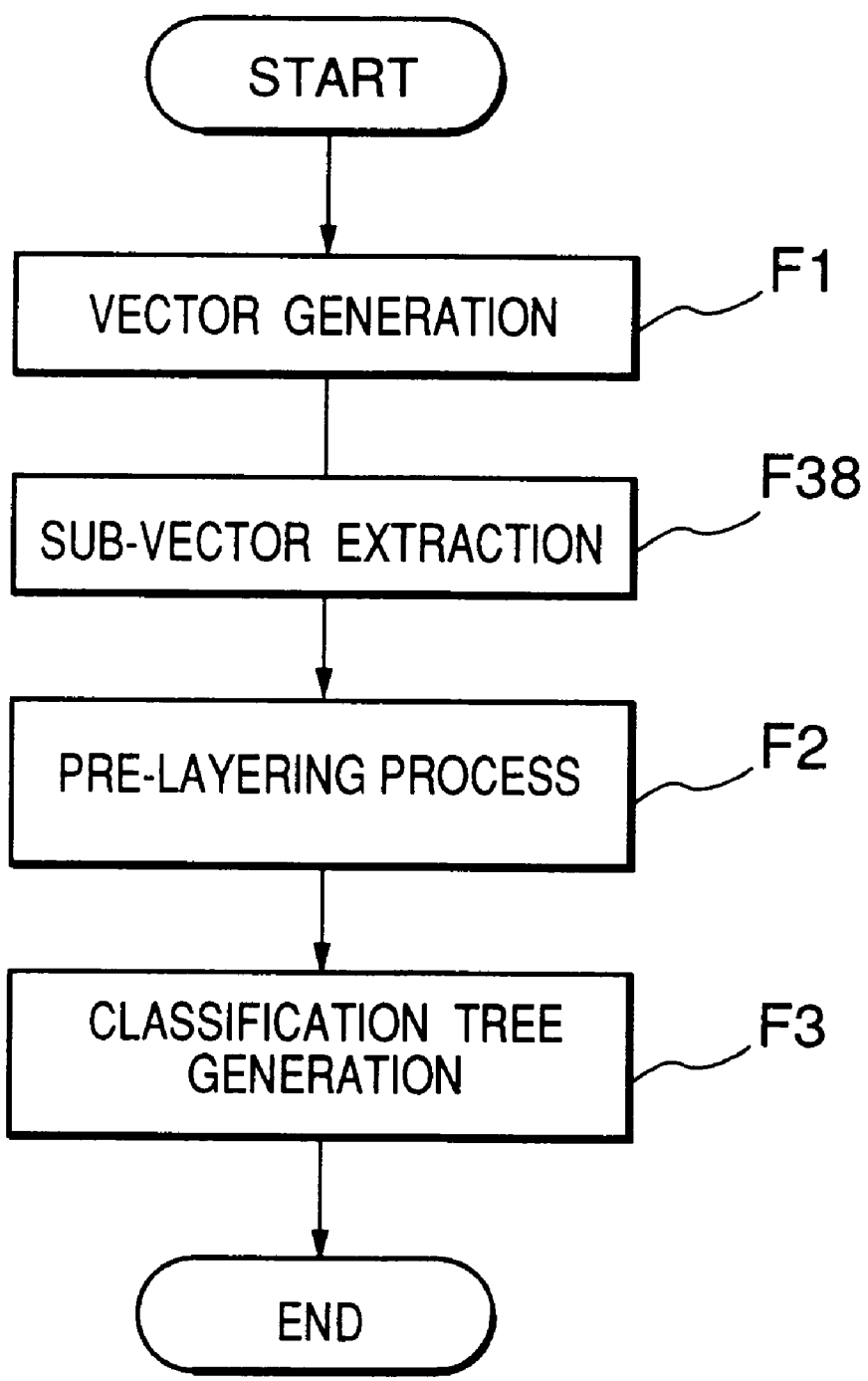
FIG. 38 is a flowchart showing second processing according to the third embodiment.
Figure 39:
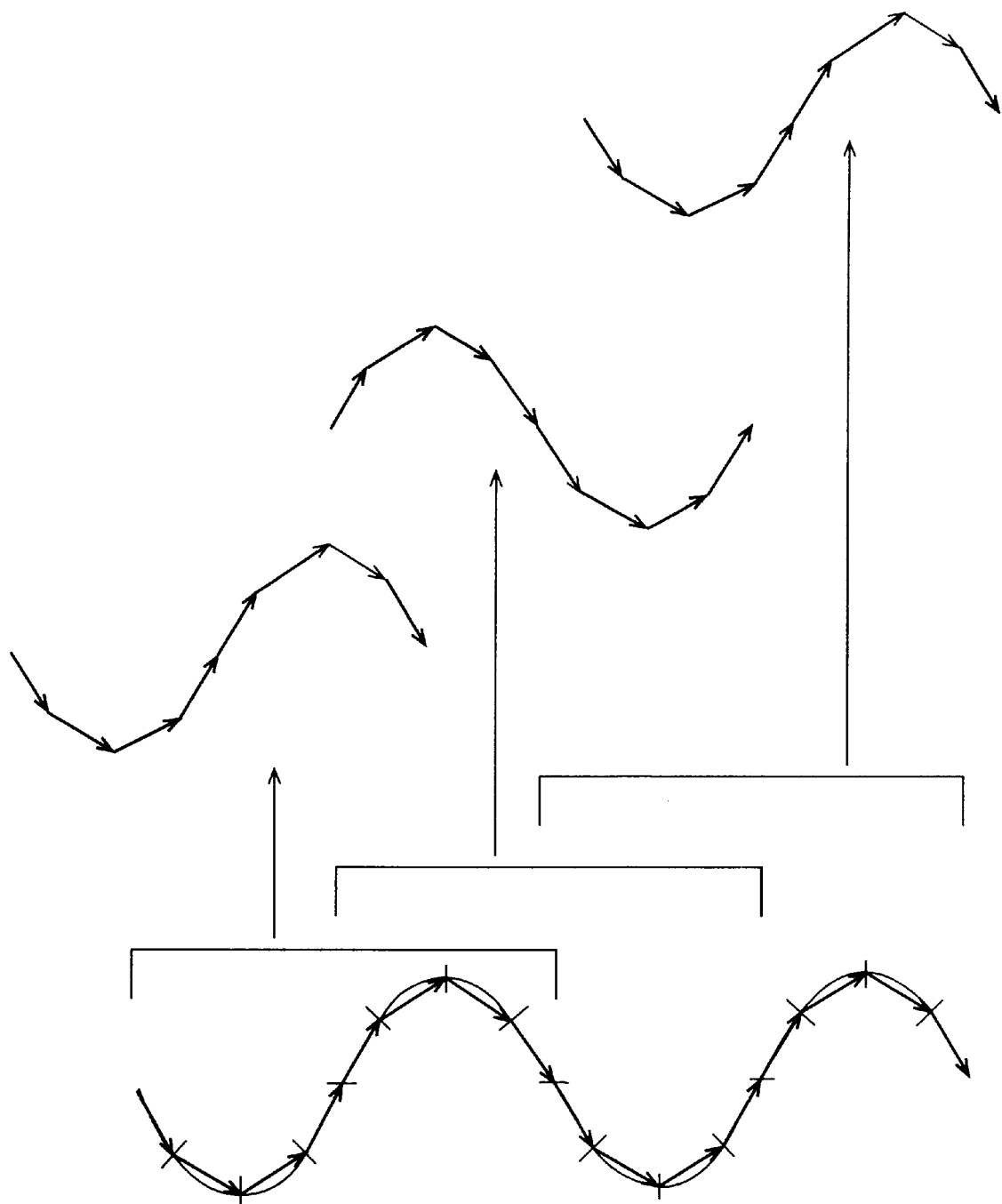
FIG. 39 is a diagram illustrating sub-vector extraction means according to the third embodiment.

Referring now to FIG. 37 to FIG. 39, a description will be given to the operation of this embodiment.

Three different characters "〈", "し", and "つ" which read "ku", "shi", and "tsu", respectively, each of which is drawn in one stroke, will be taken as the examples representing categories to be recognized.

It is assumed that there are one hundred training patterns each for "〈", "し" and "つ", respectively, for generating a dictionary; these are denoted as follows:

TPi,j (Training Pattern i, j)

where i is a suffix denoting the category and it takes a value in a range of $0 \leq i \leq 2$, and j is a suffix denoting a training pattern number and it takes a value in a range of $1 \leq j \leq 100$.

As illustrated by the flowchart shown in FIG. 38, the method of generating the dictionary for the online handwritten character recognition according to the embodiment is composed of four steps, namely, a vector generation step, a sub-vector extraction step, a pre-layering process step, and a classification tree generation step. The vector generation step, the pre-layering process step, and the classification tree generation step are the same as those described in the first embodiment in conjunction with FIG. 3; therefore, only the sub-vector extraction step will be described.

(F38) Sub-vector Extraction Step

Referring to FIG. 39, the sub-vector extraction step F38 will be described in detail.

In FIG. 39, the stroke is equally divided into sixteen segments and converted to vectors of 5421124554211245.

The vector series composed of the sixteen vectors is partially extracted to form three groups of sub-vector series, each group being composed of an eight-vector series.

The sub-vector series may be extracted as illustrated in FIG. 39 where they are overlapped, or they may be extracted such that they do not overlap at all.

The number of the vectors included in each sub-vector series is eight in FIG. 39; however, the number is not limited thereto.

Figure 40:
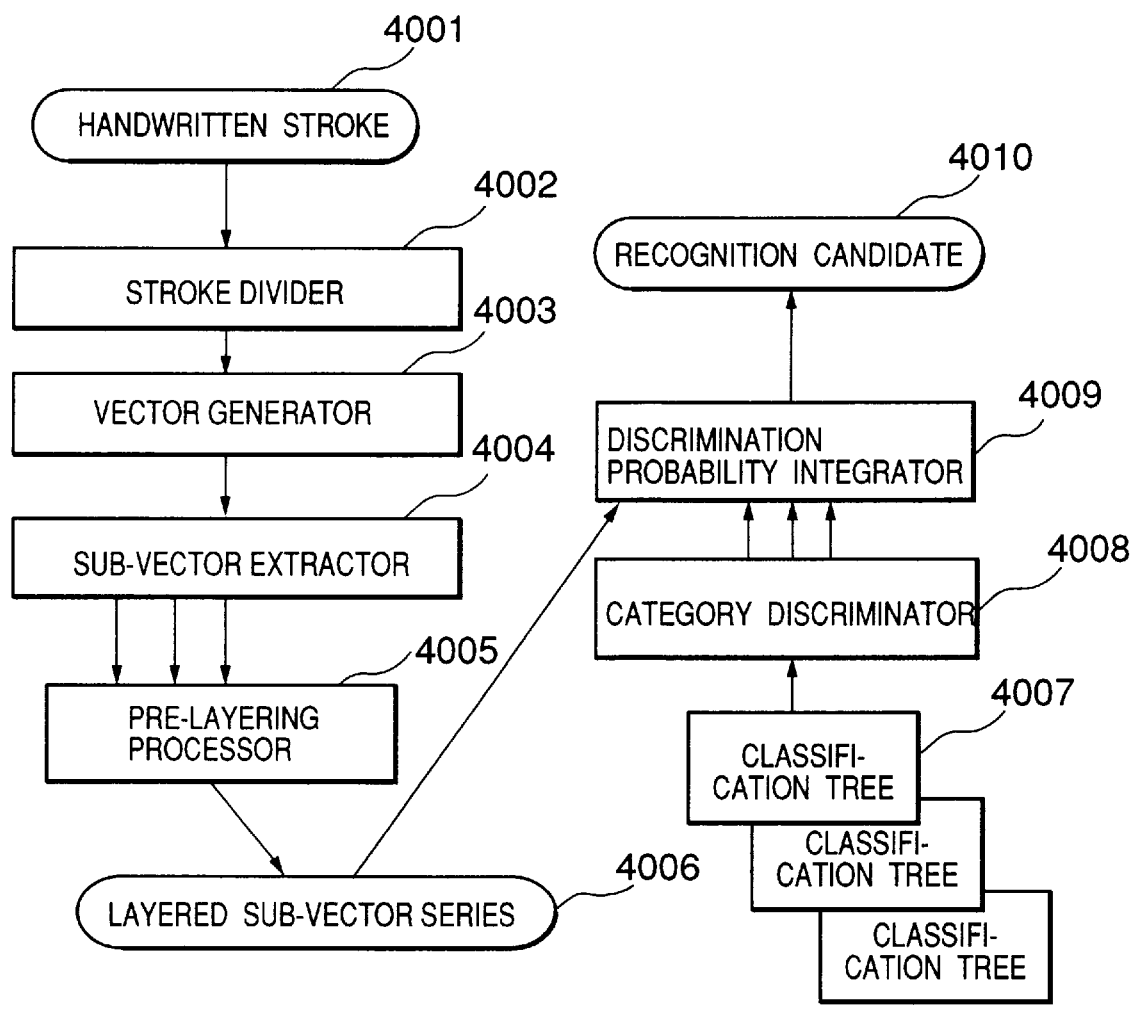
FIG. 40 is a diagram illustrating second recognition processing according to the third embodiment.
Figure 41A:
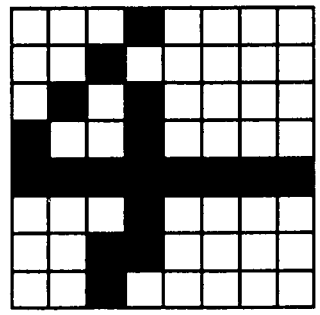
FIGS. 41A, 41B, 41C, 41D and 41E are diagrams illustrating prior art.
Figure 41B:
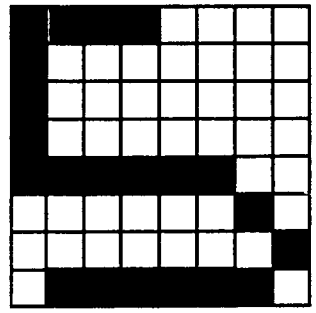
Figure 41C:
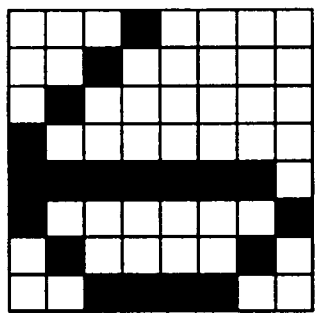
Figure 41D:
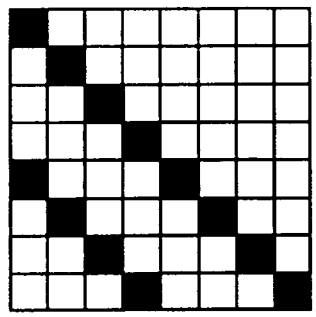
Figure 41E:
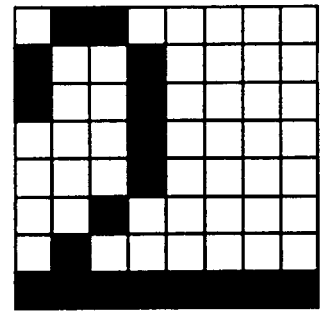

FIG. 40 shows a processing flowchart which illustrates the procedure for online handwritten character recognition. Reference character 4001 indicates a handwritten stroke entered by a user; 4002 denotes a stroke divider for dividing the handwritten stroke; 4003 denotes a vector generator for making the stroke segments vectors, the stroke segments having been produced by the stroke divider; 4004 denotes a sub-vector extractor for partially extracting vectors from a vector series obtained by the vector generator; 4005 denotes a pre-layering processor for layering the vector series produced by the sub-vector extractor; 4006 denotes a layered sub-vector series produced by the pre-layering processor; 4007 denotes a classification tree which provides the information necessary for category classification; 4008 denotes a category discriminator which determines the category of the handwritten stroke according the layered vector series by referring to the classification tree; and 4009 denotes a discrimination probability integrator which integrates the discrimination probability of each category received from the category discriminator. In this embodiment, the inputs are handwritten strokes and the outputs are recognition candidates. Preferably, the foregoing classification tree is the classification tree which can be generated in the foregoing example.

The handwritten stroke 4001 corresponds to the training stroke 3701; it is substantially the same. The stroke divider 4002, the vector generator 4003, the sub-vector extractor 4004, and the pre-layering processor 4005 are exactly the same as those corresponding devices shown in FIG. 37. In the case shown in FIG. 37, there were as many layered sub-vector series 3706 as the training patterns, while there is only one layered sub-vector series 4006 that is derived from the handwritten stroke in this example.

When a leaf is reached as the classification tree shown in FIG. 7 is traced according to the layered sub-vector series 4006, the category discriminator 4008 causes the categories existing in the leaf at that point to be output as a recognition result. If no leaf is reached, then the category probability included in the node passed through last is output as a result.

The discrimination probability integrator 4009 determines an arithmetic mean, geometric mean, or other mean of the results of each sub-pattern received from the category discriminator 4008.

<In the Case of Voices>

It is also possible to recognize voices by using the classification tree generating procedure and the recognizing procedure which have been described in the foregoing example for images.

Figure 42:
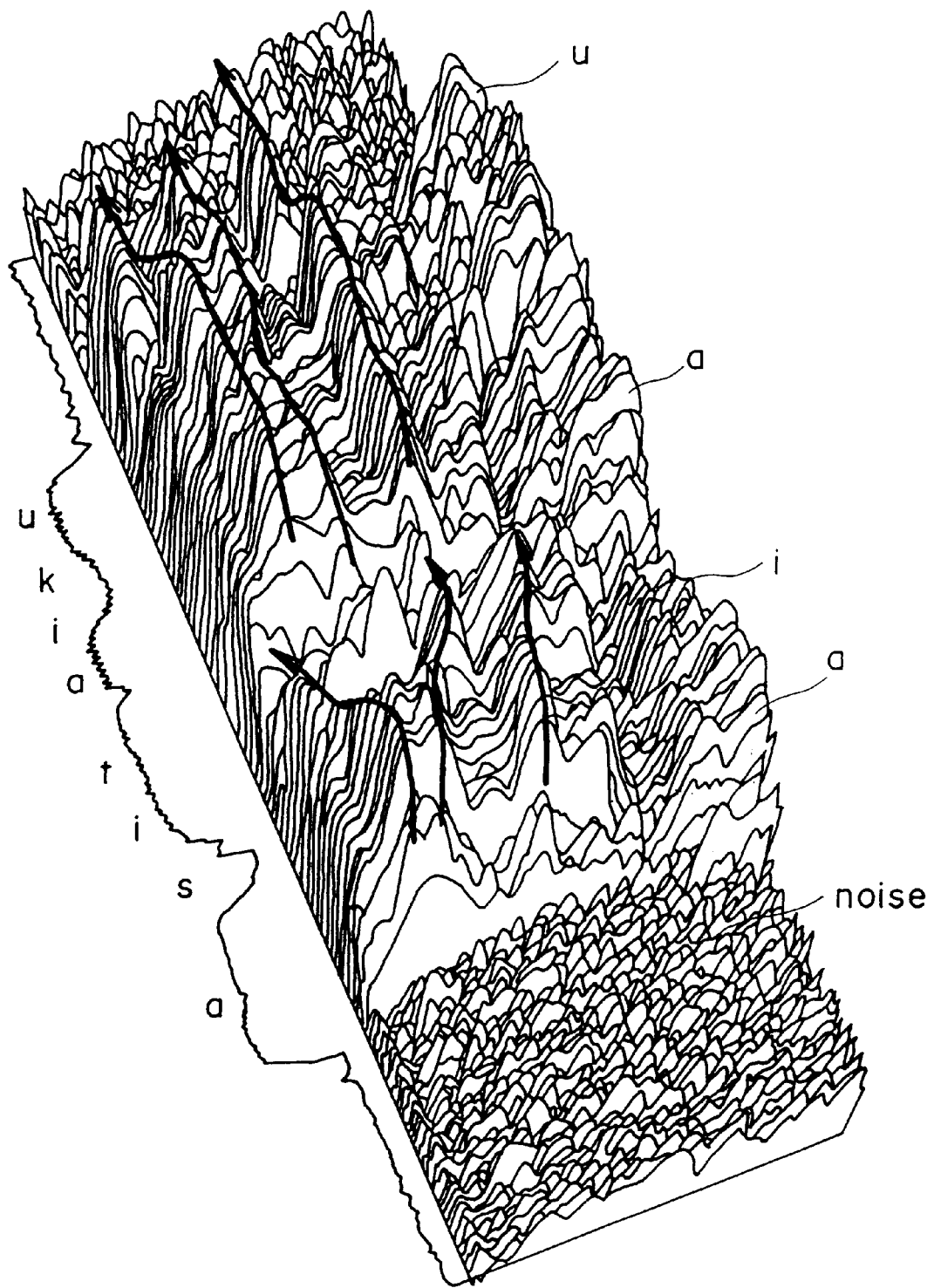
FIG. 42 is a diagram showing envelopes obtained by performing a Fourier transformation on a speech pattern according to the third embodiment.

Voice data is expressed in terms of time series data which is subject to Fourier transformation to extract envelopes. The result is illustrated in FIG. 42 which shows an example of the result of the Fourier transformation of the voice data pronounced " あしたいく" which reads "a-shi-ta-i-ku" meaning "will go tomorrow". As may be seen from FIG. 42, unlike the binary bit map data, the processed voice data has analog value intensity and a three-dimensional shape with an undulated surface like a mountain range.

The three-dimensional data is cut on predetermined axes and converted to N pieces of two-dimensional bit map data. This enables a classification tree to be generated by implementing the classification tree generating procedure for the bit map data described in the foregoing embodiment. Input voices can be represented in terms of bit map data by the Fourier transformation and the cutting by predetermined axes, so that they can also be recognized.

Figure 43A:
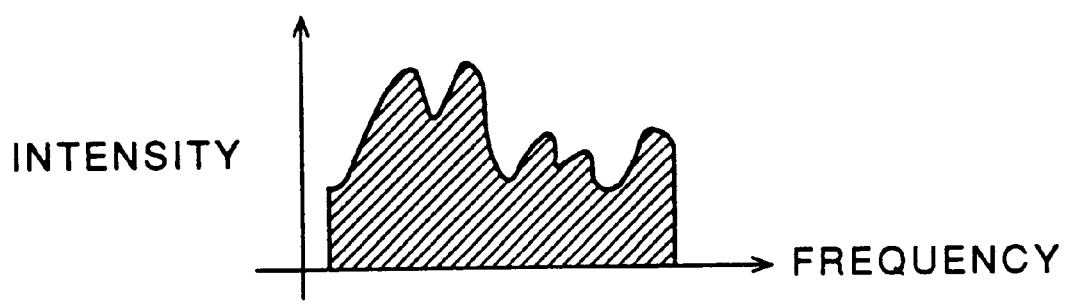
FIG. 43 is a graph showing speech patterns with intensity and a frequency represented along axes.
Figure 43B:
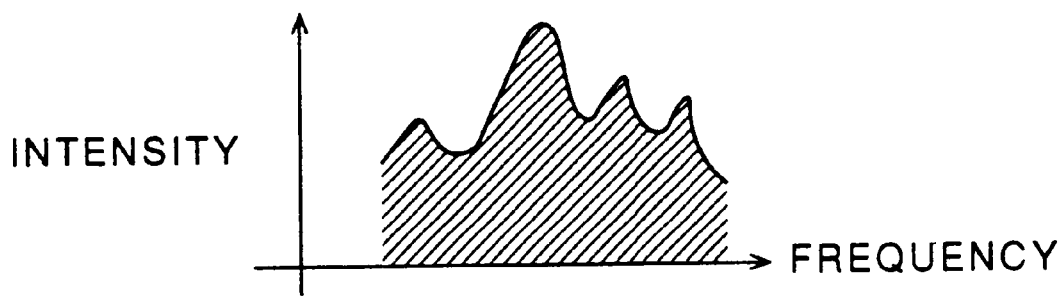
Figure 43C:
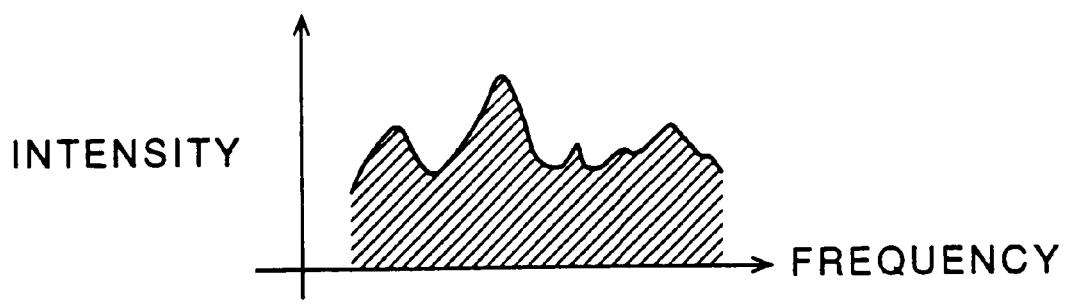
Figure 44A:
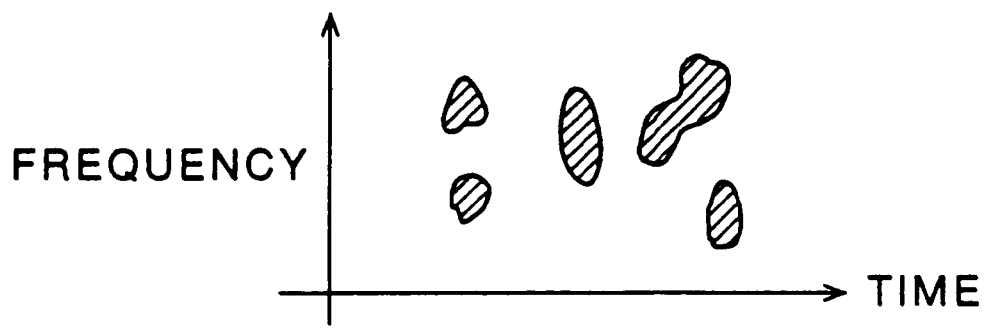
FIG. 44 is a graph showing speech patterns with frequency and time represented along axes.
Figure 44B:
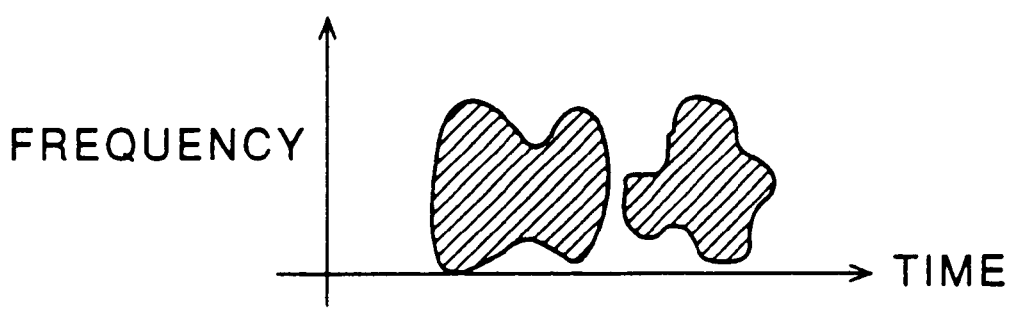
Figure 44C:
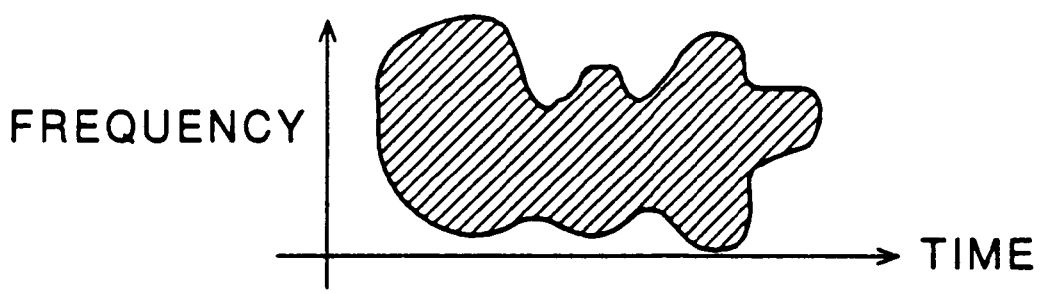

FIG. 43 illustrates the data of FIG. 42 which has been cut using intensity and frequency as the cutting axes; and FIG. 44 illustrates the data of FIG. 42 which has been cut using frequency and time.

The recognition result of the entire three-dimensional configuration like the one shown in FIG. 42 can be obtained by averaging (e.g. arithmetic averaging) the recognition results of N pieces of the two-dimensional bit maps as described above.

What is claimed is:

1. An information processing method for generating a classification tree, which is a recognition dictionary used for character recognition, comprising:

a division step of dividing a predetermined training stroke into a plurality of segments;

a vector quantization step of performing vector quantization of said strokes in said segments obtained at said division step;

a layered stroke vector generation step of synthesizing adjacent strokes of said segments, obtained at said division step, to obtain stroke sets to generate upper rank stroke vectors, and of producing a layered vector series; and a classification tree generation step of selecting a stroke vector, for which a predetermined entropy function is the greatest, from upper rank stroke vectors in said layered stroke vector series that is obtained at said layered stroke vector generation step, and of developing said stroke vector to produce lower rank stroke vectors to generate a classification tree.

2. A method according to claim 1, wherein, at said vector quantization step, said strokes in said segments obtained at said division step are quantized to obtain vectors in eight directions, with intersecting angles formed by adjacent vectors being equal to each other.

3. A method according to claim 1, wherein, at said vector quantization step, said strokes in said segments obtained at said division step are quantized to obtain vectors in sixteen directions, with intersecting angles formed by adjacent vectors being equal to each other.

4. A method according to claim 1, wherein said entropy function is a function whereby an entropy reducing value is output when information is obtained for a lower rank vector set of one of said upper stroke vectors of said layered stroke vector series, which is generated at said layered stroke vector generation step.

5. A method according to claim 1, wherein at said classification tree generation step, if a training stroke corresponding to said lower rank stroke vector set is not present, said lower rank stroke vector set for said classification tree is regarded as invalid.

6. A method according to claim 5, wherein at said classification tree generation step, if a training stroke for a single category that corresponds to said lower rank stroke vector set is present, a number for said single category is attached to said lower rank stroke vector set.

7. A method according to claim 6, wherein at said classification tree generation step, if a training stroke for a plurality of categories that corresponds to said lower rank stroke vector is present, an upper rank stroke vector with which said predetermined entropy function is maximized is selected from upper rank stroke vectors for said lower rank stroke vector set.

8. A method according to claim 1, further comprising the step of recognizing a character using the generated classification tree, said recognizing step including:

a division step of dividing an input stroke into a plurality of segments;

a vector quantization step of performing vector quantization of strokes in said segments obtained at said division step;

a layered stroke vector generation step of synthesizing adjacent strokes of said segments, obtained at said division step, to obtain stroke sets to generate upper rank stroke vectors, and of producing a layered vector series; and a recognition step of acquiring a recognition category by tracing said classification tree in order from said upper rank stroke vectors to lower rank stroke vectors in said layered stroke vector series, which is generated at said layered stroke vector generation step.

9. An information processing apparatus for generating a classification tree, which is a recognition dictionary used for character recognition, comprising:

division means for dividing a predetermined training stroke into a plurality of segments;

vector quantization means for performing vector quantization of said strokes in said segments obtained by said division means;

layered stroke vector generation means for synthesizing adjacent strokes of said segments, obtained by said division means, to obtain stroke sets to generate upper rank stroke vectors, and for producing a layered vector series; and classification tree generation means for selecting a stroke vector, for which a predetermined entropy function is the greatest, from upper rank stroke vectors in said layered stroke vector series that is obtained by said layered stroke vector generation means, and for developing said stroke vector to produce lower rank stroke vectors to generate a classification tree.

10. An apparatus according to claim 9, wherein said vector quantization means quantizes said strokes in said segments, obtained by said division means in order to acquire vectors in eight directions, with intersecting angles formed by adjacent vectors being equal to each other.

11. An apparatus according to claim 9, wherein said vector quantization means quantizes said strokes in said segments, obtained by said division means, in order to acquire vectors in sixteen directions, with intersecting angles formed by adjacent vectors being equal to each other.

12. An apparatus according to claim 9, wherein said entropy function is a function whereby an entropy reducing value is output when information is obtained for a lower rank vector set of one of said upper stroke vectors of said layered stroke vector series, which is generated by said layered stroke vector generation means.

13. An apparatus according to claim 9, wherein, if a training stroke corresponding to said lower rank stroke vector set is not present, said classification tree generation means regards, as invalid, said lower rank stroke vector set for said classification tree.

14. An apparatus according to claim 13, wherein, if a training stroke for a single category that corresponds to said lower rank stroke vector set is present, said classification tree generation means attaches a number for said single category to said lower rank stroke vector set.

15. An apparatus according to claim 14, wherein if a training stroke for a plurality of categories that corresponds to said lower rank stroke vector is present, said classification tree generation means selects an upper rank stroke vector, with which said predetermined entropy function is maximized, from upper rank stroke vectors for said lower rank stroke vector set.

16. An apparatus according to claim 9, further comprising means for recognizing a character using the generated classification tree, said recognizing means including:

division means for dividing an input stroke into a plurality of segments;

vector quantization means for performing vector quantization of strokes in said segments obtained by said division means;

layered stroke vector generation means for synthesizing adjacent strokes of said segments, obtained by said division means, to obtain stroke sets to generate upper rank stroke vectors, and for producing a layered vector series; and recognition means for acquiring a recognition category by tracing said classification tree in order from said upper rank stroke vectors to lower rank stroke vectors in said layered stroke vector series, which is generated by said layered stroke vector generation means.

17. A computer accessible memory in which are stored stroke vector classification tree data that are constituted by a stroke vector series extending from a low-level to a high-level layer, said stroke vector classification data comprising:

root node production data, leaf node attribute data, an attribute of which is that only a stroke vector series of a single category is present, that include said stroke vector series of said single category, and node attribute data, for plural categories, an attribute of which is that only a stroke vector series for said plurality of categories is present, that include said stroke vector series of said plurality of categories, wherein said stroke vector series, in said low-rank to high-rank layers, is assigned, for each of said layers, to respective nodes for said leaf node attribute data and said node attribute data for plural categories, while said root node attribute data are regarded as a start node of a lowest-level layer; and wherein, when a stroke vector series, composed of a plurality of categories, that is constituted by a plurality of stroke vector series is present in a training stroke vector series at said layers, a stroke vector with which a predetermined entropy function is maximized is selected from a stroke vector series that is included in said node for said node attribute data for plural categories, and a lower rank stroke vector series is developed for said stroke vector that is selected, so that a node at the next layer is acquired that is linked with said node for said node attribute data for plural categories, to which said stroke vector series for plural categories is assigned.

18. An information processing method for generating a layered pattern comprising:

a first degenerated pattern generation step of calculating, for a pattern divided into a plurality of segments, a logical sum for data of adjacent segments among said plurality of segments, and of generating a first degenerated pattern;

a second degenerated pattern generation step of calculating a logical sum for data of adjacent segments among a plurality of segments of said first degenerated pattern obtained at said first degenerated pattern generation step, and of generating a second degenerated pattern; and a repetition step of repeating a process at said second degenerated pattern generation step a predetermined n times, based on said second degenerated pattern obtained at said second degenerated pattern generation step, and of generating a layered pattern of n−1 layers.

19. An information processing method according to claim 18, wherein said pattern that is divided into said plurality of segments is a training character pattern for a character recognition dictionary.

20. An information processing method according to claim 18, wherein said plurality of segments are like sized rectangles.

21. An information processing method according to claim 18, wherein said adjacent segments are ranged as an equivalent of continuous 2×2 segments.

22. An information processing method according to claim 18, further comprising a classification tree generation step of generating a classification tree based on a plurality of layered patterns that are generated at said repetition step, said classification tree generation step including:

a link generation step of generating, for each layer of said layered pattern, a link from a segment extending from a degenerated pattern to a corresponding segment, including a pattern part, at a lower layer; and a repetition step of repeating a process at said link generation step until a corresponding segment, including a pattern part, is not present in a lower layer, and of generating a classification tree.

23. An information processing method according to claim 18, wherein, at said link generation step, for each layer of said layered pattern a segment wherein a predetermined entropy function is maximized is selected from said segments, including said degenerated pattern, and wherein a link is generated in a segment at a lower layer, including a pattern part, that corresponds to said segment that is selected.

24. An information processing method according to claim 23, wherein said entropy function is a function whereby an entropy reducing value is output when, for each layer of said layered pattern, information is obtained for a lower layer segment corresponding to one of said segments that includes said degenerated pattern parts.

25. An information processing method according to claim 18, further comprising an N-gram table generation step of applying a predetermined layered pattern to said classification tree, which is acquired at said classification tree generation step, to generate an N-gram table.

26. An information processing method according to claim 25, wherein said N-gram table generation step includes:

an occurrence probability generation step of applying said predetermined layered pattern to said classification tree that is acquired at said classification tree generation step; and a step of, when multiple patterns belonging to the same category belong to different links, selecting a link for a pattern for which occurrence is most probable, of abandoning remaining patterns that belong to the same category but belong to links other than said link that is selected, and of generating said N-gram table.

27. An information processing method according to claim 25, wherein said N-gram table that is acquired at said N-gram table generation step is searched to recognize a category that corresponds to an input character pattern.

28. An information processing apparatus for generating a layered pattern comprising:

first degenerated pattern generation means for calculating, for a pattern divided into a plurality of segments, a logical sum for data of adjacent segments among said plurality of segments, and for generating a first degenerated pattern;

second degenerated pattern generation means for calculating a logical sum for data of adjacent segments among a plurality of segments of said first degenerated pattern obtained by said first degenerated pattern generation means, and for generating a second degenerated pattern; and repetition means for repeating a process performed by said second degenerated pattern generation means a predetermined n times, based on said second degenerated pattern obtained by said second degenerated pattern generation means, and for generating a layered pattern of n−1 layers.

29. An information processing apparatus according to claim 28, wherein said pattern that is divided into said plurality of segments is a training character pattern for a character recognition dictionary.

30. An information processing apparatus according to claim 28, wherein said plurality of segments are like sized rectangles.

31. An information processing apparatus according to claim 28, wherein said adjacent segments are ranged as an equivalent of continuous 2×2 segments.

32. An information processing apparatus according to claim 28, further comprising classification tree generation means for generating a classification tree based on a plurality of layered patterns that are generated by said repetition means, said classification tree generation means including:

link generation means for generating, for each layer of said layered pattern, a link from a segment extending from a degenerated pattern to a corresponding segment, including a pattern part, at a lower layer; and repetition means for repeating a process performed by said link generation means until a corresponding segment, including a pattern part, is not present in a lower layer, and for generating a classification tree.

33. An information processing apparatus according to claim 28, wherein, for each layer of said layered pattern, by said link generation means is selected a segment wherein a predetermined entropy function is maximized from said segments, including said degenerated pattern, and wherein a link is generated in a segment at a lower layer, including a pattern part, that corresponds to said segment that is selected.

34. An information processing apparatus according to claim 33, wherein said entropy function is a function whereby an entropy reducing value is output when, for each layer of said layered pattern, information is obtained for a lower layer segment corresponding to one of said segments that includes said degenerated pattern parts.

35. An information processing apparatus according to claim 28, further comprising N-gram table generation means for applying a predetermined layered pattern to said classification tree, which is acquired by said classification tree generation means, to generate an N-gram table.

36. An information processing apparatus according to claim 35, wherein said N-gram table generation means includes:

occurrence probability generation means for applying said predetermined layered pattern to said classification tree that is acquired by said classification tree generation means; and means for, when multiple patterns belonging to the same category belong to different links, selecting a link for a pattern for which occurrence is most probable, for abandoning remaining patterns that belong to the same category but belong to links other than said link that is selected, and for generating said N-gram table.

37. An information processing apparatus according to claim 35, wherein said N-gram table that is acquired by said N-gram table generation means is searched to recognize a category that corresponds to an input character pattern.

38. A computer program product having a storage medium in which is stored computer accessible program code for generating a layered character pattern, said program code including:

program code for calculating, for a character pattern divided into a plurality of segments, a logical sum for data of adjacent segments among said plurality of segments, and for generating a first degenerated character pattern;

program code for calculating a logical sum for data of adjacent segments among a plurality of segments of said first degenerated character pattern, and for generating a second degenerated character pattern; and program code for repeating a process for generating said second degenerated character pattern a predetermined n times based on said second degenerated character pattern, and for generating a layered character pattern of n−1 layers.

39. A method according to claim 1, further comprising a sub-pattern extraction step of extracting sub-patterns from a training pattern, wherein each of said extracted sub-patterns is dealt as said training stroke to be divided in said division step.

40. A method according to claim 39, further comprising a layering step of layering in advance said sub-patterns that are extracted, wherein said classification tree generation step generates a classification tree for said sub-patterns based on sub-pattern layers that are obtained.

41. An information processing method according to claim 40, wherein at said layering step, data are produced by degeneration, beginning with detailed data in said sub-patterns.

42. An information processing method according to claim 40, wherein at said classification tree step, data are so developed from upper rank through lower rank data in said sub-pattern layers.

43. An information processing method according to claim 40, wherein said sub-patterns are pattern parts obtained by dividing said training pattern.

44. An information processing method according to claim 40, wherein at said classification tree generation step, a variable with which classification efficiency is maximized is selected, and said classification tree is generated according to said variable.

45. An information processing method according to claim 40, further comprising:

a pattern input step of inputting a pattern;

an input pattern layering step of layering said pattern that is input; and an identification step of identifying said pattern by tracing said classification tree from upper rank through lower rank data of said pattern for which layering is performed.

46. An information processing method according to claim 40, wherein said pattern is a bit-mapped data.

47. An information processing method according to claim 40, wherein said pattern is stroke data.

48. An information processing method according to claim 40, wherein said pattern is speech data.

49. An apparatus according to claim 9, further comprising a sub-pattern extraction means for extracting sub-patterns from a training pattern, wherein each of said extracted sub-patterns is dealt as said training stroke to be divided in said division means.

50. An apparatus according to claim 49, further comprising a layering means for layering in advance said sub-patterns that are extracted, wherein said classification tree generation means generates a classification tree for said sub-patterns based on sub-pattern layers that are obtained.

51. An information processing apparatus according to claim 50, wherein at said layering means, data are produced by degeneration, beginning with detailed data in said sub-patterns.

52. An information processing apparatus according to claim 50, wherein at said classification tree step, data are so developed from upper rank through lower rank data in said sub-pattern layers.

53. An information processing apparatus according to claim 50, wherein said sub-patterns are pattern parts obtained by dividing said training pattern.

54. An information processing apparatus according to claim 50, wherein at said classification tree generation means, a variable with which classification efficiency is maximized is selected, and said classification tree is generated according to said variable.

55. An information processing apparatus according to claim 50, further comprising:

a pattern input means for inputting a pattern;

an input pattern layering means for layering said pattern that is input; and an identification means for identifying said pattern by tracing said classification tree from upper rank through lower rank data of said pattern for which layering is performed.

56. An information processing apparatus according to claim 50, wherein said pattern is a bit-mapped data.

57. An information processing apparatus according to claim 50, wherein said pattern is stroke data.

58. An information processing apparatus according to claim 50, wherein said pattern is speech data.

59. A computer accessible memory according to claim 17, further comprising a sub-pattern extraction step of extracting sub-patterns from a training pattern, wherein each of said extracted sub-patterns is dealt as said training stroke to be divided in said division step.

60. A computer accessible memory according to claim 59, further comprising a layering step of layering in advance said sub-patterns that are extracted, wherein said classification tree generation step generates a classification tree for said sub-patterns based on sub-pattern layers that are obtained.

61. A computer accessible memory according to claim 60, wherein at said layering step, data are produced by degeneration, beginning with detailed data in said sub-patterns.

62. A computer accessible memory according to claim 60, wherein at said classification tree step, data are so developed from upper rank through lower rank data in said sub-pattern layers.

63. A computer accessible memory according to claim 60, wherein said sub-patterns are pattern parts obtained by dividing said training pattern.

64. A computer accessible memory according to claim 60, wherein at said classification tree generation step, a variable with which classification efficiency is maximized is selected, and said classification tree is generated according to said variable.

65. A method according to claim 60, further comprising:

a pattern input step of inputting a pattern;

an input pattern layering step of layering said pattern that is input; and an identification step of identifying said pattern by tracing said classification tree from upper rank through lower rank data of said pattern for which layering is performed.

66. A computer accessible memory according to claim 60, wherein said pattern is a bit-mapped data.

67. A computer accessible memory according to claim 60, wherein said pattern is stroke data.

68. A computer accessible memory according to claim 60, wherein said pattern is speech data.

69. A method according to claim 1, wherein said training stroke is replaced by a training voice waveform pattern and said training voice waveform pattern is divided in said division step.

70. An apparatus according to claim 9, wherein said training stroke is replaced by a training voice waveform pattern and said training voice waveform pattern is divided in said division step.

71. A computer accessible memory according to claim 17, wherein said training stroke is replaced by a training voice waveform pattern and said training voice waveform pattern is divided in said division step.

72. A method according to claim 18, further comprising a sub-pattern extraction step or extracting sub-patterns from a training pattern, wherein each of said extracted sub-patterns is dealt as said pattern to be divided into said plurality of segments in said division step.

73. An apparatus according to claim 28, further comprising a sub-pattern extraction means for extracting sub-patterns from a training pattern, wherein each of said extracted sub-patterns is dealt as said pattern to be divided into said plurality of segments in said division means.

74. A computer program product according to claim 38, further comprising a sub-pattern extraction step or extracting sub-patterns from a training pattern, wherein each of said extracted sub-patterns is dealt as said pattern to be divided into said plurality of segments in said division step.

* * * * *

UNITED STATES PATENT AND TRADEMARK OFFICE
CERTIFICATE OF CORRECTION

PATENT NO. : 5,982,933

DATED : November 9, 1999

INVENTORS : Hiroto Yoshii, et al.

Page 1 of 2

It is certified that error appears in the above-identified patent and that said Letters Patent is hereby corrected as shown below:

COVER PAGE

Under [56] References Cited, Other Publications, "939-947-Pattern Recognition-Oxford." should read --939-947.--.

Under [57] Abstract, line 1, "This" should read --The present invention--.

COLUMN 1

Line 32, "words," should read --words, there is provided--; and
Line 45, "A" should read --There exists--.

COLUMN 8

Line 3, "case" should be deleted.

COLUMN 27

Line 22, "discriminater" should read --discriminator--.

COLUMN 35

Line 47, "so" should be deleted.

UNITED STATES PATENT AND TRADEMARK OFFICE
CERTIFICATE OF CORRECTION

PATENT NO. : 5,982,933
DATED : November 9, 1999
INVENTOR(S) : Hiroto Yoshii, et al.

It is certified that error appears in the above-identified patent and that said Letters Patent is hereby corrected as shown below:

COLUMN 36

Line 2, "a" should be deleted;
    Line 9, "dealt" should read --dealt with--;
    Line 22, "so" should be deleted;
    Line 43, "a" should be deleted;
    Line 51, "dealt" should read --dealt with--; and
    Line 65, "so" should be deleted.

COLUMN 37

Line 18, "a" should be deleted.

COLUMN 38

Line 10, "or" should read --for--;
    Line 12, "dealt" should read --dealt with--;
    Line 18, "dealt" should read --dealt with--;
    Line 21, "or" should read --for--; and
    Line 23, "dealt" should read --dealt with--.

Signed and Sealed this

Seventeenth Day of October, 2000

*Attest:*

Q. TODD DICKINSON

*Attesting Officer*   *Director of Patents and Trademarks*